United States Patent
Kalinski

(10) Patent No.: US 12,462,208 B2
(45) Date of Patent: **\*Nov. 4, 2025**

(54) RISK PROBABILITY ASSESSMENT FOR CARGO SHIPMENT OPERATIONS AND METHODS OF USE THEREOF

(71) Applicant: Redkik, LLC, Oxford, MD (US)

(72) Inventor: Chris Kalinski, Oxford, MD (US)

(73) Assignee: Redkik, LLC, Oxford, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/236,872

(22) Filed: Aug. 22, 2023

(65) Prior Publication Data

US 2023/0394411 A1   Dec. 7, 2023

Related U.S. Application Data

(63) Continuation of application No. 17/738,396, filed on May 6, 2022, now Pat. No. 11,734,634.
(Continued)

(51) Int. Cl.
*G06Q 10/00* (2023.01)
*G06F 18/00* (2023.01)
(Continued)

(52) U.S. Cl.
CPC ..... *G06Q 10/0635* (2013.01); *G06F 18/2193* (2023.01); *G06F 18/2415* (2023.01); *G06N 20/00* (2019.01); *G06Q 10/083* (2013.01)

(58) Field of Classification Search
CPC .......................................... G06Q 10/00–50/00
(Continued)

(56) References Cited

U.S. PATENT DOCUMENTS 3,519,224 A   7/1970   Boyd et al.
5,380,011 A   1/1995   Jarvis
(Continued)

FOREIGN PATENT DOCUMENTS

AU   2001296069   4/2002
AU   2002231179   7/2002
(Continued)

OTHER PUBLICATIONS

European Patent Office; PCT International Search Report, issued in connection to PCT/US2022/028077; Jul. 25, 2022; 3 pages; Europe.
(Continued)

*Primary Examiner* — Mustafa Iqbal
(74) *Attorney, Agent, or Firm* — Greenberg Traurig, LLP

(57) ABSTRACT

In some embodiments, the present disclosure provides an exemplary method that may include steps of receiving input data for a plurality of identified data records; receiving a plurality of predetermined policy parameters associated with at least one logistics data provider of the plurality of logistics data providers; dynamically enriching the input data by aggregating current data, forecast data, and predictive data; calculating a respective risk probability value associated with each qualifying provider of the plurality of providers; generating a respective dynamic data model associated with each of the qualifying provider of the plurality of providers; dynamically determining a predetermined policy risk threshold in real time for the identified data record; automatically modifying the predetermined policy risk threshold in real time associated with the at least one qualified provider of the plurality of providers; and dynamically selecting a respective data point for each qualified provider of the plurality of providers.

20 Claims, 28 Drawing Sheets

Related U.S. Application Data

(60) Provisional application No. 63/185,593, filed on May 7, 2021.

(51) Int. Cl.

| | | |
|---|---|---|
| *G06F 18/21* | (2023.01) | |
| *G06F 18/2415* | (2023.01) | |
| *G06N 20/00* | (2019.01) | |
| *G06Q 10/0635* | (2023.01) | |
| *G06Q 10/083* | (2023.01) | |

(58) Field of Classification Search

USPC .............................................. 705/7.11–7.42

See application file for complete search history.

(56) References Cited

U.S. PATENT DOCUMENTS

| | | | |
|---|---|---|---|
| 5,610,344 | A | 3/1997 | Ueda et al. |
| 5,727,676 | A | 3/1998 | Tatsu et al. |
| 6,050,116 | A | 4/2000 | Cole |
| 6,630,249 | B2 | 10/2003 | Kennedy |
| 6,984,452 | B2 | 1/2006 | Kennedy |
| 7,069,252 | B2 | 6/2006 | Ishimi et al. |
| 7,587,353 | B2 | 9/2009 | Melchior et al. |
| 7,610,210 | B2 | 10/2009 | Helitzer et al. |
| 7,698,204 | B2 | 4/2010 | Abendroth |
| 7,818,812 | B2 | 10/2010 | Kra |
| 8,010,461 | B2 | 8/2011 | Bohinc, Jr. |
| 8,290,797 | B2 | 10/2012 | Hargroder |
| 8,332,241 | B2 | 12/2012 | Harrell et al. |
| 8,543,490 | B2 | 9/2013 | Lerner |
| 8,843,410 | B2 | 9/2014 | Blount et al. |
| 9,628,975 | B1 | 4/2017 | Watkins et al. |
| 9,798,996 | B2 | 10/2017 | Borgerson et al. |
| 9,870,392 | B2 | 1/2018 | Xiao |
| 10,032,224 | B2 | 7/2018 | Helitzer et al. |
| 10,410,167 | B2 | 9/2019 | Borgerson et al. |
| 10,623,899 | B2 | 4/2020 | Watkins et al. |
| 10,679,173 | B2 | 6/2020 | Olsen et al. |
| 11,051,127 | B2 | 6/2021 | Watkins et al. |
| 11,257,108 | B2 | 2/2022 | Salloum |
| 11,367,141 | B1 | 6/2022 | Wang et al. |
| 11,367,142 | B1 | 6/2022 | Wang et al. |
| 11,466,997 | B1* | 10/2022 | Williams ......... G08G 1/096716 |
| 11,634,214 | B1 | 4/2023 | Parchment et al. |
| 11,694,272 | B2 | 7/2023 | Sharpe |
| 11,734,634 | B2 | 8/2023 | Kalinski |
| 11,770,681 | B2 | 9/2023 | Watkins et al. |
| 2002/0016778 | A1 | 2/2002 | Konno et al. |
| 2002/0095355 | A1 | 7/2002 | Walker et al. |
| 2002/0198744 | A1 | 12/2002 | Sagalow et al. |
| 2004/0034575 | A1 | 2/2004 | Oh |
| 2005/0102168 | A1 | 5/2005 | Thomas et al. |
| 2005/0171870 | A1 | 8/2005 | Mizushima et al. |
| 2005/0171871 | A1 | 8/2005 | Mizushima et al. |
| 2005/0219037 | A1 | 10/2005 | Huang |
| 2005/0261986 | A1 | 11/2005 | Haynes et al. |
| 2006/0033616 | A1 | 2/2006 | Silva et al. |
| 2006/0089886 | A1 | 4/2006 | Wong |
| 2007/0011033 | A1 | 1/2007 | Atkinson et al. |
| 2007/0168125 | A1 | 7/2007 | Petrik |
| 2007/0282641 | A1 | 12/2007 | Thomas et al. |
| 2007/0282642 | A1 | 12/2007 | Thomas et al. |
| 2008/0147516 | A1 | 6/2008 | Rousso et al. |
| 2008/0228625 | A1 | 9/2008 | Isaf et al. |
| 2009/0061897 | A1 | 3/2009 | Hamilton et al. |
| 2009/0089113 | A1 | 4/2009 | Rousso et al. |
| 2009/0164256 | A1 | 6/2009 | Fisher et al. |
| 2010/0097208 | A1 | 4/2010 | Rosing et al. |
| 2012/0107191 | A1 | 5/2012 | Strahle et al. |
| 2013/0232036 | A1 | 9/2013 | Melchior et al. |
| 2013/0275466 | A1 | 10/2013 | Xiao |
| 2014/0040063 | A1 | 2/2014 | Raviv et al. |
| 2014/0188750 | A1 | 7/2014 | Seiler |
| 2015/0371182 | A1* | 12/2015 | Lucas ............... G06Q 10/0832 705/4 |
| 2016/0189304 | A1 | 6/2016 | Todasco et al. |
| 2017/0030853 | A1 | 2/2017 | Hodges, Jr. et al. |
| 2017/0032314 | A1 | 2/2017 | Borgerson et al. |
| 2017/0069035 | A1 | 3/2017 | Quinlan et al. |
| 2017/0208375 | A1 | 7/2017 | Hodges, Jr. et al. |
| 2018/0146341 | A1 | 5/2018 | Watkins et al. |
| 2019/0082300 | A1 | 3/2019 | Watkins et al. |
| 2019/0095857 | A1 | 3/2019 | Borgerson et al. |
| 2019/0114714 | A1 | 4/2019 | Jones et al. |
| 2019/0251508 | A1 | 8/2019 | Beckwitt |
| 2019/0258993 | A1 | 8/2019 | Olsen et al. |
| 2020/0034788 | A1 | 1/2020 | Ynion, Jr. |
| 2020/0118068 | A1 | 4/2020 | Turetsky et al. |
| 2020/0202451 | A1 | 6/2020 | Jones et al. |
| 2020/0234327 | A1 | 7/2020 | Salloum |
| 2020/0267503 | A1 | 8/2020 | Watkins et al. |
| 2020/0334762 | A1 | 10/2020 | Carver et al. |
| 2021/0035224 | A1 | 2/2021 | Crabtree et al. |
| 2021/0042696 | A1 | 2/2021 | Lahav et al. |
| 2021/0082055 | A1 | 3/2021 | Sharpe |
| 2021/0201420 | A1 | 7/2021 | Kaneichi |
| 2021/0272037 | A1 | 9/2021 | Hanebeck |
| 2021/0295355 | A1 | 9/2021 | Bostock et al. |
| 2021/0398045 | A1 | 12/2021 | Hanebeck |
| 2022/0092530 | A1 | 3/2022 | Newell et al. |
| 2022/0129804 | A1 | 4/2022 | Dooley et al. |
| 2022/0129846 | A1 | 4/2022 | Montgomery et al. |
| 2022/0138888 | A1 | 5/2022 | Wiesenberg et al. |
| 2022/0230131 | A1 | 7/2022 | Benayoun et al. |
| 2022/0374797 | A1 | 11/2022 | Kalinski |
| 2023/0059205 | A1 | 2/2023 | Prupes et al. |
| 2023/0185942 | A1 | 6/2023 | Hanebeck |
| 2023/0211757 | A1 | 7/2023 | Allen |
| 2023/0394411 | A1 | 12/2023 | Kalinski |

FOREIGN PATENT DOCUMENTS

| | | |
|---|---|---|
| AU | 2005270733 | 2/2006 |
| AU | 2007101215 | 2/2008 |
| AU | 2016300215 | 2/2021 |
| CA | 2316430 | 2/2002 |
| CA | 3022440 | 4/2020 |
| CN | 2480497 | 3/2002 |
| CN | 1175369 | 11/2004 |
| CN | 1559049 | 12/2004 |
| CN | 1213852 | 8/2005 |
| CN | 101551887 | 10/2009 |
| CN | 101782991 | 7/2010 |
| CN | 101828098 | 9/2010 |
| CN | 102567863 | 7/2012 |
| CN | 102592207 | 7/2012 |
| CN | 202486831 | 10/2012 |
| CN | 104035385 | 9/2014 |
| CN | 104376447 | 2/2015 |
| CN | 105512845 | 4/2016 |
| CN | 103218704 | 9/2016 |
| CN | 105930928 | 9/2016 |
| CN | 106845896 | 6/2017 |
| CN | 103229200 | 8/2017 |
| CN | 107248051 | 10/2017 |
| CN | 108367862 | 8/2018 |
| CN | 109670906 | 4/2019 |
| CN | 109740979 | 5/2019 |
| CN | 110009517 | 7/2019 |
| CN | 110223026 | 9/2019 |
| CN | 110447045 | 11/2019 |
| CN | 111523754 | 8/2020 |
| CN | 111639887 | 9/2020 |
| CN | 112883319 | 6/2021 |
| CN | 113056757 | 6/2021 |
| CN | 113591449 | 11/2021 |
| CN | 113762573 | 12/2021 |
| CN | 114059892 | 2/2022 |
| DE | 102005019194 | 11/2005 |
| DE | 102006051248 | 4/2008 |
| DE | 102007007034 | 8/2008 |
| DE | 102008039648 | 3/2010 |

(56) References Cited

FOREIGN PATENT DOCUMENTS

| | | |
|---|---|---|
| EP | 1784767 | 5/2007 |
| EP | 3703306 | 9/2020 |
| EP | 3836053 | 6/2021 |
| ES | 269663 | 1/1984 |
| ES | 1004138 | 8/1988 |
| ES | 2204440 | 5/2004 |
| ES | 2158832 | 12/2005 |
| ES | 2300405 | 6/2008 |
| ES | 2311596 | 2/2009 |
| ES | 1071288 | 2/2010 |
| ES | 2355846 | 3/2011 |
| ES | 2365093 | 9/2011 |
| ES | 2369344 | 11/2011 |
| ES | 2381735 | 5/2012 |
| ES | 2425633 | 10/2013 |
| ES | 2430716 | 11/2013 |
| ES | 2508121 | 10/2014 |
| ES | 2714627 | 5/2019 |
| ES | 2715987 | 6/2019 |
| ES | 2767623 | 6/2020 |
| ES | 2846889 | 7/2021 |
| ES | 2893806 | 2/2022 |
| HR | P20200020 T1 | 3/2020 |
| IT | TO20121091 A1 | 6/2014 |
| JP | 2001325446 | 11/2001 |
| JP | 2002149985 | 5/2002 |
| JP | 2002312446 | 10/2002 |
| JP | 2004510752 | 4/2004 |
| JP | 2004302574 | 10/2004 |
| JP | 2004533294 | 11/2004 |
| JP | 2006244196 | 9/2006 |
| JP | 2007001760 | 1/2007 |
| JP | 4732606 | 7/2011 |
| JP | 2017016456 | 1/2017 |
| JP | 2023053923 | 4/2023 |
| JP | 2023542361 | 10/2023 |
| KR | 20010000912 | 1/2001 |
| KR | 20010097029 | 11/2001 |
| KR | 20010099047 | 11/2001 |
| KR | 20010109596 | 12/2001 |
| KR | 20020003593 | 1/2002 |
| KR | 20020006799 | 1/2002 |
| KR | 20020022417 | 3/2002 |
| KR | 20020025546 | 4/2002 |
| KR | 20020029642 | 4/2002 |
| KR | 20020068814 | 8/2002 |
| KR | 20030065224 | 8/2003 |
| KR | 100407397 | 11/2003 |
| KR | 100418264 | 2/2004 |
| KR | 100443912 | 8/2004 |
| KR | 20050069227 | 7/2005 |
| KR | 20060019930 | 3/2006 |
| KR | 100650225 | 11/2006 |
| KR | 100662675 | 1/2007 |
| KR | 20080004267 | 1/2008 |
| KR | 20080041042 | 5/2008 |
| KR | 100836874 | 6/2008 |
| KR | 20090000173 | 1/2009 |
| KR | 20090001749 | 1/2009 |
| KR | 20090001930 | 1/2009 |
| KR | 20090009359 | 1/2009 |
| KR | 20090009360 | 1/2009 |
| KR | 20090009361 | 1/2009 |
| KR | 20090011042 | 1/2009 |
| KR | 20090013670 | 2/2009 |
| KR | 20090022201 | 3/2009 |
| KR | 20090023437 | 3/2009 |
| KR | 20090023457 | 3/2009 |
| KR | 20090127790 | 12/2009 |
| KR | 20100024907 | 3/2010 |
| KR | 20110097731 | 8/2011 |
| KR | 20150001579 | 1/2015 |
| KR | 101778735 | 9/2017 |
| KR | 101810179 | 12/2017 |
| KR | 101982250 | 8/2019 |
| KR | 20200002714 | 1/2020 |
| KR | 20200137430 | 12/2020 |
| KR | 20200142363 | 12/2020 |
| KR | 20210006723 | 1/2021 |
| KR | 20210027952 | 3/2021 |
| KR | 102232716 | 4/2021 |
| KR | 102251607 | 5/2021 |
| KR | 20210070524 | 6/2021 |
| KR | 20210114782 | 9/2021 |
| KR | 20220013168 | 2/2022 |
| KR | 20220037134 | 3/2022 |
| KR | 102381490 | 4/2022 |
| KR | 102390562 | 4/2022 |
| KR | 102461658 | 10/2022 |
| KR | 102578798 | 9/2023 |
| KR | 20230141085 | 10/2023 |
| MX | 2013000856 | 3/2013 |
| NZ | 739245 | 7/2021 |
| PT | 83228 | 9/1992 |
| RU | 2009978 | 3/1994 |
| RU | 13266 | 3/2000 |
| RU | 99110723 | 3/2001 |
| RU | 2222826 | 1/2004 |
| RU | 2293055 | 2/2007 |
| RU | 2437825 | 12/2011 |
| RU | 2582742 | 4/2016 |
| RU | 2602269 | 11/2016 |
| RU | 2726211 | 7/2020 |
| SU | 639804 | 12/1978 |
| SU | 735549 | 5/1980 |
| SU | 848041 | 7/1981 |
| SU | 1759775 | 9/1992 |
| TW | 440536 | 6/2001 |
| TW | 557431 | 10/2003 |
| WO | 01/44994 | 6/2001 |
| WO | 02/17032 | 2/2002 |
| WO | 02/35319 | 5/2002 |
| WO | 02/095626 | 11/2002 |
| WO | 2008/017085 | 2/2008 |
| WO | 2009/094020 | 7/2009 |
| WO | 2015/136324 | 9/2015 |
| WO | 2018/147881 | 8/2018 |
| WO | 2019/028634 | 2/2019 |
| WO | 2019/028635 | 2/2019 |
| WO | 2021/021651 | 2/2021 |
| WO | 2021/026174 | 2/2021 |
| WO | 2021/029029 | 2/2021 |
| WO | 2021/186092 | 9/2021 |
| WO | 2022/060361 | 3/2022 |
| WO | 2022/236059 | 11/2022 |
| WO | 2023/101088 | 6/2023 |
| WO | 2023/180581 | 9/2023 |

OTHER PUBLICATIONS

European Patent Office; PCT Written Opinion of the International Searching Authority, issued in connection to PCT/US2022/028077; Jul. 25, 2022; 7 pages; Europe.

The International Bureau of WIPO; PCT International Preliminary Report on Patentability, issued in connection to PCT/US2022/028077; Oct. 24, 2023; 8 pages; Switzerland.

* cited by examiner

Insurer/Underwriter Commodity Type/Classification List

| Commodity Modifier Reference ID | Type/Classification |
|---|---|
| -1 | Other/Unknown |
| 1 | Live Animals |
| 2 | Meat And Edible Meat Offal |
| 3 | Fish And Crustaceans, Molluscs and Other Aquatic Invertebrates |
| 4 | Dairy Produce; Birds' Eggs; Natural Honey; Edible Products of Animal Origin, Not Elsewhere Specified or Included |
| 5 | Products of Animal Origin, Not Elsewhere Specified or Included |
| 6 | Live Trees And Other Plants; Bulbs, Roots and The Like; Cut Flowers and Ornamental Foliage |
| 7 | Edible Vegetables and Certain Roots and Tubers |
| 8 | Edible Fruit and Nuts; Peel of Citrus Fruit or Melons |
| 9 | Coffee, Tea, Maté And Spices |
| 10 | Cereals |
| 11 | Products of the Milling Industry; Malt; Starches; Inulin; Wheat Gluten |
| 12 | Oil Seeds and Oleaginous Fruits; Miscellaneous Grains, Seeds And Fruit; Industrial or Medicinal Plants; Straw and Fodder |
| 13 | Lac; Gums, Resins and Other Vegetable Saps and Extracts |
| 14 | Vegetable Plaiting Materials; Vegetable Products Not Elsewhere Specified or Included |
| 15 | Animal or Vegetable Fats and Oils and Their Cleavage Products; Prepared Edible Fats; Animal or Vegetable Waxes |

FIG. 5A

Insurer/Underwriter Commodity Type/Classification List Cont'd

| Commodity Modifier Reference ID | Type/Classification |
|---|---|
| 16 | Preparations of Meat, of Fish or of Crustaceans, Molluscs or Other Aquatic Invertebrates |
| 17 | Sugars and Sugar Confectionery |
| 18 | Cocoa and Cocoa Preparations |
| 19 | Preparations of Cereals, Flour, Starch or Milk; Pastrycooks' Products |
| 20 | Preparations of Vegetables, Fruit, Nuts or Other Parts of Plants |
| 21 | Miscellaneous Edible Preparations |
| 22 | Beverages, Spirits and Vinegar |
| 23 | Residues and Waste From the Food Industries; Prepared Animal Fodder |
| 24 | Tobacco and Manufactured Tobacco Substitutes |
| 25 | Salt; Sulphur; Earths and Stone; Plastering Materials, Lime and Cement |
| 26 | Ores, Slag and Ash |
| 27 | Mineral Fuels, Mineral Oils and Products of Their Distillation; Bituminous Substances; Mineral Waxes |
| 28 | Inorganic Chemicals; Organic or Inorganic Compounds of Precious Metals, of Rare-earth Metals, of Radioactive Elements or of Isotopes |
| 29 | Organic Chemicals |
| 30 | Pharmaceutical Products |
| 31 | Fertilisers |

FIG. 5B

Insurer/Underwriter Commodity Type/Classification List Cont'd

| Commodity Modifier Reference ID | Type/Classification |
|---|---|
| 32 | Tanning or Dyeing Extracts; Tannins and Their Derivatives; Dyes, Pigments And Other Colouring Matter; Paints and Varnishes; Putty And Other Mastics; Inks |
| 33 | Essential Oils and Resinoids; Perfumery, Cosmetic or Toilet Preparations |
| 34 | Soap, Organic Surface-active Agents, Washing Preparations, Lubricating Preparations, Artificial Waxes, Prepared Waxes, Polishing or Scouring Preparations, Candles and Similar Articles, Modelling Pastes, 'Dental Waxes' and Dental Preparations with A Basis of Plaster |
| 35 | Albuminoidal Substances; Modified Starches; Glues; Enzymes |
| 36 | Explosives; Pyrotechnic Products; Matches; Pyrophoric Alloys; Certain Combustible Preparations |
| 37 | Photographic or Cinematographic Goods |
| 38 | Miscellaneous Chemical Products |
| 39 | Plastics and Articles Thereof |
| 40 | Rubber and Articles Thereof |
| 41 | Raw Hides and Skins (Other than Furskins) and Leather |
| 42 | Articles of Leather; Saddlery and Harness; Travel Goods, Handbags and Similar Containers; Articles of Animal Gut (Other than Silkworm Gut) |
| 43 | Furskins and Artificial Fur; Manufactures Thereof |
| 44 | Wood and Articles of Wood; Wood Charcoal |

FIG. 5C

Insurer/Underwriter Commodity Type/Classification List Cont'd

| Commodity Modifier Reference ID | Type/Classification |
|---|---|
| 45 | Cork and Articles of Cork |
| 46 | Manufactures of Straw, of Esparto or of Other Plaiting Materials; Basketware And Wickerwork |
| 47 | Pulp of Wood or of other Fibrous Cellulosic Material; Recovered (Waste ond Scrap) Paper or Paperboard |
| 48 | Paper and Paperboard; Articles of Paper Pulp, of Paper or of Paperboard |
| 49 | Printed Books, Newspapers, Pictures and Other Products of The Printing Industry; Manuscripts, Typescripts and Plans |
| 50 | Silk |
| 51 | Wool, Fine or Coarse Animal Hair; Horsehair Yarn and Woven Fabric |
| 52 | Cotton |
| 53 | Other Vegetable Textile Fibres; Paper Yarn and Woven Fabrics of Paper Yarn |
| 54 | Man-made Filaments; Strip and the Like of Man-made Textile Materials |
| 55 | Man-made Staple Fibres |
| 56 | Wadding, Felt and Nonwovens; Special Yarns; Twine, Cordage, Ropes and Cables and Articles Thereof |
| 57 | Carpets and Other Textile Floor Coverings |
| 58 | Special Woven Fabrics; Tufted Textile Fabrics; Lace; Tapestries; Trimmings; Embroidery |
| 59 | Impregnated, Coated, Covered or Laminated Textile Fabrics; Textile Articles of a Kind Suitable For Industrial Use |

FIG. 5D

Insurer/Underwriter Commodity Type/Classification List Cont'd

| Commodity Modifier Reference ID | Type/Classification |
|---|---|
| 60 | Knitted or Crocheted Fabrics |
| 61 | Articles of Apparel and Clothing Accessories, Knitted or Crocheted |
| 62 | Articles of Apparel And Clothing Accessories, Not Knitted or Crocheted |
| 63 | Other Made-Up Textile Articles; Sets; Worn Clothing and Worn Textile Articles; Rags |
| 64 | Footwear, Gaiters and The Like; Parts of Such Articles |
| 65 | Headgear and Parts Thereof |
| 66 | Umbrellas, Sun Umbrellas, Walking Sticks, Seat-sticks, Whips, Riding-Crops and Parts Thereof |
| 67 | Prepared Feathers and Down and Articles Made of Feathers or of Down; Artificial Flowers; Articles of Human Hair |
| 68 | Articles of Stone, Plaster, Cement, Asbestos, Mica or Similar Materials |
| 69 | Ceramic Products |
| 70 | Glass and Glassware |
| 71 | Natural or Cultured Pearls, Precious or Semi-precious Stones, Precious Metals, Metals Clad with Precious Metal, and Articles Thereof; Imitation Jewellery; Coin |
| 72 | Iron and Steel |
| 73 | Articles of Iron or Steel |
| 74 | Copper and Articles Thereof |
| 75 | Nickel and Articles Thereof |
| 76 | Aluminium and Articles Thereof |

FIG. 5E

Insurer/Underwriter Commodity Type/Classification List Cont'd

| Commodity Modifier Reference ID | Type/Classification |
|---|---|
| 77 | --- Not In Use --- |
| 78 | Lead and Articles Thereof |
| 79 | Zinc and Articles Thereof |
| 80 | Tin and Articles Thereof |
| 81 | Other Base Metals; Cermets; Articles Thereof |
| 82 | Tools, Implements, Cutlery, Spoons and Forks, of Base Metal; Parts Thereof of Base Metal |
| 83 | Miscellaneous Articles of Base Metal |
| 84 | Nuclear Reactors, Boilers, Machinery and Mechanical Appliances; Parts Thereof |
| 85 | Electrical Machinery and Equipment and Parts Thereof; Sound Recorders and Reproducers, Television Image and Sound Recorders and Reproducers, and Parts and Accessories of Such Articles |
| 86 | Railway or Tramway Locomotives, Rolling Stock and Parts Thereof; Railway or Tramway Track Fixtures and Fittings and Parts Thereof; Mechanical (Including Electromechanical) Traffic Signalling Equipment of All Kinds |
| 87 | Vehicles Other Than Railway or Tramway Rolling Stock, and Parts and Accessories Thereof |
| 88 | Aircraft, Spacecraft, and Parts Thereof |
| 89 | Ships, Boats and Floating Structures |
| 90 | Optical, Photographic, Cinematographic, Measuring, Checking, Precision, Medical or Surgical Instruments and Apparatus; Parts and Accessories Thereof |
| 91 | Clocks and Watches and Parts Thereof |

FIG. 5F

Insurer/Underwriter Commodity Type List

| Commodity Modifier Reference ID | Type/Classification |
|---|---|
| 92 | Musical Instruments; Parts and Accessories of Such Articles |
| 93 | Arms and Ammunition; Parts and Accessories Thereof |
| 94 | Furniture; Bedding, Mattresses, Mattress Supports, Cushions and Similar Stuffed Furnishings; Lamps and Lighting Fittings, Not Elsewhere Specified or Included; Illuminated Signs, Illuminated Nameplates and the Like; Prefabricated Buildings |
| 95 | Toys, Games and Sports Requisites; Parts and Accessories Thereof |
| 96 | Miscellaneous Manufactured Articles |
| 97 | Works of Art, Collectors' Pieces and Antiques |
| 98 | Complete Industrial Plant |
| 99 | Special Combined Nomenclature Codes |

FIG. 5G

Insurer/Underwriter Transport Commodity Type/Classification List

| Transport Modifier Reference ID | Type/Classification |
|---|---|
| -1 | Other / Unknown |
| 1 | Road |
| 2 | Sea |
| 3 | Air |
| 4 | Rail |

FIG. 5H

PSCI Base Values

Base Price

```
1.1
```

Minimum Premium

Commodity Price Modifiers

Commodity.0

```
1
```

Live animals

```
1
```

Meat and edible meat offal

```
1
```

Fish and crustaceans, molluscs and other aquatic invertebrates

```
1
```

Dairy produce; birds' eggs; natural honey; edible products of animal origin, not elsewhere specified or included

```
1
```

Product of animal origin, not elsewhere specified or included

Accept Offer?

Do you accept the offer for the following amount? $XXX.XX

Accept  Decline

FIG. 6E

| Policies | | | + Create new policy 🔍 |
|---|---|---|---|
| Reference | Commodity | Premium | Purchased |
| XXX-XX-XXXXX | XX- (Description) | $XX.XX | XX/XX/XXXX XX:XX:XX |
| XXX-XX-XXXXX | XX- (Description) | $XX.XX | XX/XX/XXXX XX:XX:XX |
| XXX-XX-XXXXX | XX- (Description) | $XX.XX | XX/XX/XXXX XX:XX:XX |
| XXX-XX-XXXXX | XX- (Description) | $XX.XX | XX/XX/XXXX XX:XX:XX |
| XXX-XX-XXXXX | XX- (Description) | $XX.XX | XX/XX/XXXX XX:XX:XX |
| XXX-XX-XXXXX | XX- (Description) | $XX.XX | XX/XX/XXXX XX:XX:XX |
| XXX-XX-XXXXX | XX- (Description) | $XX.XX | XX/XX/XXXX XX:XX:XX |

FIG. 6F

Request Format

| Field | Type | Description |
|---|---|---|
| journeyLegs | array | An Array of journeyLeg objects, describing the different legs of the shipments journey. |
| -- startTime | datetime | The start date and time of the leg. |
| -- endTime | datetime | The end date and time of the leg. |
| -- startLocation | array or string | The starting location of the leg, this can either be supplied as a latitude and longitude pair, or an address. |
| -- endLocation | array or string | The ending location of the leg, this can either be supplied as a latitude and longitude pair, or an address. |
| -- transport Types | array | An array of the transport types used on the leg, refer to the transport Ttype list. |
| -- transport Features | array | An array of any special features for the transport, refer to the transport features list. |
| commodityType | string | An ID from the commodity list. |

FIG. 7A

Request Format

| Field | Type | Description |
|---|---|---|
| commodity Description | string | A description of the commodity being insured. |
| insuredValue | integer | The estimated value of the shipment. |
| shipmentId | string | Any tracking code available for the shipment. |
| policyHolder | policyHolder | The details of the customer for the policy. |
| -- forename | string | The customers forename. |
| -- surname | string | The customers surname. |
| -- email | string | An email address for the customer. |
| -- telephone | string | A telephone number for the customer. |
| -- address | address | |
| -- -- street | string | The number and street name. |
| -- -- locality | string | The city, town, village, post town, or other locality within which the street address may be found. |
| -- -- region | string | The province, such as a state, county, or canton within which the locality may be found. |
| -- -- postcode | string | The postal code, post code, zip code or other short code associated with the address by the relevant country's postal system. |
| -- -- country | string | The country name |

FIG. 7A
(Continued)

Reponse Format

| Field | Type | Description |
|---|---|---|
| id | string | A unique ID used to reference the quote In further API calls. |
| accepted | bool | If the quoted risk is accepted or not. |
| premium | float | If the quote is accepted, this is the total premium. |
| amendments | array | An array of strings describing steps that can be taken to get a risk accepted or lower premium. |

FIG. 7B

Request Format

| Field | Type | Description |
|---|---|---|
| id | string | The ID of the quoted risk being purchased |

FIG. 7C

Request Format

| Field | Type | Description |
|---|---|---|
| from | date | The start date for the export |
| to | date | The end date for the export |

FIG. 7D

Reponse Format

| Field | Type | Description |
|---|---|---|
| startTime | datetime | The start date and time of the cover |
| endTime | datetime | The end date and time of the cover |
| purchaseTime | datetime | The date and time the policy was purchased |
| commodityType | integer | An ID from the commodity list |
| insuredValue | integer | The total insured value of the shipment |
| travelType | integer | An ID from the travel type list |
| premium | float | The premium paid to the insurer |

FIG. 7E

Request Format

| Field | Type | Description |
|---|---|---|
| offerId | string | The ID of the initially purchased offer |
| shipmentId | string | The shipment ID used in the initial quote |
| policyNumber | string | The policy number returned from PSCI when policy was purchased |
| dateTime | datetime | The date & time delivery occurred. this must be an ISO 8601 date time with time zone and be in the past. if omitted "now" is assumed. |

FIG. 7F

RISK PROBABILITY ASSESSMENT FOR CARGO SHIPMENT OPERATIONS AND METHODS OF USE THEREOF

FIELD OF TECHNOLOGY

The present disclosure generally relates to a computerized system and method for analyzing data related to cargo shipments and, more particularly, for determining risk probabilities associated with the shipment of cargo and determining alternative actions to reduce the risk.

BACKGROUND

Risk assessment is used to identify hazards and/or risk factors that have the potential to cause harm. For example, risk assessment associated with the shipping of cargo included in a cargo shipment is historically based upon events that have occurred in the previous year with respect to a particular cargo shipment and less than half of all shipments currently go uninsured. That is, the risk assessment associated with any losses that have occurred with respect to a cargo included in a cargo shipment will be attributed to the circumstances that led to the loss in value of that particular cargo shipment during the transport and delivery of the cargo. Similarly, the risk assessment associated with any late deliveries that have occurred with respect to a cargo included in a cargo shipment will be attributed to the circumstances that led to the late delivery of that particular cargo shipment during the transport and delivery of the cargo. Generally, the risk assessment associated with a cargo shipment will solely depend upon the value of the cargo included in the cargo shipment without considering other factors that may impact the cargo shipment. For example, these other factors may include information concerning the cargo, from a real time perspective, and information that details other cargo shipments that include one or more similar characteristics with the cargo shipment, from a historical perspective.

For example, risk assessment associated with the shipping of cargo included in a cargo shipment may be utilized to determine insurance premiums associated with the cargo shipment. For example, cargo insurance is typically offered and purchased on an annual basis. Typically, in these types of annual insurance provider offerings, the premiums that are paid to an insurance provider are based on the previous years' (e.g., 1, 2, 5, 10, etc. years) losses. For example, insurance providers use the previous years' losses to determine the premium due for the current year which, in many instances, is the previous year's premium with a slight adjustment in price. For example, the current premium due will be based in part on the following year's revenue forecast for the insurance provider. For example, for a logistics shipping provider (e.g., USPS, UPS, Fedex, Flexport, DHS, freight forwarders, etc.), the current annual premium due to provide cargo insurance coverage for the cargo delivered for the current year is based on the revenue of the freight forwarder, and not the commodity value insured and it's an annual contract. For example, in many instances, the current annual premium due to provide cargo insurance coverage for the cargo delivered for the current year is payable in 10 installments.

SUMMARY OF DESCRIBED SUBJECT MATTER

In some embodiments, the present disclosure provides an exemplary technically improved computer-based method that includes at least the following steps: receiving, by at least one input interface, input data for an identified data record by a logistics data provider; receiving, by the at least one processor, from a plurality of pre-generated databases, a plurality of predetermined policy parameters associated with at least one provider of a plurality of providers; identifying, by the at least one processor, at least one qualifying provider of the plurality of providers based on a comparison of the input data and the plurality of predetermined policy parameters associated with the identified data records; calculating, by the at least one processor, a respective risk probability value associated with each qualifying provider of the plurality of providers based the comparison of the input data and the plurality of predetermined policy parameters; generating, by the at least one processor, a respective dynamic data model associated with each of the qualifying provider of the plurality of providers based on the input data and the respective determined risk probability value; dynamically determining, by the at least one processor, a predetermined policy risk threshold in real time for the identified data record utilizing the respective dynamic data model and the respective determined risk probability value associated with each qualifying provider of the plurality of providers; automatically modifying, by the at least one processor the predetermined policy risk threshold in real time associated with the at least one qualified provider of the plurality of providers based on a respective model risk probability value; and dynamically selecting, by the at least one processor, a respective data point for each qualified provider of the plurality of providers based on the respective model risk probability value and a modified policy risk threshold in real time for the identified data records.

In some embodiments, the present disclosure provides an exemplary technically improved computer-based system that includes at least the following components of: at least one processor configured to execute software instructions that cause the at least one processor to perform steps to: receive, by at least one input interface, input data for an identified data record that includes goods to be shipped by a logistics data provider; determine, by at least one processor, a plurality of commodity types associated with each identified data record based on the input data; receive, by the at least one processor, from a plurality of pre-generated databases accessible by a digital platform, a plurality of predetermined policy parameters associated with at least one provider of a plurality of providers; identify, by the at least one processor, at least one qualifying provider of the plurality of providers based on a comparison of the input data and the plurality of predetermined policy parameters associated with the identified data records; calculate, by the at least one processor, a respective risk probability value associated with each qualifying provider of the plurality of providers based the comparison of the input data and the plurality of predetermined policy parameters; generate, by the at least one processor, a respective dynamic data model associated with each of the qualifying provider of the plurality of providers based on the input data and the respective determined risk probability value; dynamically determine, by the at least one processor, a predetermined policy risk threshold in real time for the identified data record utilizing the respective dynamic data model and the respective determined risk probability value associated with each qualifying provider of the plurality of providers; receive, by the at least one processor, subsequent data associated with the identified data records or historical data from the plurality of pre-generated databases; generate, using the at least one processor, for each of the one or more qualifying insurance providers, a respective model risk probability value based on real time shipment data or the historical shipment data; automatically modify, by the at least one processor the predetermined policy risk threshold in real time associated with the at least one qualified provider of the plurality of providers based on a respective model risk probability value; and dynamically select, by the at least one processor, a respective data point for each qualified provider of the plurality of providers based on the respective model risk probability value and a modified policy risk threshold in real time for the identified data records.

BRIEF DESCRIPTION OF THE DRAWINGS

Various embodiments of the present disclosure may be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

A better understanding of one or more embodiments of the present invention may be obtained when the following detailed description of the preferred embodiment is considered in conjunction with the following drawings, in which

FIGS. 4E through 4H are respective flow diagrams that illustrate respective methods for training the artificial intelligence device(s) and using the trained artificial intelligence device(s) included in the simulation-based learning PSCI platform.

FIGS. 5A through 5H illustrate a list of insurer/underwriter commodity types and a list of insurer/underwriter transport types utilized by the PSCI platform executing the PSCI software platform according to one or more embodiments of the present disclosure;

FIGS. 5I and 5J illustrate exemplary pre-underwriter PSCI insurance bracket values and commodity price modifier values utilized by the PSCI platform executing the PSCI software platform according to one or more embodiments of the present disclosure;

FIGS. 6A through 6F are graphic representations of exemplary menu architecture for the PSCI platform executing the PSCI software platform according to one or more embodiments of the present disclosure;

FIGS. 7A through 7F are a graphic representation of depicting exemplary embodiments of user information collected in response to one or more user requests transmitted to the PSCI platform executing the PSCI software platform according to one or more embodiments of the present disclosure.

DETAILED DESCRIPTION

Figure 1:
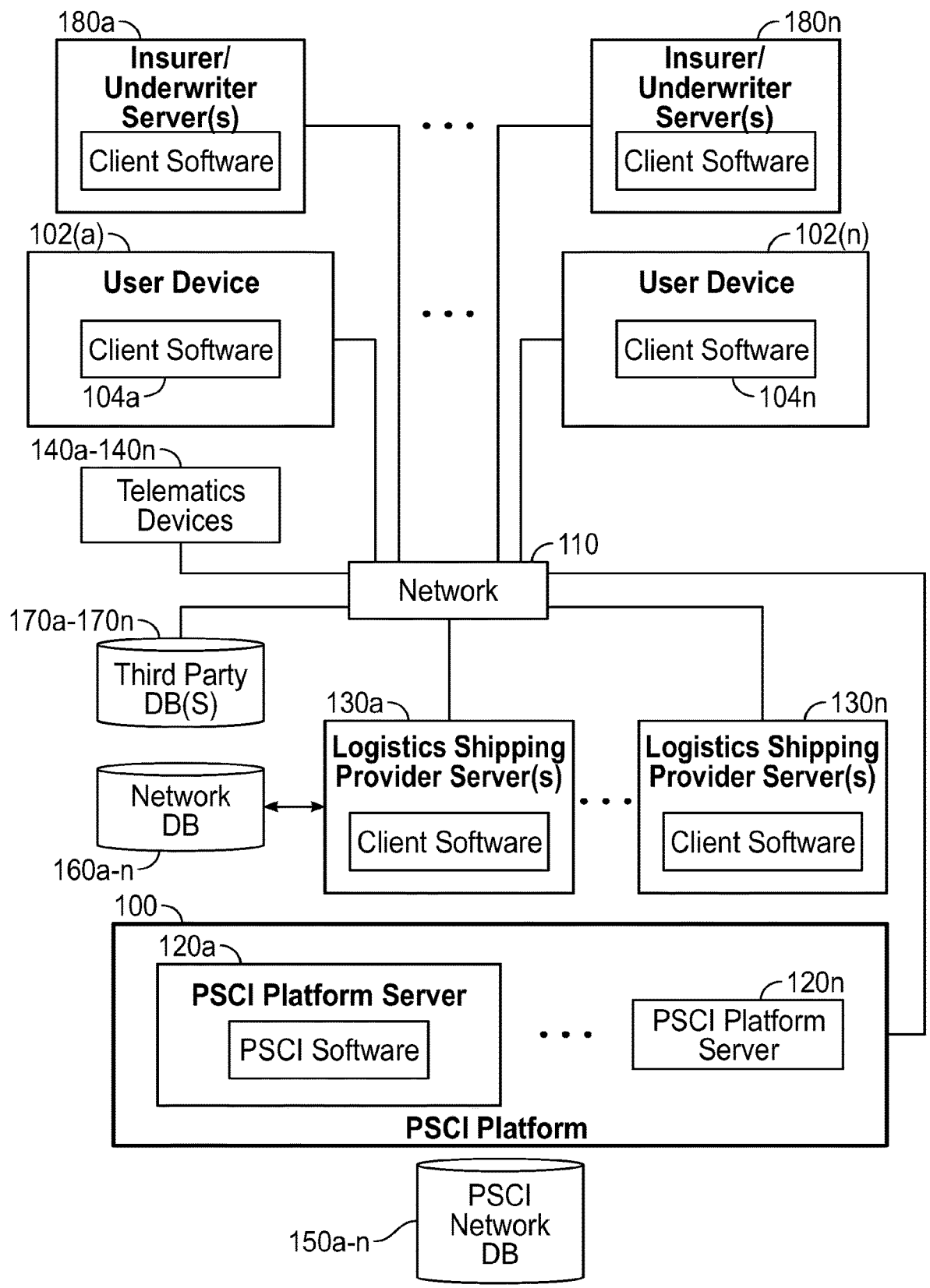
FIG. 1 illustrates an exemplary computer-based system architecture for implementing one or more methods according to embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment," "in one or more embodiments" and "in some embodiments" as used herein do not necessarily refer to the same embodiment(s), though it may. Furthermore, the phrases "in another embodiment," "in one or more other embodiments" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As discussed herein, one or more aspects and/or functionalities included in one or more embodiments may be performed dynamically and/or in real time.

As used herein, the term "dynamically" means that events and/or actions may be triggered and/or occur without any human intervention. In some embodiments, events and/or actions in accordance with the present invention may be in real time and/or based on a predetermined periodicity of at least one of: nanosecond, several nanoseconds, millisecond, several milliseconds, second, several seconds, minute, several minutes, hourly, several hours, daily, several days, weekly, monthly, yearly, etc.

As used in accordance with the aforementioned embodiments, the phrase "real time" is intended to mean that the relevant data is acquired, processed, received, transmitted, and/or displayed at a sufficiently high data rate and at a sufficiently low delay that, for example, objects on a display move smoothly, for example without user-noticeable judder or latency between object motion and display motion, or the receipt of the relevant data should occur at a sufficiently high data rate and at a sufficiently low delay with respect to the acquisition of the relevant data, or the use of the relevant data should occur at a sufficiently high data rate and at a sufficiently low delay with respect to the receipt of the relevant data. For example, the "real time processing," "real time computation," and "real time execution" all pertain to the performance of a computation during the actual time that the related physical process (e.g., a user interacting with an application on a mobile device) occurs, in order that results of the computation may be used in guiding the physical process.

As used in this application, the terms "component" and "system" are intended to refer to a computer-based entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Embodiments of the subject matter described in this document may be implemented in a computing system that includes a back-end component, e.g., as a data server, or that includes a middleware component, e.g., an application server, or that includes a front-end component, e.g., a client computer having a graphical user interface or a Web browser through which a user may interact with an implementation of the subject matter described in this document, or any combination of one or more such back-end, middleware, or front-end components. In one or more embodiments, the components of the system may be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks). For example, specially programmed computing systems with associated devices may be configured to operate in the distributed network environment, communicating with one another over one or more suitable data communication networks (e.g., the Internet, satellite, etc.) and utilizing one or more suitable data communication protocols/modes. For example, as those of ordinary skill in the art also understand, there are many packet protocols. Some of the more well-known packet protocols include such as, without limitation, IPX/SPX, X.25, AX.25, AppleTalk™, TCP/IP (e.g., HTTP), and SNA. Other suitable data communication protocols/modes include near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In one or more embodiments, the NFC may represent a short-range wireless communications technology in which NFC-enabled devices are "swiped," "bumped," "tapped" or otherwise moved in close proximity to facilitate communications.

The operations described in this document may be implemented as operations performed by a data processing apparatus on data stored on one or more computer-readable storage devices or received from other sources. The term "data processing system" encompasses all kinds of apparatus, devices, and machines for processing data, including by way of example a programmable processor, a computer, a server, a system on a chip, or multiple ones, or combinations, of the foregoing. The apparatus may include special purpose logic circuitry, e.g., an FPGA (field programmable gate array) or an ASIC (application-specific integrated circuit). The apparatus may also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment may realize various different computing model infrastructures, such as web services, distributed computing and grid computing infrastructures.

Embodiments of the present disclosure may be implemented in hardware, firmware, software, or any combination thereof. Embodiments of the present disclosure may also be implemented as instructions applied by a machine-readable medium, which may be read and executed by one or more processors. A machine-readable medium may include any mechanism for storing or transmitting information in a form readable by a machine (e.g., a computing device). For example, a machine-readable medium may include random access memory (RAM), one or more processing resources such as a central processing unit (CPU) or hardware or software control logic, ROM, magnetic disk storage media, optical storage media, flash memory devices, electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.). The term "engine" denotes a functional operation that may be embodied either as a stand-alone component or as an integrated configuration of a plurality of subordinate components. Thus, an engine may be implemented as, for example, a single module or as a plurality of modules that operate in cooperation with one another. Moreover, an engine may be implemented as software instructions in memory or separately in any of hardware (e.g., electronic circuitry), firmware, software, or a combination thereof. In one embodiment an engine contains instructions for controlling a processor to execute the functionality described herein.

Examples of hardware elements used in one or more embodiments may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

The term "terminal" as used herein may be referred to as a mobile station (MS), user equipment (UE), a user terminal (UT), a wireless terminal, an access terminal (AT), a terminal, a subscriber unit, a subscriber station (SS), a server, a wireless device, a wireless communication device, a wireless transmit/receive unit (WTRU), a moving node, a mobile, or other terms.

Various embodiments of a terminal may include a cellular phone, a smart phone having a wireless communication function, a personal digital assistant (PDA) having a wireless communication function, a server, a wireless modem, a portable computer having a wireless communication function, a photographing device, such as a digital camera, having a wireless communication function, a gaming device having a wireless communication function, a home appliance for storing and reproducing music that has a wireless communication function, an Internet home appliance capable of performing wireless Internet access and browsing, and portable units or terminals having integrated combinations of the functions thereof. Furthermore, a terminal may include, but is not limited to a machine to machine (M2M) terminal and a machine type communication (MTC) terminal/device. In the disclosure, a terminal may also be referred to as an electronic device.

A computer program (also known as a program, software, software program, software application, script, or code) may be written in any form of programming language, including compiled or interpreted languages, declarative or procedural languages, and it may be deployed in any form, including as a stand-alone program or as a module, component, subroutine, object, or another unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described in this document may be performed by one or more programmable processors executing one or more computer programs to perform actions by operating on input data and generating output. The processes and logic flows may also be performed by, and apparatus may also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. In one or more embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer may be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

Various embodiments may be implemented using software components, hardware components, or a combination of both. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. In one or more embodiments, an exemplary specifically programmed browser application may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In one or more embodiments, a user device may be specifically programmed by either Java, .Net, QT, C, C++ and/or other suitable programming language. Of note, various embodiments described herein may, of course, be implemented using any appropriate hardware and/or computing software languages (e.g., C++, Objective-C, Swift, Java, JavaScript, Python, Perl, QT, etc.).

In one or more embodiments, one or more of exemplary inventive computer-based systems of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), wearable device, mobile internet device (MID), messaging device, data communication device, and so forth.

To provide for interaction with a user, embodiments of the subject matter described in this document may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

In one or more embodiments, the computing system may include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) may be received from the client device at the server. As used herein, the term "server" should be understood to refer to a service point which provides processing, database, and communication facilities. By way of example, and not limitation, the term "server" may refer to a single, physical processor with associated communications and data storage and database facilities, or it may refer to a networked or clustered complex of processors and associated network and storage devices, as well as operating software and one or more database systems and application software that support the services provided by the server. Cloud servers are examples.

In one or more embodiments, as detailed herein, one or more of exemplary inventive computer-based systems of the present disclosure may obtain, manipulate, transfer, store, transform, generate, and/or output any digital object and/or data unit (e.g., from inside and/or outside of a particular application) that may be in any suitable form such as, without limitation, a file, a contact, a task, an email, a tweet, a map, an entire application (e.g., a calculator), etc. In one or more embodiments, as detailed herein, one or more of exemplary inventive computer-based systems of the present disclosure may be implemented across one or more of various computer platforms such as, but not limited to: (1) AmigaOS, AmigaOS 4, (2) FreeBSD, NetBSD, OpenBSD, (3) Linux, (4) Microsoft Windows, (5) OpenVMS, (6) OS X (Mac OS), (7) OS/2, (8) Solaris, (9) Tru64 UNIX, (10) VM, (11) Android, (12) Bada, (13) BlackBerry OS, (14) Firefox OS, (15) iOS, (16) Embedded Linux, (17) Palm OS, (18) Symbian, (19) Tizen, (20) WebOS, (21) Windows Mobile, (22) Windows Phone, (23) Adobe AIR, (24) Adobe Flash, (25) Adobe Shockwave, (26) Binary Runtime Environment for Wireless (BREW), (27) Cocoa (API), (28) Cocoa Touch, (29) Java Platforms, (30) JavaFX, (31) JavaFX Mobile, (32) Microsoft XNA, (33) Mono, (34) Mozilla Prism, XUL and XULRunner, (35) .NET Framework, (36) Silverlight, (37) Open Web Platform, (38) Oracle Database, (39) Qt, (40) SAP NetWeaver, (41) Smartface, (42) Vexi, and (43) Windows Runtime.

In one or more embodiments, exemplary inventive computer-based systems, and/or exemplary inventive computer-based devices of the present disclosure may be configured to utilize hardwired circuitry that may be used in place of or in combination with software instructions to implement features consistent with principles of the disclosure. Thus, implementations of these one more embodiments consistent with principles of the disclosure are not limited to any specific combination of hardware circuitry and software. For example, various embodiments may be embodied in many different ways as a software component such as, without limitation, a stand-alone software package, a combination of software packages, or it cab be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In one or more embodiments, exemplary inventive computer-based systems/platforms, exemplary inventive computer-based devices, and/or exemplary inventive computer-based components of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-10,000,000,000).

In one or more embodiments, exemplary inventive computer-based systems and/or exemplary inventive computer-based devices of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In one or more embodiments, the exemplary inventive computer-based systems and/or the exemplary inventive computer-based devices of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs).

The aforementioned examples are, of course, illustrative and not restrictive.

As used herein, the term "user" shall have a meaning of at least one user. In one or more embodiments, the terms "user", "subscriber" "consumer" or "customer" should be understood to refer to a user of an application or applications as described herein and/or a consumer of data supplied by a data provider. By way of example, and not limitation, the terms "user" or "subscriber" may refer to a person who receives data provided by the data or service provider over the Internet in a browser session, or may refer to an automated software application which receives the data and stores or processes the data.

Under these insurance provider offerings, the installments are due independent of the actual revenue created by the freight forwarder. Additionally, once the price of the installments due for the current year are agreed upon by the logistics shipping provider and the insurance provider, the installments are not adjustable. As detailed herein, one or more of the disclosed embodiments uses a computer based technological solution that determines the risk assessment associated with various activities. As detailed herein, a person having ordinary skill in the art with the benefit of this disclosure appreciates that the present disclosure may be equally applicable to technological solution(s) to provide risk assessment for various activities, including the risk assessment associated with construction activities, maintenance activities, and cargo shipment activities. For example, the present disclosure may be equally applicable to technological solution(s) to provide risk assessment for providing cargo insurance for a predetermined shortened time period (e.g., day, week, month, etc.), and/or a predetermined number (e.g., tens, hundreds, thousands, ten-thousands, hundred-thousands, millions, etc.) and/or range (e.g., ranges with the tens, hundreds, thousands, ten-thousands, hundred-thousands, millions, etc.) of individual cargo shipments.

As such, numerous innovations and improvements are needed to accurately determine risk assessment that considers real time and historical parameters.

Methods, apparatuses, systems, and computer program products are disclosed for a per shipment cargo insurance (PSCI) computer based platform that uses, in one or more embodiments, adaptive machine learning. In one or more embodiments and, optionally, in combination with any embodiment disclosed herein, the one or more embodiments provide a method that includes a neural network that may be trained and utilized to compare simulated pricing models to one or more relevant reference pricing models. In one or more embodiments and, optionally, in combination with any embodiment disclosed herein, the one or more embodiments provide a method that includes a neural network that may be trained and utilized to determine one or more model risk probability values and/or one or more model commodity price modifiers to apply to one or more dynamic pricing models generated for one or more identified cargo shipments to dynamically modify the premiums. In one or more embodiments and, optionally, in combination with any embodiment disclosed herein, the one or more embodiments provide a method that includes a machine learning module engine utilized to apply various machine learning algorithms, techniques, methods, and/or the like to tracked real time shipment data and static historical shipment data compiled in, for example, one or more PSCI databases, third party databases, network databases and/or remote PSCI servers to build models for optimizing a dynamic insurance pricing model generated by a PSCI risk modeling engine to provide an insurance quote to a user of a PSCI platform computer system (referred to herein as PSCI platform). In one or more embodiments and, optionally, in combination with any embodiment disclosed herein, the one or more embodiments provide a method that utilizes a PSCI machine learning engine to discard low quality and/or irrelevant data to simulate improved model cargo shipments for which risk probability values may be generated, thereby conserving memory to reduce storage requirements, and reducing processing overhead. In one or more embodiments and, optionally, in combination with any embodiment disclosed herein, the one or more embodiments provide a method that includes a machine learning module engine utilized to remove low quality and/or irrelevant data, from the data utilized to simulate model cargo shipments, to increase the efficiency of the PSCI machine learning engine and, thus, the computer system that includes the one or more processors configured to execute the PSCI machine learning engine. In one or more embodiments and, optionally, in combination with any embodiment disclosed herein, the one or more embodiments provide a method that includes processes performed by a PSCI machine learning engine and a neural network that improve the operating efficiency of the PSCI platform computer system by removing low quality and/or irrelevant data to avoid processing such low quality and/or irrelevant data. For example, in one or more embodiments, such processes further increase the computational efficiency of the PSCI platform computer system by removing illogical data that would require additional processing cycles to analyze. For example, in one or more embodiments, removing low quality and/or irrelevant data from simulated model cargo shipments generated by a PSCI machine learning engine and input into a neural network reduces the storage requirements associated with the simulated model cargo shipments and the data points utilized as input into the neural network taken from the simulated model cargo shipments. For example, in one or more embodiments, the processes performed by a PSCI machine learning engine and a neural network are directed to one or more improvement(s) in the functioning of a computer, for example, one or more server devices included in the PSCI platform computer system.

In one or more embodiments and, optionally, in combination with any embodiment disclosed herein, the one or more embodiments provide an apparatus that includes a neural network that may be trained and utilized to compare simulated pricing models to one or more relevant reference pricing models. In one or more embodiments and, optionally, in combination with any embodiment disclosed herein, the one or more embodiments provide an apparatus that includes a neural network that may be trained and utilized to determine one or more model risk probability values and/or one or more model commodity price modifiers to apply to one or more dynamic pricing models generated for one or more identified cargo shipments to dynamically modify the premiums. In one or more embodiments and, optionally, in combination with any embodiment disclosed herein, the one or more embodiments provide an apparatus that includes a machine learning module engine utilized to apply various machine learning algorithms, techniques, methods, and/or the like to tracked real time shipment data and static historical shipment data compiled in, for example, one or more PSCI databases, third party databases, network databases and/or remote PSCI servers to build models for optimizing a dynamic insurance pricing model generated by a PSCI risk modeling engine to provide an insurance quote to a user of a PSCI platform computer system (referred to herein as PSCI platform). In one or more embodiments and, optionally, in combination with any embodiment disclosed herein, the one or more embodiments provide an apparatus that utilizes a PSCI machine learning engine to discard low quality and/or irrelevant data to simulate improved model cargo shipments for which risk probability values may be generated, thereby conserving memory to reduce storage requirements, and reducing processing overhead. In one or more embodiments and, optionally, in combination with any embodiment disclosed herein, the one or more embodiments provide an apparatus that includes a machine learning module engine utilized to remove low quality and/or irrelevant data, from the data utilized to simulate model cargo shipments, to increase the efficiency of the PSCI machine learning engine and, thus, the computer system that includes the one or more processors configured to execute the PSCI machine learning engine. In one or more embodiments and, optionally, in combination with any embodiment disclosed herein, the one or more embodiments provide an apparatus that includes processes performed by a PSCI machine learning engine and a neural network that improve the operating efficiency of the PSCI platform computer system by removing low quality and/or irrelevant data to avoid processing such low quality and/or irrelevant data. For example, in one or more embodiments, such processes performed by an apparatus further increase the computational efficiency of the PSCI platform computer system by removing illogical data that would require additional processing cycles to analyze. For example, in one or more embodiments, removing low quality and/or irrelevant data from simulated model cargo shipments generated by a PSCI machine learning engine and input into a neural network reduces the storage requirements associated with the simulated model cargo shipments and the data points utilized as input into the neural network taken from the simulated model cargo shipments. For example, in one or more embodiments, the processes, performed by an apparatus that includes a PSCI machine learning engine and a neural network, are directed to one or more improvement(s) in the functioning of a computer, for example, one or more server devices included in the PSCI platform computer system.

In one or more embodiments and, optionally, in combination with any embodiment disclosed herein, the one or more embodiments provide a method that includes receiving, using an input interface provided by a PSCI platform, shipment details for an identified cargo shipment that includes goods to be shipped by a logistics shipping provider. The method, in one or more embodiments, includes determining, using the at least one processor included in the PSCI platform, a commodity type based upon the shipment details that is indicative of the type of goods included in the identified cargo shipment. The method, in one or more embodiments, includes receiving, using the at least one processor, from one or more databases accessible by the PSCI platform, one or more predetermined respective pre-underwriter policy criteria provided by one or more insurance providers. The method, in one or more embodiments, includes comparing, using the at least one processor, the shipment details to the predetermined respective pre-underwriter policy criteria to identify one or more qualifying insurance providers from the one or more insurance providers. The method, in one or more embodiments, includes determining, using the at least one processor, for each one of the one or more qualifying insurance providers, a respective risk probability value based upon the shipment details and the respective pre-underwriter policy criteria. The method, in one or more embodiments, includes generating, using the at least one processor, for each of the one or more qualifying insurance providers, a respective dynamic pricing model based on the shipment details and the respective determined risk probability value. The method, in one or more embodiments, includes generating, using the at least one processor, for each of the one or more qualifying insurance providers, a respective insurance policy premium in real time for the identified cargo shipment using the respective dynamic pricing model and the respective determined risk probability value; receiving, using the at least one processor, one or more of real time shipment data or historical shipment data from the one or more databases. The method, in one or more embodiments, includes generating, using the at least one processor, for each of the one or more qualifying insurance providers, a respective model risk probability value based on one or more of the real time shipment data or the historical shipment data. The method, in one or more embodiments, includes dynamically modifying, using the at least one processor, for each one of the one or more qualifying insurance providers, the respective insurance policy premium in real time based upon the respective model risk probability value if certain predetermined insurance premium modifying criteria are met to determine a respective modified insurance premium value. The method, in one or more embodiments, includes determining, using the at least one processor, for each of the one or more qualifying insurance providers, a respective insurance quote based upon one of the respective insurance policy premium or the respective modified insurance policy premium in real time for the identified cargo shipment.

In one or more embodiments and, optionally, in combination with any embodiment disclosed herein, the one or more embodiments utilize a PSCI platform that uses, in one or more embodiments, adaptive machine learning. The apparatus, in one or more embodiments, includes a user interface. The apparatus, in one or more embodiments, includes one or more non-transitory memories including one or more accessible databases. The apparatus, in one or more embodiments, includes one or more processors. The apparatus, in one or more embodiments, includes one or more processors that are configured to receive, using an input interface provided by a PSCI platform, shipment details for an identified cargo shipment that includes goods to be shipped by a logistics shipping provider. The apparatus, in one or more embodiments, includes one or more processors that are configured to determine, using at least one processor included in the PSCI platform, a commodity type based upon the shipment details that is indicative of the type of goods included in the identified cargo shipment. The apparatus, in one or more embodiments, includes one or more processors that are configured to receive, using the at least one processor, from the one or more databases accessible by the PSCI platform, predetermined respective pre-underwriter policy criteria provided by one or more insurance providers. The apparatus, in one or more embodiments, includes one or more processors that are configured to compare, using the at least one processor, the shipment details to the predetermined respective pre-underwriter policy criteria to identity one or more qualifying insurance providers from the one or more insurance providers. The apparatus, in one or more embodiments, includes one or more processors that are configured to determine, using the at least one processor, for each of the one or more qualifying insurance providers, a respective risk probability value based upon the shipment details and the respective pre-underwriter policy criteria. The apparatus, in one or more embodiments, includes one or more processors that are configured to generate, for each of the one or more qualifying insurance providers, a respective dynamic pricing model based on the shipment details and the respective determined risk probability value. The apparatus, in one or more embodiments, includes one or more processors that are configured to generate, for each of the one or more qualifying insurance providers, a respective insurance policy premium in real time for the identified cargo shipment using the respective dynamic pricing model and the respective determined risk probability value. The apparatus, in one or more embodiments, includes one or more processors that are configured to receive one or more of real time shipment data or historical shipment data from the one or more databases. The apparatus, in one or more embodiments, includes one or more processors that are configured to generate, for each of the one or more qualifying insurance providers, a respective model risk probability value based on one or more of the real time shipment data or the historical shipment data. The apparatus, in one or more embodiments, includes one or more processors that are configured to dynamically modify, for each one of the one or more qualifying insurance providers, the respective insurance policy premium in real time based upon the respective model risk probability value, if certain predetermined insurance premium modifying criteria are met, to determine a respective modified insurance premium value. The apparatus, in one or more embodiments, includes one or more processors that are configured to determine, for each of the one or more qualifying insurance providers, a respective insurance quote based upon one of the respective insurance policy premium or the respective modified insurance policy premium in real time for the identified cargo shipment.

In one or more embodiments and, optionally, in combination with any embodiment disclosed herein, the one or more embodiments uses a PSCI platform uses a computer program product that includes a computer program product embodied therein. In one or more embodiments, the computer program product executable by a processor included in a PSCI platform includes a computer readable storage medium, that is not a transitory signal, having program code embodied therein. In one or more embodiments, the program code is readable and executable by one or more processors included in a PSCI platform for receiving shipment details for an identified cargo shipment that includes goods to be shipped by a logistics shipping provider. In one or more embodiments, the program code is readable and executable by one or more processors included in a PSCI platform for determining a commodity type based upon the shipment details that is indicative of the type of goods included in the identified cargo shipment. In one or more embodiments, the program code is readable and executable by one or more processors included in a PSCI platform for receiving, from one or more databases accessible by the PSCI platform, one or more predetermined respective pre-underwriter policy criteria provided by one or more insurance providers. In one or more embodiments, the program code is readable and executable by one or more processors included in a PSCI platform for comparing the shipment details to the predetermined respective pre-underwriter policy criteria to identity one or more qualifying insurance providers from the one or more insurance providers. In one or more embodiments, the program code is readable and executable by one or more processors included in a PSCI platform for determining, for each one of the one or more qualifying insurance providers, a respective risk probability value based upon the shipment details and the respective pre-underwriter policy criteria. In one or more embodiments, the program code is readable and executable by one or more processors included in a PSCI platform for generating, for each of the one or more qualifying insurance providers, a respective dynamic pricing model based on the shipment details and the respective determined risk probability value. In one or more embodiments, the program code is readable and executable by one or more processors included in a PSCI platform for generating, for each of the one or more qualifying insurance providers, a respective insurance policy premium in real time for the identified cargo shipment using the respective dynamic pricing model and the respective determined risk probability value. In one or more embodiments, the program code is readable and executable by one or more processors included in a PSCI platform for receiving one or more of real time shipment data or historical shipment data from the one or more databases. In one or more embodiments, the program code is readable and executable by one or more processors included in a PSCI platform for generating, for each of the one or more qualifying insurance providers, a respective model risk probability value based on one or more of the real time shipment data or the historical shipment data. In one or more embodiments, the program code is readable and executable by one or more processors included in a PSCI platform for dynamically modifying, for each one of the one or more qualifying insurance providers, the respective insurance policy premium in real time based upon the respective model risk probability value if certain predetermined insurance premium modifying criteria are met to determine a respective modified insurance premium value. In one or more embodiments, the program code is readable and executable by one or more processors included in a PSCI platform for determining, for each of the one or more qualifying insurance providers, a respective insurance quote based upon one of the respective insurance policy premium or the respective modified insurance policy premium in real time for the identified cargo shipment.

Reference throughout this specification, including the summary, to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but does not necessarily, refer to the same embodiment.

Furthermore, the described features, advantages, and characteristics of an embodiment may be combined in any suitable manner in one or more embodiments. One skilled in the relevant art will recognize and appreciate that the invention may be practiced without one or more of the specific features or advantages of a particular embodiment. In other instances, additional features and advantages may be recognized in certain embodiments that may not be present in all of the disclosed embodiments.

These features and advantages of the present invention will become more fully apparent from the following description and appended claims, or may be learned by the practice of the invention as set forth hereinafter.

FIG. 1 depicts a block diagram of an exemplary architecture of one or more embodiments of system 10 that includes a computer-based Per Shipment Cargo Insurance (PSCI) system/platform 100 and example user devices 102a-102n, one or more logistics shipping providers (e.g., shipping companies, freight forwarders, cargo insurance underwriters, such as DHL, FedEx, USPS, etc.) computer systems (e.g., shipping logistic server devices 130a-130n) and one or more insurer/underwriter (e.g., insurance companies, cargo insurance underwriters) computer systems (e.g., insurer/underwriter server devices 180a-180n) that are configured to interact with the PSCI system/platform 100 over one or more data communication networks 110. In one or more embodiments, the PSCI system/platform 100, the user devices 102a-102n, the shipping logistic server devices 130a-130n, or a combination of the aforementioned are configured to provide insurance policies for individual shipments of cargo at the point of sale to logistical shipping providers (e.g., DHL, FedEx, UPS, USPS) and/or shipping agents and/or other users of the PSCI system/platform 100.

In one or more embodiments and, optionally, in combination with any embodiment disclosed herein, the exemplary computer-based system may be configured to include a PSCI system/platform 100 that is implemented in one or more PSCI platform server devices 120a-120n. Each server device is implemented on one or more computer devices, e.g., on a cluster of computers. In one or more embodiments, the exemplary inventive PSCI platform 100 that may include one or more of the PSCI platform servers devices 120a-120n is configured to execute the exemplary inventive per shipment cargo insurance (PSCI) software. For example, the exemplary inventive PSCI software can provide virtual machines, application programmable interface libraries, and/or other instructions that provide a standard environment in which to execute the PSCI software that utilizes a real time risk engine to determine insurance rates globally utilizing internal and external data sources. For example, in one or more embodiments, risk models, that consider the weather, global conflict, and/or other factors that can impact the shipment, are adjusted in real time to present optimal insurance rates to shipping logistics companies and other users of the PSCI system/platform 100. In this manner, the PSCI platform 100 provides the ability for individual shipments of cargo to be insured in an efficient and accurate manner.

One or more of the shipping logistic server devices 130a-130n is implemented on one or more computer devices, e.g., on a cluster of computers. In one or more embodiments, one or more of the shipping logistic server devices 130a-130n is configured to utilize the PSCI system/platform 100 to determine the insurance costs associated with the shipment of cargo (e.g., per shipment insurance) in real time and/or at the time of contracting with the owner (e.g., owner/consignor/consignee) of the cargo to ship the cargo. For example, shipping logistic providers, such as FedEx, DHL, UPS, USPS, etc. can utilize the PSCI platform 100 to provide its customers shipping insurance on a per shipment bases in real time and/or at the time of contracting with the owner.

One or more of the insurer/underwriter server devices 180a-180n is implemented on one or more computer devices, e.g., on a cluster of computers. In one or more embodiments, one or more of the insurer/underwriter server devices 180a-180n is configured to utilize the PSCI platform 100 to provide insurance policies for individual commodity types of cargo for shipment by a logistics shipping provider (e.g., per shipment insurance). These insurance policies may be accessed and are utilized by the PSCI platform provided to provide a quote for insurance coverage for the one or more individual shipments to the consignor of the cargo in real time, in near real time, or at the time the consignor contracts with the logistics shipping provider to ship the cargo. For example, shipping logistic providers, such as FedEx, DHL, UPS, USPS, etc. can utilize the PSCI system/platform 100 to provide its customers a quote for insurance coverage of the cargo shipping that is underwritten by one or more third party insurance companies and/or underwriters, on a per shipment bases in real time, or in near real time, and/or at the time of entering into a contract to ship the cargo.

For example, in one or more embodiments, the PSCI platform server devices 120a-120n, insurer/underwriter server devices 180a-180n and/or the shipping logistic server devices 130a-130n are a web server (or a series of servers) running a network operating system. For example, one or more of the PSCI platform server devices 120a-120n, the insurer/underwriter server devices 180a-180n and/or the shipping logistic server devices 130a-130n may include but are not limited to Microsoft Windows Server, Novell NetWare, or Linux. In one or more embodiments, one or more of the PSCI platform server devices 120a-120n, the insurer/underwriter server devices 180a-180n and/or the shipping logistic server devices 130a-130n may be used for and/or provide cloud and/or network computing. Although not shown in FIG. 1, in some embodiments, the PSCI platform server devices 120a-120n, insurer/underwriter server devices 180a-180n and/or the shipping logistic server devices 130a-130n may have connections to external systems like email, SMS messaging, text messaging, ad content providers, etc. In one or more embodiments, any of the features of the PSCI platform server devices 120a-120n may be also implemented in the shipping logistic server devices 130a-130n and vice versa.

In one or more embodiments, one or more of the PSCI platform server devices 120a-120n, the insurer/underwriter server devices 180a-180n and/or the shipping logistic server devices 130a-130n may be specifically programmed to perform, in non-limiting example, as authentication servers, search servers, email servers, social networking services servers, SMS servers, IM servers, MMS servers, exchange servers, photo-sharing services servers, advertisement providing servers, insurance/underwriting services servers, financial/banking-related services servers, travel services servers, or any similarly suitable service-base servers.

In one or more embodiments and, optionally, in combination of any embodiment described above or below, for example, one or more exemplary user devices 102a-102n, the PSCI platform server devices 120a-120n, the insurer/underwriter server devices 180a-180n and/or the shipping logistic server devices 130a-130n may include a specifically programmed software module that may be configured to send, receive and process information using a scripting language, an email, a remote procedure call, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination of the aforementioned. In one or more embodiments and, optionally, in combination with any embodiment disclosed herein, one or more processors, included within one more PSCI platform server devices 120a-120n, the insurer/underwriter server devices and/or shipping logistic server devices 130a-130n, execute PSCI software program(s) disclosed herein to perform functions and functionality, including computing criterion required to provide an insurance policy for one or more particular shipments.

In one or more embodiments, users of the PSCI system/platform 100 may use user devices 102a-102n, which client software 104a-104n is installed, to use the PSCI system/platform 100 to perform various functionality, including providing shipping information concerning one or more cargo shipments, request cargo insurance for the relevant shipment(s), receive a cargo insurance quote(s) for the relevant shipment(s), and/or accept cargo insurance for the relevant shipment(s). In one or more embodiments, users may use user devices 102a-102n, which client software 104a-104n is installed, to access PSCI software installed on one or more shipping logistic server devices 130a-130n to perform various functionality, including providing shipping information concerning one or more cargo shipments, request cargo insurance for the relevant shipment(s), receive a cargo insurance quote(s) for the relevant shipment(s), and/or accept cargo insurance for the relevant shipment(s). In one or more embodiments, users of the PSCI system/platform 100 may use shipping logistic server devices 130a-130n, which client software 134a-134n is installed, to use the PSCI system/platform 100. In other embodiments, one or more of the user devices 102a-102n and/or the shipping logistic server devices 130a-130n have client software installed thereon to allow a user(s) to use the PSCI system/platform 100 to perform one or more functions described herein. In one or more embodiments, users access and browse the Internet using a web browser that generally resides and is executed on the user device 102. The web browser is a computer program or set of computer instructions that allows the Shipper/user to retrieve and render hyper-media content from one or more Server computers, e.g., one or more servers 130a-130n, available over the web. In one or more embodiments, users may interact with the PSCI system/platform 100 using the respective client software on their respective user devices. In one or more other embodiments, a user may have client software installed on their user devices that are configured to access the exemplary inventive PSCI system/platform 100 that includes an integrated API (e.g., PSCI API 401) that is configured to enable authorized users to enter information (e.g., shipping information, shipment details, log-in/password information (e.g., authentication and other information disclosed herein) etc.), and request information from the PSCI platform 100. For example, an authorized user may be an account holder of an account, or an authorized user of an account, on the PSCI system/platform 100. The PSCI system/platform 100 may have millions of accounts of individuals, businesses, or other entities, e.g., pseudonym accounts, novelty accounts, etc. For example, in one or more embodiments, PSCI API 401 may be configured as integration software implemented on a website, that provides one or more graphic user interfaces (GUIs) that allow authorized users to enter information that may be received by the PSCI platform 100 and/or receive information provided by the PSCI platform 100, or more intermediary servers on the world wide web, other website owner, or on one or more PSCI server devices 120a-120n. For example, in one or more embodiments, PSCI API 401 may be used to facilitate integration and communication between the PSCI platform 100 and one or more of a website, one or more user devices 102a-102n, one or more logistics shipping provider server devices 130a-130n, and/or one or more insurer/underwriter server devices 180a-180n.

In one or more embodiments, insurance companies and/or underwriters may utilize one or more of the insurer/underwriter server devices 180a-180n, which client software 104a-104n is installed, to access the exemplary inventive PSCI platform 100 executing the exemplary PSCI software to perform various functionality, including providing shipping information concerning one or more cargo shipments and/or commodity types of cargo included in the cargo shipments, provide insurance quotes concerning one or more cargo shipments and/or commodity types of cargo included in the cargo shipments, provide, for example, pricing and premium information (e.g., commodity price modifier(s), and/or risk probability value(s) discussed herein) and/or other information (e.g., what commodity types of cargo (i.e., commodity types of cargo) are insurable, the desired premiums required to provide insurance coverage for each commodity type of cargo, areas for which coverage will be provided and/or excluded), maximum coverage available, a company logo, etc.) (collectively referred to herein as insurer/underwriter information) that is utilized by the PSCI system/platform 100 to provide a quote for cargo insurance for the relevant shipment(s), and/or decline cargo insurance for the relevant shipment(s), and/or other information. In one or more embodiments, users of the insurer/underwriter server devices 180a-180n may access and browse the Internet using a web browser, that generally resides and is executed on the insurer/underwriter server devices 180a-180n, to access the exemplary inventive PSCI platform 100 executing the exemplary PSCI software to perform various functionality, including providing insurer/underwriter information that is utilized by the PSCI system/platform 100 to provide a quote for cargo insurance for the relevant shipment(s), and/or decline cargo insurance for the relevant shipment(s). The web browser is a computer program or set of computer instructions that allows the Shipper/user to retrieve and render hyper-media content from one or more Server computers, e.g., one or more servers 180a-180n, available over the web. In one or more embodiments, users (e.g., insurance providers, underwriters, etc.) may interact with the PSCI system/platform 100 using the respective client software on their respective servers devices 180a-180n. A user may be an account holder of an account, or an authorized user of an account, on the PSCI system/platform 100. The PSCI system/platform 100 may have millions of accounts of individuals, businesses, or other entities, e.g., pseudonym accounts, novelty accounts, etc.

In one or more embodiments, a user device 102a-102n may be any computing device capable of receiving and sending a message over a network (e.g., cloud network), such as data communications network(s) 110, to and from another computing device, such as PSCI platform server devices 120a-120n and/or the shipping logistic server devices 130a-130n, each other, and the like. For example, the user device may be connected to the Internet through a network, such as a mobile network, through an Internet service provider (ISP), or otherwise. In one or more embodiments, the user devices 102a-102n may be personal computers, multiprocessor systems, microprocessor-based or programmable consumer electronics, network PCs, and the like. In one or more embodiments, one or more user devices 102a-102n may include computing devices, that typically connect to a network using a wireless communications medium, such as cell phones, smart phones, pagers, walkie talkies, radio frequency (RF) devices, infrared (IR) devices, CBs, integrated devices combining one or more of the preceding devices, or virtually any mobile computing device, and the like. For example, one or more user devices 102a-102n may include, but are not limited to, for example, a laptop or desktop computer, a smartphone, or an electronic tablet. In one or more embodiments, one or more user devices 102a-102n may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In one or more embodiments, one or more user devices 102a-102n may run one or more applications, such as Internet browsers, mobile applications, voice calls, video games, videoconferencing, and email, among others. In one or more embodiments, one or more user devices 102a-102n may be configured to receive and to send web pages, and the like. In some embodiments, an exemplary specifically programmed browser application may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In one or more embodiments, a user device 102a-102n may be specifically programmed by either Java, .Net, QT, C, C++ and/or other suitable programming language. In one or more embodiments, one or more user devices 102a-102n may be specifically programmed to include or execute an application to perform a variety of possible tasks, such as, without limitation, messaging functionality, browsing, searching, playing, streaming or displaying various forms of content, including locally stored or uploaded messages, images and/or video, and/or games.

In one or more embodiments, one or more user devices 102a-102n and/or one or more of the shipping logistic server devices 130a-130n is configured with software, which will be referred to as a client or as client software 104a-104n, that enables the user device in operation to access the PSCI system/platform 100 so that a user may send, post and/or receive information and/or interact with data fields to enter information in the data fields to send the same in response to one or more requests for information. For example, in one or more embodiments, the client residing on one or more user devices 102a-102n and/or one or more of the shipping logistic server devices 130a-130n may be a web browser or an HTML (hypertext markup language) document rendered by a web browser. In one or more embodiments, the client may be JavaScript code or Java code. In one or more embodiments, the client may be dedicated software, e.g., an installed app or installed application, that is designed to work specifically with the PSCI system/platform 100. In one or more embodiments, the client may be or include, for example, a Short Messaging Service (SMS) interface, an instant messaging interface, an e-mail-based interface, or an API function-based interface.

In one or more embodiments, the one or more data communication networks 110 (and 270, disclosed with reference to FIG. 2) may include, but not be limited to, any one of a combination of different types of suitable communications networks such as, for example, broadcasting networks, cable networks, public networks (e.g., the Internet), private networks, wireless networks, cellular networks, or any other suitable private and/or public networks. Further, any of the one or more data communication networks 110 (and 270, disclosed with reference to FIG. 2) may have any suitable communication range associated therewith and may include, for example, global networks (e.g., the Internet), metropolitan area networks (MANs), wide area networks (WANs), local area networks (LANs), or personal area networks (PANs). In addition, any of the one or more data communication networks 110 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

In one or more embodiments, the one or more data communication networks 110 (and 270, disclosed with reference to FIG. 2) may provide network access, data transport and/or other services to computing devices coupled to it. In one or more embodiments, the one or more data communication networks 110 (and 270, disclosed with reference to FIG. 2) may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

In one or more embodiments, the PSCI system/platform 100 is configured to access, over one or more data communication networks 110, one or more databases 150(1)-(n), one or more logistic provider databases 160(a)-(n), and/or one or more third party databases 170(a)-(n). For example, third party databases 170(a)-(n), connected to network 110 and/or a third party insurance provider system(s) via network 110, may be accessible by the PSCI platform 100 to access one or more insurance policies directed to individual logistics shipping providers. One or more databases 150(1)-(n), logistic provider databases 160(a)-(n), and/or third party databases 170(a)-(n) may be any type of database, including a database managed by a database management system (DBMS). In one or more embodiments, an exemplary DBMS-managed database may be databases implemented in database management systems (DBMS) such as, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data. For example, the database may be relational, such as primary key driven, or a post-relational or in-memory. For example, when a record comprises a primary key, such as a unique identifier, then that record may be clustered in a set or sub-clustered into a sub-set based on the unique identifier, where each of the set or the sub-set is also associated with a unique identifier specifically generated for that set or sub-set. Note that although each of the records in a database may be a line comprising a with a plurality of columns, other ways of organizing records may be used, such as non-structured data.

With reference to FIG. 1, one or more embodiments of the system 10 is provided and includes one or more telecommunication and/or telematics devices 140(a)-(n) that are configured to collect, store and/or transmit data concerning objects and/or entities, such as for example, shipment cargo, operational data concerning equipment utilized to ship shipment cargo, operational data concerning the equipment, and/or sensor data (discussed herein) in real-time to the PSCI system/platform 100 over one or more data communication networks 110. For example, in one or more embodiments, one or more telecommunication and/or telematics devices 140(a)-(n) are configured to transmit sensor data generated by one or more sensor devices (e.g., 290, see FIG. 2) to one or more databases 150a-150n, 160a-160n, and/or 170a-170n accessible via PSCI platform server devices 120a-120n and/or the shipping logistic server devices 130a-130n. For example, the sensor data is received by remote sensors, sensor data including environmental, contextual, behavioral, psychological, and/or other cargo shipment related data. The telecommunication and/or telematics devices 140(a)-(n) are configured to collect, store and/or send/transmit telematics information concerning an object (i.e., inanimate or biological, such as, for example, cargo included in the cargo shipment and or shipping personnel), and/or an entity, and/or an environment (e.g., geographical environment, and/or packaging, container, ship and/or transport within which the cargo is contained or transported), and/or a context within which the object and/or entity is contained or transported, upon which the object and/or entity is placed or traveling, and/or by which the object and/or entity is impacted. Such telematics information collected, stored and/or sent/transmitted by the telecommunication and/or telematics devices 140(a)-(n) about an object and/or entity, for example, may include but is not limited to an object and/or entity's condition, behavior, value, movement, health and/or safety. Such telematics information about an environment for example, may include but is not limited to weather conditions (e.g., sunny, clear, partially cloudy, cloudy, overcast, rain, drizzle, sleet, snow, stormy, moisture, humidity, temperature, dew point, atmospheric pressure and density, wind, clouds, precipitation, evaporation, atmospheric stability, frost, radiation and other meteorological parameters etc.), and/or environmental conditions (e.g., moisture, humidity, air, water, temperature, pollution, emissions, waste, water transportation conditions, cargo shocks, rail transportation conditions, road transportation conditions, air transportation conditions, etc.). Such telematics information about transportation contextual information, for example, may include but is not limited to the condition of a roadway, railway, waterway, airway, etc. which, for example, may be the depth of a water channel, the condition of a roadway (e.g., slick, wet, dry, surface conditions, etc.), the condition of one or more street lights and/or stop lights and/or intersections disposed on a roadway, the conditions of an airway (e.g., turbulence, visibility, humidity, etc.), the conditions of a railway, the condition of a cargo, the estimated value of a cargo, information concerning damage with respect to a cargo and/or a method of transportation (e.g., roadway, waterway, airway, railway, etc.) or any other condition of a mode of transportation that may be utilized to transport an object and/or entity.

The term "telematics" is commonly associated with the use of Global Positioning Systems (GPS) technology that is commonly used in automotive navigations systems whereby telematics data is collected, stored and extracted from/transmitted by vehicle embedded platforms/hardware devices (e.g., devices such as sensors installed by the original equipment manufacturer (OEM), via an on-board diagnostics (OBD) self-install or a mobile device). The present disclosure is not limited to such technology, but rather the telematic devices 140(a)-(n) are meant to encompass and may include a broad array of devices, including but not limited to vehicle navigation systems and/or sensors, that are used to collect, store, and send information about objects and/or entities. In one or more embodiments, the telecommunication and/or telematics devices 140(a)-(n) may include but are not limited to mobile devices, GPS devices, and the like, but also include other devices that may be associated with objects and/or entities, such as RFID tags, sensor devices, accelerometer devices, or small scale radio transceivers, to track movement, behavior, condition, and/or health of an object and/or entity.

In addition, it is noted that telecommunication and/or telematics devices 140a-140n, in one or more embodiments, may also include a device that is not specifically associated with a biological entity, but nevertheless is capable of collecting, storing, and/or sending information about a living thing or object, such as shipping personnel tasked with the management, collection, transport and/or storage of a cargo. An example would be a surveillance camera or traffic camera, a microphone, light and/or electromagnetic sensor, and/or a plurality of such devices working in concert. Another example of telecommunication and/or telematics devices 140a-140n that are capable of collecting, storing, and/or sending biometric information about an individual includes but is not limited to a blood pressure monitor, a heart rate monitor, a scale, a breathalyzer device, a skin elasticity monitor, a wearable computing device (e.g., a smart watch device), etc. The telecommunication and/or telematics devices 140a-140n may comprise a single device or a plurality of devices working individually or in concert to collect, store, and/or send information about the behavior or movement of a an object and/or entity.

In one or more embodiments, the PSCI system/platform 100 may acquire telematics data over the one or more data communication networks 110 from one or more third party database/services 170a-170n, which acquired data is leveraged to add one or more contextual aspects, including, but not limited to, global conflict data (e.g., intelligence, information, trends, etc.), traffic data (e.g., intelligence, information, trends, etc.) and/or weather data (e.g., intelligence, information, trends, etc.) and/or information concerning the cargo itself (e.g., value, damage to the cargo, depreciation/appreciation in value, cargo attributes (weight, height, width, container/packaging/restraint/transport requirements, etc.), with regards to the calculation and determination of per shipment insurance coverage, as discussed herein concerning the analysis of the collected telematics data.

Those of ordinary skill in the art will appreciate that the hardware, firmware/software utility, and software components and basic configuration thereof depicted in the figures referenced herein may vary. For example, the illustrative components of PSCI platform 100 are not intended to be exhaustive, but rather are representative to highlight some of the components that are utilized to implement certain of the described embodiments. For example, different configurations of PSCI platform 100 may be provided, containing other devices/components, which may be used in addition to or in place of the hardware depicted, and may be differently configured. The depicted examples are therefore not meant to imply architectural or other limitations with respect to the presently described embodiments and/or the general invention.

Figure 2:
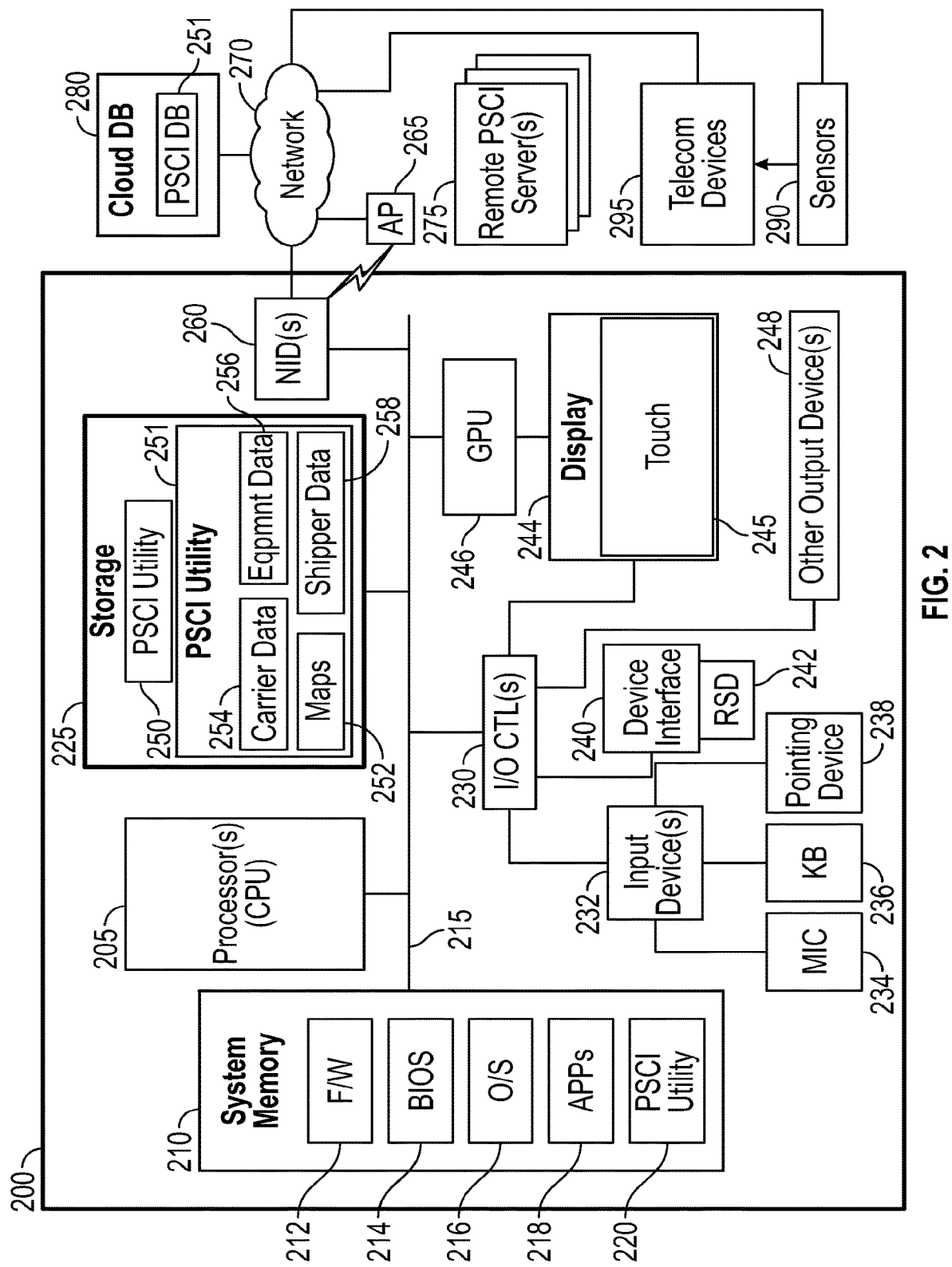
FIG. 2 illustrates an exemplary data processing system that functions in a networked computing device and/or server providing a cloud infrastructure supporting implementation of a PSCI platform executing the PSCI software platform according to one or more embodiments of the present disclosure.

Referring now to the figures, and beginning with FIG. 2, there is illustrated a block diagram representation of an example PSCI data processing system (PSCI DPS) that operates as a networked computing device and/or server providing the cloud infrastructure supporting implementation of a per shipment cargo insurance (PSCI) framework, according to one or more embodiments. PSCI DPS 200 is an exemplary embodiment of the PSCI platform 100 that includes one or more computing device(s) that are configured to execute the exemplary inventive PSCI software disclosed herein to perform one or more of the described features of the various embodiments of the disclosure of the PSCI system/platform 100 disclosed with reference to FIG. 1. In one embodiment, PSCI DPS 200 may be any electronic device such as, but not limited to, a desktop computer, notebook computer, or a server. In one embodiment, PSCI DPS 200 may be one sever within a cluster of servers, where the servers may be in co-located in a single location or geographically dispersed over a plurality of locations, or a combination thereof. Additionally, in one embodiment, PSCI DPS 200 may be implemented as a virtual machine sharing hardware resources of a physical server.

In one or more embodiments, exemplary PSCI DPS 200 includes one or more processors or central processing units (CPUs) 205 coupled to system memory 210, non-volatile storage 225, and input/output (I/O) controllers 230 via system interconnect 215. In one or more embodiments, system interconnect 215 may be interchangeably referred to as a system bus. For example, in one or more embodiments, memory 210 may be operatively coupled to one or more processors 105. Memory 210 may be a non-transitory medium configured to store various types of data. For example, memory 210 may include one or more memory devices that comprise secondary storage, read-only memory (ROM), and/or random-access memory (RAM). The secondary storage is typically comprised of one or more disk drives, optical drives, solid-state drives (SSDs), and/or tape drives and is used for non-volatile storage of data. In certain instances, the secondary storage may be used to store overflow data if the allocated RAM is not large enough to hold all working data. The secondary storage may also be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions.

In one or more embodiments, one or more software and/or firmware modules may be loaded into system memory 210 (from storage 225 or other source) during operation of PSCI DPS 200. Specifically, in the illustrative embodiment, system memory 210 is shown having therein a plurality of common modules, including firmware (F/W) 212, basic input/output system (BIOS) 214, operating system (OS) 216, and application(s) 218. Additionally, system memory 210 includes PSCI utility 220. PSCI utility 220 may be provided as one of applications 218 and/or as an executable component within firmware F/W 212 or operating system OS 216, in alternate embodiments. The exemplary and inventive PSCI software and/or firmware modules within system memory 210 provide varying functionality when their corresponding program code is executed by one or more processors (e.g., CPUs) 205 or by secondary processing devices (not specifically shown) within the processing layer of the PSCI DPS 200.

In one or more embodiments, I/O controllers 230 support connection by and processing of signals from one or more connected input device(s) 232, of which, by way of example, microphone 234, keyboard 236, and pointing device 238 are illustrated. Pointing/Touch device 238 may be, for example, a mouse or a touch pad, or stylus. It is appreciated that input devices may also include, as a non-exclusive list, hardware button(s), touch screen 245, infrared (IR) sensor, fingerprint scanner, and the like. In one or more embodiments, I/O controllers 230 also support connection with and forwarding of output signals to one or more connected output devices, including display 244 and other output devices 248. Display 244 may include a touch screen 245 that serves as a tactile input device. In one embodiment, PSCI DPS 200 also includes a graphics processing unit (GPU) 246, which is communicatively or physically coupled to Display 244 and to one or more processors 205. GPU 246 controls the generation and presentation of certain user interfaces (UIs) that are created during execution of PSCI utility 220 by CPU 205.

Additionally, in one or more embodiments, one or more device interfaces 240, such as a universal serial bus (USB), Personal Computer Memory Card International Association (PCMIA) slot, an optical reader, a card reader, and/or a high-definition multimedia interface (HDMI), may be associated with PSCI DPS 200. For example, device interface(s) 240 may be utilized to enable data to be read from or stored to corresponding removable storage device(s) (RSD) 242, such as a compact disk (CD), digital video disk (DVD), flash drive, or flash memory card. In one or more embodiments, device interfaces 240 may further include System Management Bus (SMBus), General Purpose I/O interfaces, such as Inter-Integrated Circuit (FC), and peripheral component interconnect (PCI) buses. In accordance with one or more embodiments, the functional modules described herein as aspects of the disclosure may be provided as a computer program product. The computer program product includes removable storage device(s) 242 as a computer readable storage medium, on which is stored program code when executed by one or more processors causes the one or more processors to implement the various functions described herein, including, but not limited to, the features and functionality presented with reference to FIGS. 1 through 8.

In one or more embodiments, PSCI DPS 200 further includes network interface device (NID) 260, which, for example, may include both wired and wireless networking devices. NID 260 enables PSCI DPS 200 and/or components within PSCI DPS 200 to communicate and/or interface with other devices, services, and components that are located external to PSCI DPS 200. In one or more embodiments, PSCI DPS 200 may directly connect to one or more of these external devices, via NID 260, such as via a direct wire or wireless connection. In one or more embodiments, PSCI DPS 200 connects to specific external devices, services, and/or components, such as information server(s) 275 and Cloud database 280, via external network 270, using one or more communication protocols. In one or more embodiments, PSCI DPS 200 connects to external sensors 290(*a*)-(*n*) via external network 270. Network 270 may be a local area network, wide area network, personal area network, and the like, as described herein, and the connection to and/or between network 270 and PSCI DPS 200 may be wired or wireless (via access point 265), including a telecommunications network, cellular network, satellite linked network, or a combination thereof. For purposes of discussion, network 270 is indicated as a single collective component for simplicity. However, it is appreciated that network 270 may comprise one or more direct connections to other devices as well as a more complex set of interconnections as may exist within a wide area network, such as the Internet. In one embodiment, CSIST framework is accessible via the Internet (270) as a website having one or more domain names affiliated therewith.

As one aspect of the disclosure, PSCI utility 250 includes a plurality of functional modules that execute on CPU 205 to perform specific functions, and these functional modules utilize and/or generate specific data, which data is stored as information and/or data within storage 225 and/or within cloud database 280. As an example, storage 225 is shown to include PSCI database 251, which includes different blocks of data, including but not limited to, for example, shipment data 252, cargo data 253, maps 254, logistics provider data 255, equipment data 256, and underwriter data 257. Also, cloud database 280 is shown to include a copy of PSCI database 251. In one or more embodiments, both PSCI databases 251 disposed within storage 225 and cloud database 280 store relevant data utilized by PSCI utility 220 to perform the personalization of certain user interfaces (UIs), provide data collected by one or more sensors 290, provide data concerning the environment, the weather, global conflict, trends, date, time, cultural events, mapping information and/or any other data that may impact a cargo shipment at its origin, destination, and/or along the shipping route, and locating of trucks and/or shipments on a displayed map. Access to the PSCI database 251 and the remote cloud DB 280 may be provided via the connection through network 270.

In one or more embodiments, telecommunication and/or telematics devices 295 are configured to access PSCI DPS 200 via network 270. The telecommunication devices 295 may be any portable device, such as a cell phone (which includes a "smartphone"), PDA, laptop computer, Blackberry, or other portable, telemetric device suitable for receiving and/or transmitting data to/from PSCI DPS 200 via network 270. As disclosed herein, in one or more embodiments, the telematics devices 140(*a*)-(*n*) may include but are not limited to mobile devices such as those disclosed above with respect to the telecommunication devices, GPS devices, and the like, but also include other devices that may be associated with objects and/or entities, such as RFID tags, sensor devices, accelerometer devices, or small scale radio transceivers, to track movement, behavior, condition, and/or health of an object and/or entity. For example, the transmitted or received data may include remote sensor data generated or transmitted by one or sensor devices 290(*a*)-(*n*), disclosed herein. In one or more embodiments, the data received by telecommunication and/or telematics devices 295 is stored within storage 225 and or on the cloud database 280 to, for example, be accessible by one of more of the application(s) 218 and/or PSCI utility 220 residing in the PSCI database 251 within storage 225, and/or within cloud database 280. In one or more embodiments, the telecommunication and/or telematics devices 295 may be a fixed transmission device that resides at a facility, or known-point along a transportation route. For example, in one or more embodiments, one or more of the telecommunication and/or telematics devices 295 may be configured to transmit the remote sensory data generated and/or transmitted by one or more shipment sensor devices 310(*a*)-(*n*), discussed herein, using any wireless communication modes, such as, without limitation: NFC, RFID, Narrow Band Internet of Things (NBIOT), 3G, 4G, 5G, GSM, GPRS, WiFi, WiMax, CDMA, satellite, ZigBee, and other suitable communication modes.

In one or more embodiments and, optionally, in combination of any embodiment described herein, the exemplary inventive computer-based PSCI system may be configured to include a network of environmental and/or shipment sensors 290. In one or more embodiments, one or more telecommunication and/or telematics devices 295 transmit the remote sensor data generated by the one or more sensors 290 to storage 225 and/or cloud database 280 via network 270. In some embodiments, additional hardware-based devices may be connected to the storage 225 and/or cloud database 280 to enable the remote sensor data to be processed via one or more processors 205 of DPS 200 to compute quality metrics from the environmental data and/or the shipment data and then store the quality metrics data in the storage 251, in PSCI database 251 within storage 225 and/or within cloud database 280. In some embodiments, the one or more processors 205 residing within the exemplary inventive PSCI platform execute the exemplary inventive PSCI computer program, discussed herein, residing in system memory 210 to perform the functionality disclosed herein (e.g., functionality disclosed with reference to FIGS. 1-8). In one or more embodiments, the network of remote sensors 290 are configured to operate in the distributed network environment, communicating over a suitable data communication network 270 (e.g., the Internet, a telecommunications network, a combination of suitable data communication networks, etc.) and utilizing at least one suitable data communication protocol (e.g., IPX/SPX, X.25, AX.25, AppleTalk™, TCP/IP (e.g., HTTP), etc.). Of note, the embodiments described herein may, of course, be implemented using any appropriate hardware and/or computing software languages. In this regard, those of ordinary skill in the art are well versed in the type of computer hardware that may be used, the type of computer programming techniques that may be used (e.g., object oriented programming), and the type of computer programming languages that may be used (e.g., C++, Objective-C, Swift, Java, JavaScript). The aforementioned examples are, of course, illustrative and not restrictive.

Figure 3A:
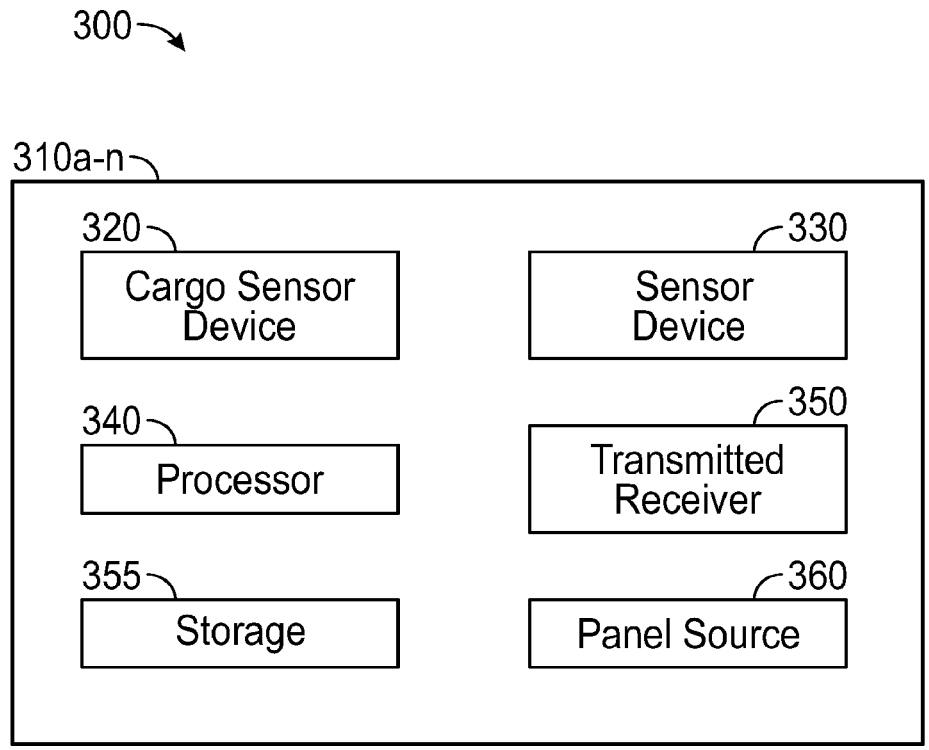
FIGS. 3A and 3B are block diagram representations of exemplary sensor(s) utilized in accordance with one or more embodiments of the present disclosure.

FIG. 3A is a block diagram illustrating an exemplary shipment sensor system 300 including one or more shipment sensor devices 310(*a*)-(*n*), according to one or more embodiments. In one or more embodiments, on or more of the illustrated shipment sensor device(s) 310(*a*)-(*n*) include the following: one or more cargo sensor devices 320 and/or one or more sensor device(s) 330; one or more processors 340 (e.g., signal processor, microprocessor), and one or more transmitters/receivers 350. In one or more embodiments, one or more of the shipment sensor devices 310(*a*)-(*n*) include a power source 360. In one or more embodiments, one or more of the illustrated cargo sensor devices 320 are intended primarily for use in association with the shipment of cargo and/or monitoring environmental conditions that may impact the cargo during the management, handling and/or transport of the cargo. In one or more embodiments, one or more of the illustrated sensor devices 330 are intended primarily for use in association with the monitoring of human activity, including the personnel that are handling and/or transporting the cargo, during the management, handling and/or transport of the cargo. In one or more embodiments, one or more of the cargo sensor device(s) 320 are directly attached to the cargo. In one or more embodiments, the cargo sensor device(s) 320 monitor certain conditions at a distance from the cargo. In one or more embodiments, one or more of the sensor device(s) 330 are directly attached to shipper personnel as a mountable sensor device and/or a wearable sensor device. In one or more embodiments, one or more of the sensor device(s) 330 monitor certain conditions at a distance from the shipment personnel.

The exemplary sensor unit of the present disclosure may also include a control board (not shown) configured to allow communication exchange between one or more of the sensor modules and one or more microprocessors (207), programmed to operate the sensor modules. The exemplary sensor unit of the present disclosure may also include a battery (not shown). The exemplary sensor unit of the present disclosure may also include data memory storage (208) (e.g., an SD card).

For example, in one or more embodiments and, optionally, in combination with any embodiment disclosed herein, the one or more shipment sensor devices 310(*a*)-(*n*) may serve as an environmental sensor or a sensor. For example, in one or more embodiments and, optionally, in combination with any embodiment disclosed herein, the one or more shipment sensor devices 310(*a*)-(*n*) may be any compact sensor for monitoring, in real time or near real time, any environmental, cargo contextual and or data that may impact a given cargo shipment, including but not limited to the external environment in the vicinity of stored cargo, cargo in the process of preparing the same to be shipped, cargo en route from an origination point to a destination point, cargo that has arrived at the destination point, or cargo at any point after the cargo for shipment has been identified. For example, the one or more cargo sensor devices 320 may include, but are not limited to, sensors for monitoring parameters, in real time or near real time, including but not limited to temperature, pressure, climate, humidity, barometric pressure, pollution, automobile exhaust, color, oxygen level, pH, soot density, light, airborne particle density, airborne particle size, air pressure, gases, airborne particle shape, particulate matter(s), odors, airborne particle identity, volatile organic chemicals (VOCs), hydrocarbons, polycyclic aromatic hydrocarbons (PAHs), carcinogens, toxins, electromagnetic energy (optical radiation, X-rays, gamma rays, microwave radiation, terahertz radiation, ultraviolet radiation, infrared radiation, radio waves, and the like), EMF energy, atomic energy (alpha particles, beta-particles, gamma rays, and the like), gravity, light properties (such as intensity, frequency, flicker, and phase), ozone, carbon monoxide, greenhouse gases, CO2, nitrogen, ozone, nitrous oxide, sulfides, airborne pollution, foreign material in the air, biological particles (viruses, bacteria, and toxins), signatures from chemical weapons, wind, air turbulence, sound and acoustical energy (both human audible and inaudible), ultrasonic energy, noise pollution, human voices, animal sounds, diseases expelled from others, the exhaled breath and breath constituents of others, toxins from others, bacteria & viruses from others, pheromones from others, industrial and transportation sounds, allergens, animal hair, pollen, exhaust from engines, vapors & fumes, fuel, signatures for mineral deposits or oil deposits, snow, rain, thermal energy, hot surfaces, hot gases, solar energy, hail, ice, acceleration, shock, vibrations, traffic, gyroscope data (e.g., orientation), the number of people in a vicinity of the cargo for shipment, the number of people the cargo for shipment encountered throughout the day, coughing and sneezing sounds from people in the vicinity of the cargo for shipment, loudness and pitch from those speaking in the vicinity of the cargo for shipment, etc., or any combination of thereof. For example, the one or more cargo sensor devices 320 may include, but are not limited to, sensors for monitoring parameters such as weather parameters, in real time or near real time, including but not limited to the parameters sunny, clear, partially cloudy, cloudy, overcast, rain, drizzle, sleet, snow, stormy, moisture, humidity (e.g., instantaneous relative humidity, interval values of relative humidity, absolute humidity), temperature (e.g., immediate temperature, interval values of temperature), dew point (e.g., instantaneous dew point, interval values of dew point) atmospheric pressure and density (e.g., pressure adjusted to sea level, surface pressure, pressure at higher altitudes, air density), wind (e.g., instantaneous wind speed, instantaneous wind direction, horizontal wind components, vertical wind component, interval wind speed, interval wind gusts, interval wind direction), clouds (e.g., amount of cloud cover, ceiling height, cloud base), precipitation (e.g., accumulated precipitation, precipitation type, precipitation probability, hail, supercooled liquid water, rainfall, snowfall, sleet), evaporation (e.g., accumulated evaporation), atmospheric stability (e.g., convective available potential energy (cape), lifted index, thunderstorm probability), frost (e.g., frost depth, soil frost, amount of snow melt, amount of fresh snow, snow depth, snow water equivalent, snow density, snowfall probability), radiation (e.g., radiation directed to instantaneous flux: clear sky radiation, diffuse radiation, direct radiation, global radiation; and radiation due to accumulated energy: accumulated energy (direct, diffuse or global radiation), clear sky radiation), and other meteorological parameters (e.g., geopotential height, water vapor mixing ratio, layer thickness).

In one or more embodiments, the one or more shipment sensor devices 310(*a*)-(*n*) may serve as a sensor. For example, the one or more shipment sensor devices 310(*a*)-(*n*) may be any compact sensor for monitoring, in real time or near real time, one or more functions and parameters of personnel tasked with the handling, management or transportation of stored cargo, cargo in the process of preparing the same to be shipped, cargo en route from an origination point to a destination point, cargo that has arrived at the destination point, or cargo at any point after the cargo for shipment has been identified. For example, the one or more sensor devices 330 may include, but are not limited to, sensors for monitoring functions and/or parameters, in real time or near real time, including but not limited to breathing rate, blood flow, heart rate, pulse rate, heartbeat signatures, cardio-pulmonary health, organ health, metabolism, electrolyte type and concentration, physical activity, caloric intake, caloric metabolism, metabolomics, physical and psychological stress levels and stress level indicators, and psychological response to therapy, drug dosage and activity (drug dosimetry), drug reactions, drug chemistry in the body, biochemistry, position & balance, body strain, neurological functioning, brain activity, brain waves, blood pressure, cranial pressure, hydration level, auscultatory information, auscultatory signals associated with pregnancy, response to infection, skin and core body temperature, eye muscle movement, blood volume, inhaled and exhaled breath volume, physical exertion, exhaled breath physical and chemical composition, the presence, identity, and concentration of viruses & bacteria, foreign matter in the body, internal toxins, heavy metals in the body, anxiety, fertility, ovulation, sex hormones, psychological mood, sleep patterns, hunger & thirst, hormone type and concentration, cholesterol, lipids, blood panel, bone density, body fat density, muscle density, organ and body weight, reflex response, sexual arousal, mental and physical alertness, sleepiness, auscultatory information, response to external stimuli, swallowing volume, swallowing rate, sickness, voice characteristics, tone, pitch, and volume of the voice, vital signs, head tilt, allergic reactions, inflammation response, auto-immune response, mutagenic response, DNA, proteins, protein levels in the blood, body hydration, water content of the blood, pheromones, internal body sounds, digestive system functioning, cellular regeneration response, healing response, stem cell regeneration response, etc., and any combination thereof. For example, vital signs may include pulse rate, breathing rate, blood pressure, pulse signature, body temperature, hydration level, skin temperature, and the like. For example, in one or more embodiments, one or more shipment sensor devices 310($a$)-($n$) may include a sensor that may include an impedance plethysmograph for measuring changes in volume within an organ or body (usually resulting from fluctuations in the amount of blood or air it contains). For example, one or more shipment sensor devices 310($a$)-($n$) may include one or more sensor devices 330 that may include an impedance plethysmograph to monitor blood pressure in real-time or near real time.

In one or more embodiments, one or more of the shipment sensor devices 310($a$)-($n$) are capable of measuring and transmitting sensor information in real-time, and/or over a duration of time. For example, one or more cargo sensor devices 320 and/or one or more sensor device(s) 330 utilized in one or more of the shipment sensor devices 310($a$)-($n$) may be used to sense the aforementioned functions and/or parameters over time, enabling a time-dependent analysis of the environment in which the cargo is being shipped, the condition of the cargo being shipped, the health of one or more monitored persons included in the shipping personnel, as well as enabling a comparison between a person's health and the environment. In one or more embodiments, the shipment sensor system 300 may be combined with proximity or location detection which allows for an analysis for pinpointing the location where environmental stress and physical strain took place.

Figure 3B:
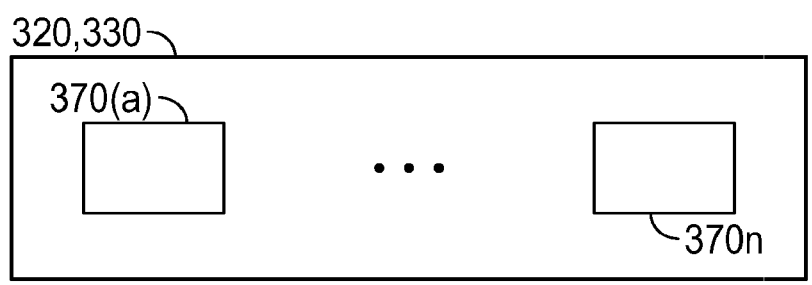

FIG. 3B is a block diagram representation of an exemplary sensor device 320/330 utilized in one or more embodiments of the cargo sensor device 320 and/or the sensor 330 that includes, for example, one or more sensor modules 370($a$)-($n$). In one or more embodiments, the exemplary shipment sensor device 310($a$)-($n$) may also include a control board (not shown) configured to allow the communication exchange of data between one or more of the sensor modules 370($a$)-($n$) and one or more microprocessors 340, programmed to operate the sensor modules 370($a$)-($n$). The sensor modules 370($a$)-($n$) may be connected with either a "hard" connection (such as an electric cable) or a "soft" connection (such as a wireless connection). For example, a Bluetooth® protocol may be utilized to connect the one or more sensor modules 370($a$)-($n$) simultaneously such that each module is in direct wireless communication with one or multiple other sensor modules. For example, one or more of the sensor modules 370($a$)-($n$) utilized in one or more embodiments of the present disclosure may include one or more of: a temperature measuring sensor module (e.g., DHT11 by Adafruit (NY, N.Y.)), humidity measuring sensor module (e.g., DHT11 by Adafruit (NY, N.Y.)), shock measuring sensor module, acceleration measuring sensor module, gyroscope module, air pressure measuring sensor module, air quality measuring sensor module (e.g., particulate monitoring, MQ13 by Adafruit (NY, N.Y.)), magnetic sensor module (e.g., DRV5023 Digital-Switch Hall Effect Sensor, Texas Instruments Inc., Dallas, Tex.), and/or other suitable sensor modules that are configured to measure the aforementioned environmental and/or parameters and conditions. One or embodiments of the shipment sensor device 310($a$)-($n$) may also include a control board (not shown) configured to allow communication exchange between one or more of the sensor modules 370($a$)-($n$) and one or more microprocessors 340, programmed to operate the sensor modules 370($a$)-($n$). The exemplary shipment sensor device 310($a$)-($n$) of the present disclosure may also include a power source 360, such as, for example, a battery. The exemplary sensor unit of the present disclosure may also include data memory storage (355), such as, for example, a SD card, micro SD card, or other suitable storage device.

In one or more embodiments, the sensor modules 370($a$)-($n$) communicate wirelessly with one or more of the portable telecommunication and/or telematics devices 295, discussed with reference to FIG. 2, preferably in an open architecture configuration, such as Bluetooth® or ZigBee. The telecommunication and/or telematics devices 295 may be any portable device, such as a cell phone (which includes a "smartphone"), PDA, laptop computer, Blackberry, or other portable, telemetric device. In one or more embodiments, the telecommunication and/or telematics devices 295 may be a fixed transmission device that resides at a facility, or known-point along a transportation route. For example, one or more of the portable telecommunication and/or telematics devices 295 and one or more of the shipments sensor devices 310($a$)-($n$), utilizing the sensor modules 370($a$)-($n$), may telemetrically communicate both to and from each other. One or more of the portable telecommunication and/or telematics devices 295 may be configured to receive sensor data from the sensor modules 370($a$)-($n$) in the form of wireless signals, transmitted from the transmitter/receiver 350, and transmit the wireless signal(s) via the network 270 to the PSCI platform 100, as disclosed herein.

The one or more processors 340 may include a signal processor that provides a means of converting the digital or analog signals transmitted from the one or more sensor devices 320, 330 into data that may be transmitted wirelessly by the transmitter/receiver 350. The signal processor 340 may be composed of, for example, signal conditioners, amplifiers, filters, digital-to-analog and analog-to-digital converters, digital encoders, modulators, mixers, multiplexers, transistors, various switches, microprocessors, or the like. In one or more embodiments, the signal processor 340 processes signals received by the transmitter/receiver 350 into signals that may be transmitted to one or more telecommunication and/or telematics devices 295 and heard or viewed by a user of the handheld devices 295. The received signals may also contain protocol information for linking various telemetric devices together, and this protocol information may also be processed by the signal processor 340.

In one or more embodiments, the exemplary shipment sensor devices includes a signal processor 340 that utilizes one or more compression/decompression algorithms (CODECs) used in digital media to process the sensor data. In one or more embodiments, the exemplary shipment sensor devices 310($a$)-($n$) includes a transmitter/receiver 350 that may be comprised of a variety of compact electromagnetic transmitters. For example, a standard compact antenna may used in with the standard Bluetooth® protocol to transmit the sensor data generated by one or more of the sensors 320, 330 to one or more telecommunication and/or telematics devices 295. Any kind of electromagnetic antenna suitable for transmitting electromagnetic frequencies may be utilized to transmit the sensor data to one or more telecommunication and/or telematics devices 295. For example, the receiver 350 may also include a suitable antenna. In one or more embodiments, the receiving antenna 350 and the transmitting antenna 350 are physically the same. In one or more embodiments, the transmitter/receiver 350 may be, for example, a non-line-of-sight (NLOS) optical scatter transmission system. For example, a non-line-of-sight (NLOS) optical scatter transmission system may utilize short-wave (blue or UV) optical radiation or "solar blind" (deep-UV) radiation in order to promote optical scatter to transmit/receive sensor data. In one or more embodiments, IR wavelengths may also be utilized to transmit/receive sensor data.

In one or more embodiments, the exemplary shipment sensor devices 310(*a*)-(*n*) include a the receiver/transmitter 350 that includes a sonic or ultrasonic transmitter to transmit sensor data generated by one or more of the sensors 320, 330. For example, a variety of sonic and ultrasonic receivers and transmitters are available in the marketplace and may be utilized in accordance with one or more embodiments of the present invention. For example, the receiver/transmitter 350 may communicate audible conversational information to one or more telecommunication and/or telematics devices 295. In one or more embodiments, encoded telemetric conversational data received by a microphone utilized in the shipment sensor device may be decoded by the signal processing module 340 to generate an electrical signal to be transmitted by the transmitter 350 to one or more telecommunication and/or telematics devices 295.

In one or more embodiments and, optionally, in combination of any embodiment described herein, one or more shipment sensor devices 310(*a*)-(*n*) and/or sensor-associated devices utilized within the exemplary inventive computer-based system of the present disclosure may be configured to transmit the sensory data using any wireless communication modes, such as, without limitation: NFC, RFID, Narrow Band Internet of Things (NBIOT), 3G, 4G, 5G, GSM, GPRS, WiFi, WiMax, CDMA, satellite, ZigBee, and other suitable communication modes. For example, in one or more embodiments, one or more of the shipment sensor devices 310(*a*)-(*n*) include transmitters 350 that are configured to transmit sensor data utilizing one of the suitable communication modes disclosed herein. In one or more other embodiments, one or more of the shipment sensor devices 310(*a*)-(*n*) are configured to transmit sensor data to one or more mobile electronic devices, included in the group of telecommunication and/or telematics devices 295, that are configured to transmit sensor data utilizing one of the suitable communication modes disclosed herein. In these embodiments, the sensor data will be transmitted to the PSCI platform 100 via a suitable network, such as network 270. In one or more embodiments and, optionally, in combination of any embodiment described herein, the term "mobile electronic device" may refer to any portable electronic device that may or may not be enabled with location tracking functionality. For example, a mobile electronic device may include, but is not limited to, a mobile phone, Personal Digital Assistant (PDA), Blackberry™, Pager, Smartphone, or any other reasonable mobile electronic device. For ease, at times the above variations are not listed or are only partially listed herein; this is in no way meant to be a limitation. In one or more embodiments, sensor data collected from one or more shipment sensor devices 310(*a*)-(*n*) allocated to a cargo shipment and/or cargo included in the cargo shipment are aggregated and transmitted to an auxiliary transmitting device, such as a mobile electronic device included in the group of telecommunication and/or telematics devices 295, that is disposed at (e.g., on, upon, in, etc.), near (e.g., within millimeters, centimeters, inches, feet, yards, or any suitable distance that enables the sensor(s) to operate for its/their intended purpose) or within a transport (e.g., transportation vehicle such as a truck, plane, ship, railcar, train, crate, packaging, etc.). In one or more embodiments, the auxiliary transmitting device is configured to transmit the aggregated sensor data utilizing a satellite-based data transmission network to the PSCI platform 100, or a database accessible by the PSCI platform 100.

In one or more embodiments, the transmitter/receiver 350 utilized in one or more of the shipment sensor devices 310(*a*)-(*n*) are configured to transmit sensor data that has been processed by one or more processors 340 (e.g., signal processor 340) to the PSCI platform 100 via network 270. In one or more embodiments, the sensor data is transmitted from one or more of the shipment sensor devices 310(*a*)-(*n*) to one or more telecommunication and/or telematics devices that are configured to transmit the same to the PSCI platform 100 via network 270. In one or more embodiments, the sensor data generated by one or more shipment sensor devices 310(*a*)-(*n*) may be converted to electrical signals and transmitted in real time. In one or more embodiments, the sensor data generated by one or more shipment sensor devices may be converted to electrical signals and transmitted in near real time. In one or more embodiments, the sensor data generated by one or more shipment sensor devices 310(*a*)-(*n*) may be converted to electrical signals and transmitted in one or more predetermined time intervals depending upon the type of sensor data that is to be transmitted. For example, the transmitter 350 may delay transmission until a certain amount of detection time has elapsed, until a certain amount of processing time has elapsed, etc. In some cases, the transmitter/receiver 350 is configured to transmit signals to the PSCI platform 100 dependent on information sensed by the sensors 320, 330.

In one or more embodiments, one or more of the exemplary shipment sensor device 310(*a*)-(*n*) include a power source 360. For example, the power source 360 may be any portable power source capable of fitting inside the shipment sensor device 310 housing. In one or more embodiments, the power source 360 is a portable rechargeable lithium-polymer or zinc-air battery. In one or more embodiments, the power source 360 may be a portable energy-harvesting power source may be integrated into the shipment sensor device 310 and may serve as a primary or secondary power source. For example, a solar cell module may be integrated into the shipment sensor device 310 for collecting and storing solar energy. In one or more embodiments, piezoelectric devices or microelectromechanical systems (MEMS) may be integrated into the shipment sensor device 310 and used to collect and store energy from body movements, electromagnetic energy, and other forms of energy in the environment or from a user herself. In one or more embodiments, a thermoelectric or thermovoltaic device may be used to supply some degree of power from thermal energy or temperature gradients. In one or more embodiments, a cranking or winding mechanism may be used to store mechanical energy for electrical conversion or to convert mechanical energy into electrical energy that may be used to power one or more of the shipment sensor devices 310(*a*)-(*n*), immediately or for later use.

In one or more embodiments, one or more of the shipment sensor devices 310(*a*)-(*n*) are configured to capture optical parameters that may include at least one from a group consisting of visible, infrared, and ultraviolet light parameters (e.g., TSL2561 by Adafruit (NY, N.Y.)). For example, one or more of the shipment sensor devices 310(a)-(n) may include an optical detection module that may include a photo sensor to detect a level or change in level of light. In one or more embodiments, the optical detection may include a digital image capture device, such as, without limitation, a CCD or CMOS imager that captures data related to infrared, visible, and/or ultraviolet light images. For example, one or more of the shipment sensor devices 310(a)-(n) may include an optical detection module that may include an exemplary light sensor that may generate an indication of increased ambient light. This indication may indicate, for example, the opening of a door that should not be open.

In one or more embodiments and, optionally, in combination with any one or more embodiments described herein, the terms "proximity detection," "locating," "location data," "location information," and "location tracking" as used herein to any form of location tracking technology or locating method that may be used to provide a location of a mobile electronic device, such as, but not limited to, at least one of location information manually input by a user, such as, but not limited to entering the city, town, municipality, zip code, area code, cross streets, or by any other reasonable entry to determine a geographical area; Global Positions Systems (GPS); GPS accessed using Bluetooth™; GPS accessed using any reasonable form of wireless and/or non-wireless communication; Wi-Fi™ server location data; Bluetooth™ based location data; triangulation such as, but not limited to, network based triangulation, Wi-Fi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

In one or more embodiments, one or more of the sensors 320, 330 includes a sensor that is equipped with GPS technology (e.g., a GPS equipped sensor) that is configured to determine and/or store data that is utilized to track and/or determine the location of one of the cargo, transport vehicle transporting the cargo, the container or transport device that either contains or supports the cargo for shipment. In one or more of these embodiments, a GPS sensor module included in group of sensor modules 370(a)-(n). In one or more embodiments, the GPS sensor module includes an antenna and a sensor. For example, the sensor may operate autonomously following the application of operating power to the shipment sensor device 310, which allows the sensor to digitally sample the signals from visible GPS satellites and store this data in storage 355 (e.g., a digital buffer). The sensor data, including the satellite data, allows the for the determination of the global positioning and velocity of the cargo, transport vehicle transporting the cargo, the container and/or transport device that either contains or supports the cargo for shipment.

In one or more embodiments, one or more of the shipment sensor devices 310(a)-(n) may include a location module. In these embodiments, the location module may include a wireless transceiver, global navigation satellite system (GNSS) receiver, a processor and a device memory. For example, transmitter/receiver 350 may be configured as a wireless transceiver, and one or more processors 340 may be configured to process GNSS sample data to determine the location of a cargo included in the cargo shipment. In one or more embodiments, a location sample for one or more GPS sensor modules 370(a)-(n) may be acquired using GNSS signals received from the GNSS satellites. In one or more embodiments, one or more of the location samples may be acquired by one or more GPS sensor modules 370(a)-(n) utilizing, for example, one or more cell stations or cell towers. For example, a location sample for one or more GPS sensor modules 370(a)-(n) may be acquired by triangulating cellular data signals received from cell stations. One or more of the location samples may also be acquired by one or more GPS sensor modules 370(a)-(n) utilizing, for example, a wireless access point, such as the wireless access point 265 with a known location. For example, a location sample for one or more GPS sensor modules 370(a)-(n) may be acquired by communicating with a wireless access point, whenever one of the one or more GPS sensor modules 370(a)-(n) is within proximity of the wireless access point. For example, the location of the cargo included in the cargo shipment may be established by utilizing triangulation of the signal samples, or signal strength of the cellular signals provided by the cellular stations or towers (e.g., the strength of the signal indicates the proximity of the cargo included in the cargo shipment to the cellular signal origination point).

In one or more embodiments and, optionally, in combination of any embodiment described herein, the exemplary inventive computer-based PSCI system of the present disclosure may be configured to provide insurance policies on a per shipment basis utilizing one or more of the shipment details, sensor data, telematics data, real time shipment data, historical shipment data, emerging trends, forecast data, data concerning weather conditions, traffic conditions, regional conflict dynamics and/or any other data that may impact a shipment of cargo as disclosed herein (collectively referred to herein as per shipment cargo risk assessment (PSCRA) data). In one or more embodiments and, optionally, in combination of any embodiment described herein, the exemplary inventive computer-based PSCI system of the present disclosure may be configured to receive a request from a shipping logistics provider (e.g. DHL, FedEx, UPS, USPS, etc.) to insure a shipment of cargo, access one or more databases (e.g., internal and/or external databases) to receive and process shipment details of the cargo to be shipped by a shipping logistics provider (e.g. DHL, FedEx, UPS, USPS, etc.), determine if the shipment is in compliance via application of an automated insurance compliance assessment rules engine, perform a risk analysis utilizing the relevant collected data (e.g., weather information, traffic information, regional conflict information, information that may impact roadway, waterway, railway and/or airway routes that will be taken by the cargo shipper, stored sensor data, information that may impact time of delivery, etc.), and, based upon the processed information, either approve, decline or request additional information concerning the cargo shipment. In one or more embodiments, the exemplary inventive computer-based PSCI system of the present disclosure may be configured to provide a risk assessment in real time based upon the PSCRA data in accordance with one or more protocols and metrics. In one or more embodiments, the exemplary inventive computer-based PSCI system of the present disclosure may be configured to provide a risk assessment in near real time based upon the PSCRA data in accordance with one or more protocols and metrics. For example, once the PSCI system receives the relevant shipping information from a user of PSCI system, via a user device 102 utilizing the client software 104, one or more embodiments of the exemplary inventive computer-based PSCI system of the present disclosure is configured process the relevant PSCRA data to provide a risk assessment (i.e., calculate the risk in quantifiable terms) concerning the cargo for the specific shipping request (i.e., on a per shipment basis). In one or more embodiments, the exemplary inventive computer-based PSCI system of the present disclosure may be configured to calculate the risk for a specific shipment in real time using big data, AI, the IOT and/or unsupervised machine learning. In one or more embodiments, the exemplary inventive computer-based PSCI system of the present disclosure may be configured to calculate the risk for a specific shipment in near real time using big data, AI, the IOT and/or unsupervised machine learning. In one or more embodiments, the exemplary inventive computer-based PSCI system of the present disclosure may be configured to provide the shipper of the cargo the real time, or near real time, insurance policy quote for the specific shipment request based upon the risk analysis. For example, in one or more embodiments, if the shipping client (e.g., buyer of the shipment services) agrees with the quote given by the shipper, once the shipping client pays for the shipping services that includes the PSCI system provided insurance policy, the liability for the cargo included in the cargo shipment passes to the shipping insurance company. If the shipping client declines the cargo shipment insurance quote, the liability for the cargo stays with the shipping client.

In one or more embodiments and, optionally, in combination with any embodiment disclosed herein, the PSCI system of the present disclosure may be configured to provide pre-underwritten insurance policies to, thereby, remove the human aspect, manual vetting process(es) and/or post-underwriting process(es) from the process to decide whether or not to insure the specific cargo shipment. For example, the manual underwriting process—that can cause a delay (e.g., hours, days, weeks, etc.) between the time the cargo owner or freight forwarder enters the relevant shipping information (e.g., one or more of shipper's name, shipment date, start/end point, commodity type, estimated value of the cargo, transport means, or type of insurance coverage requested, etc.) into the logistics shipping provider's website and the time an insurance quote to cover the cargo shipment is offered—is not required and is, thus, removed from the decision and underwriting process undertaken by the PSCI software. For example, in one or more embodiments, the PSCI platform provides a decision to insure the specific cargo, provides an insurance quote, provides insurance premiums and/or coverage in real time, or in near real time.

In one or more embodiments, the logistics shipping provider has an integrated, direct access solution to the PSCI platform. For example, the cargo owner and/or the logistics shipping provider can request insurance for the specific cargo to be shipped via the push of a button on a graphical user interface (GUI) provide via a web browser. For example, the cargo owner and/or the logistics shipping provider can request insurance for the specific cargo shipments while interacting within a single system (i.e., the PSCI system). For example, the logistics shipping provider may offer instant insurance quotes to the cargo owner and provide a single payment solution for both the cargo move (e.g., price for shipping the cargo from point A to point B) and the insurance coverage. In one or more embodiments, the PSCI software utilizes the shipping information and compares the shipping request to a pre-defined insurer risk rating associated with the relevant logistics shipping provider. For example, the PSCI software determines in real time whether the insurance request for the specific cargo shipment falls within an acceptable level of risk such that that an insurer will provide cargo insurance for the cargo that will be shipped in the manner specified within the shipping information. For example, in one or more embodiments, each logistics shipping provider has its individual cargo insurance policy that is accessible by the PSCI platform, the insurance policies including, for example, individual pricing, commodity price modifiers and insurers risk ratings. In one or more embodiments, utilizing the individual policies allows the PSCI platform, using the PSCI software disclosed herein, to automatically determine if insurance coverage should be provided or declined in real time, or near real time, and automatically provide adjustments, if needed, to the insurance quote based on varied and dynamically changing risks (e.g., varied risks associated with the cargo itself, the mode of transportation, the shipping route(s), the cargo container and/or restraints, etc.). For example, in one or more embodiments, all of the insurance quotes provided by the PSCI platform for individual insurance policies for one or more specific cargo shipments are pre-underwritten and, therefore, do not require a conventional underwriting vetting process for each insurance policy request. The PSCI software determines instantly if the request for insurance coverage for one or more cargo shipments is within an insurer's accepted level of risk. In one or more embodiments, the PSCI platform also provides a direct compliance and sanction check for each insurance policy through integrating with one or more compliance and/or sanction platforms. For example, at step 426, the shipment details are transmitted to one or more of the PSCI rules engine 404 and/or a third party insurance policy compliance and/or sanction platform (e.g., ComplyAdvantage (www.complyadvantage)) to determine if the specific cargo shipment details are in alignment with one or more Federal, State, local and/or regional (e.g., international, country, county, city, etc.) regulatory and/or compliance rules.

In one or more embodiments, the collected data, including the sensor data concerning a cargo shipment, may be stored in one or more databases (internal and/or external) and transformed into at least one of: i) at least one alert (e.g., audible alert, visual alert, etc.) to a predetermined party (e.g., insured client, shipper, etc.), and ii) at least one visual presentation (e.g., a graph tracking, in real-time, a quality metric based on measured time over time, etc.). For example, in one or more embodiments, one or more of the telematics devices 140 and/or sensors 290, configured to measure temperature, humidity, shock, etc., may be utilized to receive real-time information concerning a cargo that is scheduled to be shipped. For example, the cargo container(s) may be equipped with one or more sensors 290 and telecommunication and/or telematics devices 295 that measure temperature, shock, humidity and door status of the container(s) and transmit that information in real-time as the cargo travels anywhere around the world. The sensors 290 and telecommunication and/or telematics devices 295 may be configured to not only provide measurements about the container but also its contents. In this manner, the computer-based PSCI system may dynamically gather sensor data and utilize the sensor information and provide per shipment cargo insurance in real time, or near real time, via the execution the PSCI software. For example, logistics shipping providers and insurance providers can access all policies (e.g., residing on one or more databases 170a-170n, and/or 160a-160n) utilizing the PSCI platform via their respective computer devices (e.g., servers 130a-130n). In one or more embodiments, the PSCI platform also allows authorized users to track exposure risks to individual cargo shipments in real time and/or to visualize trends in real time utilizing on or more of the sensor(s) and/or telematics devices discloses herein, and/or one or more third party databases that store real time shipment data, discussed with reference to step 416 in FIG. 4C. For example, insurance providers, utilizing the PSCI platform may track exposure risks in real time to visualize trends in real time for individual shipments of cargo. This allows insurance providers to dynamically adjust their risk assessments for logistics shipping providers and/or cargo shipments brackets to reduce the risk of a claim, or increase business by reducing the risk associated with one or more insurance policies and/or an individual cargo shipments. For example, if the PSCI platform determines, based on individual settings or factors, that too many container shipments that contain beef are originating in Europe with a destination port of Baltimore, an alert, a flag or other warning may be triggered that may raise or lower a risk assessment for these and future shipments that include similar shipping characteristics.

Figure 4A:
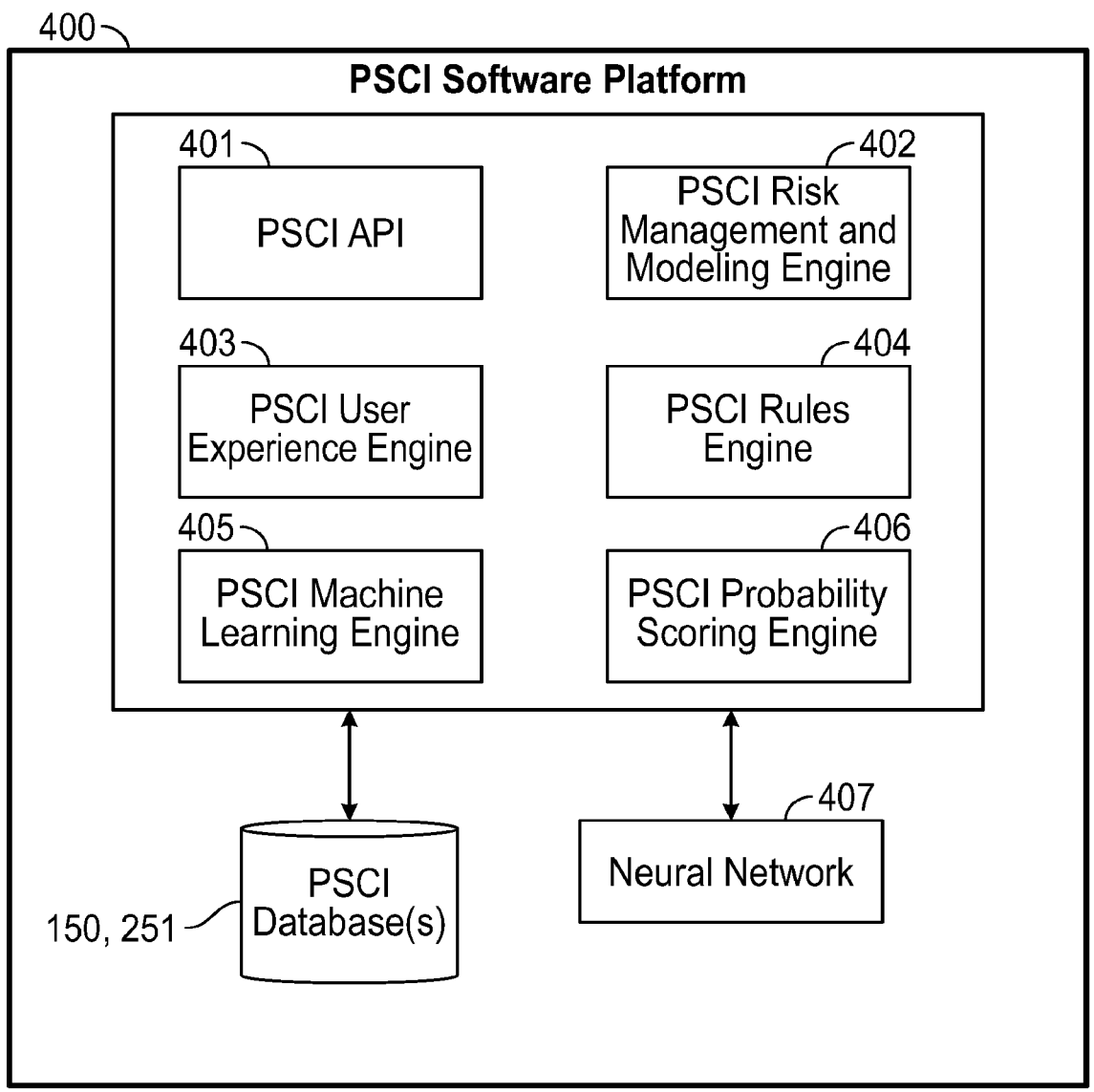
FIG. 4A illustrates a schematic block diagram of an exemplary PSCI software platform according to one or more embodiments of the present disclosure.

FIG. 4A illustrates a block diagram representation of an exemplary inventive PSCI software platform 400 executed by the exemplary PSCI platform 100 according to one or more embodiments. As presented herein, the PSCI software framework/platform 400 (referred to as PSCI software platform 400 herein) is generally a software and firmware construct (e.g., functional engines for communicating the modules that make up the PSCI software platform 400) provided by one or more processors (e.g., one or more processors 105 residing in one or more PSCI server devices 120a-120n) execution of PSCI utility 220, which can be provided as one of applications 218 and/or as an executable component within firmware 212 or O/S 216 in alternate embodiments, on one or more PSCI server devices 120a-120n (e.g., PSCI DPS 200), and which implements specific functional aspects of the disclosure, according to one or more embodiments. An exemplary architecture of one or more embodiments of the computer-based PSCI system 400 will be disclosed with reference to FIGS. 4A-4H, and 8. For example, in one or more embodiments and, optionally, in combination with any embodiments disclosed herein, the PSCI software platform 400 includes a PSCI API 401 (e.g., an application programing interface provided on one or more authorized user computer systems (e.g., one or more logistic shipping provider servers 130a-130n, and/or user devices 102a-102n) and utilized to communicate/exchange information with the exemplary PSCI platform 100), a PSCI risk modeling engine 402, a PSCI user experience engine 403, a PSCI rules engine 404, a PSCI machine learning engine 405, a PSCI probability scoring engine 406 and a neural network 407, which are discussed herein and below with reference to FIGS. 4B through 4E. In one or more embodiments and, optionally, in combination with any embodiment disclosed herein, the PSCI software platform 400 may be configured as a dedicated app or dedicated plug-in software that would facilitate in the exchange of information, as disclosed herein, between the PSCI platform 100 and one or more logistic shipping provider servers 130a-130n, and/or user devices 102a-102n, and/or one or more insurer/underwriter servers 180a-180n.

In one or more embodiments and, optionally, in combination with any embodiment disclosed herein, the PSCI software platform 400 is communicatively connected to the one or more databases 150a-150n, 251 via a secure network 110, 270. For example, in one or more embodiments, one or more of the databases 150a-150n, 251 is configured to store authorized user (e.g., insurer(s), underwriter(s), logistics shipping provider(s) and/or customers of the logistics shipping provider(s)) information). For example, in one or more embodiments, the user information may include demographic information for the authorized users, information corresponding to the user's interactions related to requests and/or responses presented to the user utilized to provide shipping insurance for one or more individual cargo shipments, shipping information, requests for information and/or other information presented to a user, and/or the like. For example, in one or more embodiments, the user information may include each offer and/or acceptance and/or decline of insurance provided by an insurance company and/or an underwriter company for one or more individual cargo shipments via the PSCI platform, each quote provided by an insurance company and/or an underwriter company that was provided and/or accepted and/or declined for one or more individual cargo shipments, each commodity price modifier and/or risk probability value provided by an insurance company and/or an underwriter company for 1) each commodity type of cargo included in the cargo shipment, disclosed for example with reference to FIGS. 5A-5G, and/or 2) each transport type utilized to transport a cargo included in a cargo shipment, disclosed for example with reference to FIG. 5H, and/or any other information associated with providing insurance coverage, a quote, a commodity price modifier and/or a risk probability value. For example, one or more of the aforementioned data may be collectively referred to as "user information" or "user data."

In one or more embodiments and, optionally, in combination with any embodiment disclosed herein, the PSCI software platform 100 executing the exemplary inventive PSCI software includes one or more front end servers which are dedicated to managing network connections with remote clients (e.g., authorized users including but not limited to, for example, insurer(s), underwriter(s), logistics shipping provider(s) and/or customers of the logistics shipping provider(s)) information) logistics). In one or more embodiments, the front end servers provide a variety of interfaces for interacting with one or more of the different types of clients. For example, when a web browser utilized by a client accesses the platform, a web interface module in the front end module included in the one or more of the front end servers provides the client access to the PSCI platform. Similarly, when a client calls the PSCI API 401 made available by the PSCI platform for such a purpose, the PSCI API interface provides the client access to the PSCI platform 100. In one or more embodiments and, optionally, in combination with any embodiment described herein, the exemplary computer-based PSCI software platform 400 may be configured to include an integrated PSCI API 401 (e.g., a PSCI application programming interface (API) enables the execution of the PSCI application module). The PSCI API 401 is configured to provide data (e.g., user information) to one or more of the PSCI server devices. In one or more embodiments, the PSCI API 401 provides offers for insurance quotes, pricing (e.g., premiums, PSCI technology solution pricing and/or logistics shipping provider revenue participation earnings, etc.) and/or other decisions (decline of insurance coverage) back to the authorized user of the PSCI platform. In one or more embodiments, the PSCI API 401 provides insurance providers utilizing one or more user devices and or computer systems (e.g., on or more insurer/underwriter server(s) 180a-180n) access to the PSCI platform 100 to provide information (e.g., information associated with the pre-underwriting process disclosed herein, insurance policy information disclosed herein, and any other information necessary to perform the functionality disclosed herein) and request information (e.g., insurance and policy information disclosed herein) to/from the PSCI platform 100.

In one or more embodiments and, optionally, in combination with any embodiment disclosed herein, the PSCI risk management and modeling engine 402 is configured to automatically calculate the risk characteristics that are unique to an individual cargo shipment utilizing one or more of the risk modeling methods and/or tools disclosed herein. In one or more embodiments and, optionally, in combination with any embodiment disclosed herein, the PSCI risk management and modeling engine 402 included in the exemplary inventive PSCI software platform 400 executed on the PSCI software platform 100 is configured to automatically access one or more of the PSCI databases 150a-150n, 251 to compile user information and compare numerous data points included in the user information to choose an insurance premium, based upon the data points, and provide the same to the consignor via the PSCI API 401. For example, in one or more embodiments, the data points utilized in the comparison process may include data concerning but not limited to, for example, one or more of shipment details (e.g., the consignor identification, origination address of shipment, destination address of shipment, transportation route, route legs included in the transportation route, mode of transportation (e.g., road, air, water, rail, etc.) utilized to ship the cargo included in the cargo shipment during each route leg, geographical regions the transportation route crosses, type of container utilized to transport the cargo included in the cargo shipment, a commodity type of cargo, special requirements (e.g., refrigeration, perishable, temperature requirements, environmental requirements, light requirements, contextual requirements, etc.), restraints, the logistics shipping provider identification, time required to transport the cargo, etc.), possible risks associated with the cargo and/or the shipping of the cargo, available insurance policies provided by one or more authorized users of the PSCI platform 100 (e.g., insurers and/or underwriters) that have been pre-approved by the insurance or underwriting company for the cargo shipment, and the premiums associated with each of the available policies. In one or more embodiments, real time shipment data (e.g., data disclosed with reference to step 416, discussed herein) and/or historical shipment data (e.g., data disclosed with reference to step 418, discussed herein) may be utilized in addition to the aforementioned user data to compile user information and compare numerous data points included in the user information to choose an insurance premium based upon the data points.

For example, in one or more embodiments and, optionally, in combination with any embodiment disclosed herein, each logistics shipping provider has their individual cargo policy(ies) stored in one or more PSCI system databases, each of the cargo policies including information that may be utilized by PSCI risk management and modeling engine 402 as data points for the comparison processing functionality. In one or more embodiments, additional authorized users of the PSCI platform that include other third party insurance companies and/or underwriter companies may also have exemplary cargo insurance policies for individual cargo shipments stored in one or more PSCI system databases, each of the third party cargo insurance policies including information that may be utilized by PSCI risk management and modeling engine 402 as data points for the comparison processing functionality. For example, the information included in the cargo insurance policies may include but not be limited to individual pricing, commodity price modifiers and insurers risk ratings. For example, in one or more embodiments, the PSCI risk management and modeling engine 402 compares the data points gathered utilizing cargo insurance policies to the data points gathered from user information and/or the shipping information concerning a identified cargo shipment, and, based upon the comparison process, provide an insurance policy quote to the consignor (e.g., logistics shipping provider). For example, in one or more embodiments, the PSCI risk management and modeling engine 402 may compare, for example, the types of insurable cargo (e.g., a specific commodity type of cargo, as disclosed with reference to FIGS. 5A-5G), the types of transport utilized to transport the cargo included in the cargo shipment (e.g., a specific transport type, as disclosed with reference to FIG. 5H), and the premiums the cargo incurs (i.e., commodity price modifiers and/or risk probability values, discussed in detail below), areas associated with the individual cargo shipment which the insurer/underwriter will not cover or has excluded from insurance coverage, and/or a maximum coverage that the insurer/underwriter will provide for the identified cargo shipment. For example, in one or more embodiments, once the PSCI risk management and modeling engine 402 compares the data points to the shipping information and/or or other information concerning the identified individual shipment, the PSCI risk management and modeling engine will provide a coverage decision (e.g., accept the option for insurance coverage, decline the option of insurance coverage, and/or request more information from the consignor/logistics shipping provider) in real time (or in near real time) and, if accepted, provide an insurance quote via the PSCI API 401 to the consignor in real time, or near real time.

In one or more embodiments and, optionally, in combination with any embodiment disclosed herein, the PSCI risk management and modeling engine 402 is configured to make coverage decisions in real time, or near real time, and provide real time, or near real time, adjustments to the insurance quote based on varied risks. For example, the PSCI risk management and modeling engine 402 is configured to utilize real time shipping data (disclosed with reference to step 416, discussed in detail below) which includes real time sensor data and other real time shipment data, to enable an insurance provider to track exposure risks in real time to both dynamically change an insurance quote with respect to an individual cargo shipment in real time, or near real time, to account for the new risk, and visualize certain trends that may impact the risks with respect to an individual cargo shipment in real time. For example, compiling and processing the real time sensor data and other real time shipment data allows insurance providers to dynamically adjust their risks levels (e.g., risks brackets) associated with their policies for individual shipment cargo in order to reduce risk (e.g., requiring higher insurance premiums for various types of cargo included in individual cargo shipments and/or transportation details associated with individual cargo shipments) or increase business (e.g., lowering insurance premiums for various types cargo included in individual cargo shipments and/or transportation details associated with individual cargo shipments). In one or more embodiments, the PSCI risk management and modeling engine 402 provides an insurance policy quote to the consignor (e.g., logistics shipping provider) based upon a dynamic insurance pricing model. For example, if too many individual container shipments that contain beef are originating in Europe and have a destination port of Baltimore, Maryland, these data points may be utilized by the PSCI risk management and modeling engine 402 to trigger flags, based on the individual settings, that may require dynamic adjusting of an insurer's premiums for an identified individual shipment or policy for the identified commodity type of cargo (e.g., "Meat and Edible Meat Offal", as reference in FIGS. 5A through 5G)) included in the individual shipment.

In one or more embodiments and, optionally, in combination with any embodiment disclosed herein, the PSCI UX (user experience) engine 403 is configured to act as an authorization and validation gateway between the exemplary PSCI platform 100 and a user's computer system and internal network (e.g., intranet or other internal network). In one or more embodiments, the PSCI user experience engine 403 authorizes and validates a user (e.g., insurance provider, underwriter, etc.) that accesses the exemplary PSCI platform 100 via the PSCI API 401, for example, by way of the employer's intranet or other suitable network. For example, in one or more embodiments and, optionally, in combination with any embodiment disclosed herein, the PSCI user experience engine 403 may include an interface module, an identity validation module and an access management module. For example, in one or more embodiments, these modules provide user control (e.g., data access), security/authentication and authorization to a user accessing and/or interacting with the exemplary PSCI platform 100.

In one or more embodiments and, optionally, in combination with any embodiment disclosed herein, the insurance risk models generated by the PSCI risk modeling engine 402 may be continuously trained by, for example without limitation, applying at least one machine learning technique employed by the PSCI machine learning engine 405 to the collected and/or compiled data concerning shipments of cargo, routes utilized to transport the cargo included in the cargo shipment, and/or the individual shipping logistics providers that transport the cargo and contract with the consignors to transport the cargo. In one or more embodiments and, optionally, in combination with any embodiment disclosed herein, an exemplary neutral network technique employed by the neural network 407 may be utilized. The PSCI machine learning engine 405 and the neural network 407 will be discussed herein in more detail with reference to FIGS. 4B and 4C. For example, in one or more embodiments, the PSCI machine learning engine 405 includes the exemplary neural network 407. In one or more other embodiments, the exemplary neural network 407 is communicatively connected to the PSCI machine learning engine 405.

Figure 4B:
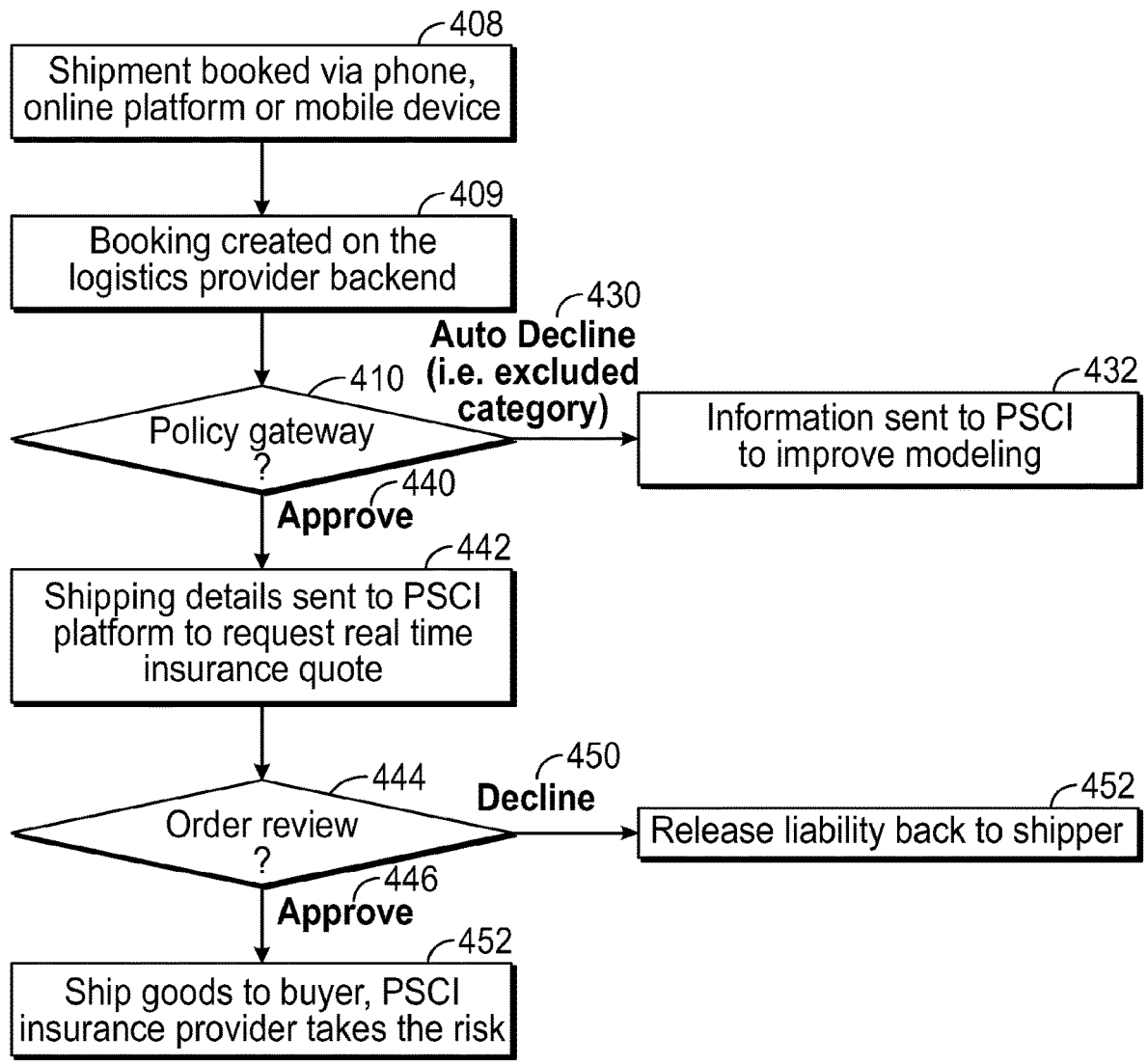
FIGS. 4B and 4C depicts a flow chart of the operational steps of the PSCI platform executing the PSCI software platform according to one or more embodiments of the present disclosure.

FIG. 4B is a flowchart disclosing an illustrative example of how one or more embodiments of the PSCI system utilizes collected and compiled data to provide insurance policies on a per shipment basis in real time, or near real time, via the execution the PSCI software. In step 408, a client user utilizes a user device 102 to enter shipping information about a cargo that the client wants to ship from on origination geographic location (e.g., origination/pick-up address) to a destination geographic location (e.g., delivery address). In one or more embodiments, one or more user devices 102*a*-102*n* is configured with software, which will be referred to as a client or as client software 104*a*-104*n*, that in operation may access one or more of the logistics shipping provider systems (e.g., server(s) 130*a*-130*n*) via the network (e.g., Internet) so that a user may transmit and receive messages, and view and interact with lists of content items via a network. In one or more embodiments, one or more user devices 102*a*-102*n* is configured with client or as client software 104*a*-104*n* that in operation may access one or more of the PSCI platform provider systems (e.g., server(s) 120*a*-120*n*) via the network (e.g., Internet). In these embodiments, the PSCI platform provider systems may communicatively interact with the logistics shipping provider systems (e.g., a backend computer system) to transmit the user provided data to the logistics shipping provider and/or the logistics shipping provider data to the user such that a user may transmit and receive messages, and view and interact with lists of content items via a network. In this manner, the user devices 102 may be utilized to send information that includes, for example, shipping information about a shipment of cargo to the logistics shipping provider systems (e.g., one or more of the relevant server(s) 130*a*-130*n* included within the identified logistics shipping provider computer system). In one or more embodiments, for example, the client on one or more user devices 102*a*-102*n* may be or include a web browser or an HTML (hypertext markup language) document rendered by a web browser. In one or more embodiments, for example, the client on one or more user devices 102*a*-102*n* may be or include JavaScript code or Java code. In one or more embodiments, for example, the client on one or more user devices 102*a*-102*n* may be or include dedicated software, e.g., an installed app or installed application, that is designed to work specifically with the logistics shipping provider systems (e.g., server(s) 130*a*-130*n*). In one or more embodiments, for example, the client on one or more user devices 102*a*-102*n* may be or include a Short Messaging Service (SMS) interface, an instant messaging interface, an e-mail-based interface, or an API function-based interface.

In one or more embodiments, a web browser disposed at the user device and the logistics shipping provider systems (e.g., server(s) 130*a*-130*n*) represents an initial procedure to construct a graphic array in response to initial user input directed to the user's intent to ship a cargo. In one or more embodiments, for example, the logistics shipping provider systems include one or more servers 130*a*-130*n* that provide a variety of graphical user interfaces for interacting with different types of clients. These interfaces are operable to provide a user with data fields in which the user may utilize to enter shipping information concerning a cargo to be shipped using a particular logistics shipping provider. The shipping information may include, but is not limited to, one or more of source postal code, destination postal code, cargo weight, type of cargo, the estimated value of the cargo, the desired time of delivery, the desired time of the pick-up, the shipping origination address and/or the shipping destination address, and/or the type of desired cargo insurance, in order to determine a timing schedule and rates for each supported carrier. For example, the minimum shipping information required to complete a shipping order may at least include enough information such that the logistics shipping provider may determine a timing schedule and rates to fulfill the shipping request. For example, the shipping information may also include if the user requests a guaranteed delivery time, and/or additional special instructions, such as a particular manner of transport (e.g., road, air, ship, rail, etc.), a particular cargo container (e.g., a container with the appropriate lighting or darkness, refrigerated, appropriate temperature range, appropriate humidity range, appropriate shock range, etc.).

In one or more embodiments in step 409, the logistics shipping provider receives the shipping information from the customer (shipper) and a shipping contract is generated utilizing, for example, one of the logistic shipping provider back end servers (e.g., one or more server devices 130).

For example, in one or more embodiments, in step 410, the logistics shipping provider utilizes its policy gateway system to validate the shipping contract and validates the shipping information included in the shipping contract. For example, in one or more embodiments, in step 410, if the logistics shipping provider has not been provided with at least the minimum shipping information required to fulfill a valid shipping request, the logistics shipping provider system displays error messages prompting the user to input further shipping information. For example, in one or more embodiments, disclosed with reference to FIG. 1, the graphical user interface (GUI) displayed on a user device 102, that enables a user to enter shipping information, may display one or more graphic arrays utilized by the user to provide all of the necessary information (e.g., origination address, delivery address, type of cargo, payment information, etc.) to complete a shipment request. In one or more embodiments, the graphical user interface (GUI) displayed on a user device 102 may display errors to the user that indicate insufficient shipping information has been provided, and/or prompting the user for additional information. In one or more embodiments, the GUIs and the displayed data associated with the GUIs are all processed by the web browser at the client 104 residing on the user device 102.

In one or more embodiments, in step 410, all other functions and processes required to complete the shipment request, i.e., completing the necessary steps to engage in a contract with the user to ship the cargo included in the cargo shipment without the PSCI software platform providing a PSCI insurance policy to the logistics shipping provider, are performed by one or more of the logistics shipping provider systems that include one or more servers 130a-130n that host the delivery service UI, and/or the delivery service backend functionality. For example, the additional information and processes required to complete and book a shipping request may include, but not be limited to, processing the payment, providing one or more notifications for timing, tracking, shipping, payment, and/or delivery confirmations. For example, in one or embodiments, in step 430, if the logistics shipping provider policy determines that one or more details/characteristics included in the shipping information provided by the user falls within a category that prevents the logistics shipping provider from fulfilling the terms of the shipping contract, (e.g., the type of cargo included in the cargo shipment includes hazardous materials, the type of cargo included in the cargo shipment is perishable and the refrigeration requirements cannot be fulfilled by the shipping logistics provider, the requested time for delivery cannot be met, the cargo shipment is prohibited by one or more Federal, State, local and/or regional compliance regulations, etc.), then the user is automatically sent a decline message (e.g., an indication, alert, message, user error, etc.) that indicates the customer's shipping request has been declined. In one or more embodiments, in step 432, the shipping information received by the user and the reasons for declining the shipping contract requested by the user are transmitted to the exemplary PSCI platform 100 to be stored in one or more databases accessible by the exemplary inventive PSCI platform 100 executing the exemplary inventive PSCI software platform 400 (e.g., databases 150, 251) to be utilized by the PSCI machine learning engine 405 to improve the dynamic price models generated by the PSCI risk modeling engine 402, discussed in more detail herein.

For example, in one or embodiments, in step 440, if the logistics shipping provider policy determines that the details/characteristics included in the shipping information are such that a shipping contract may be fulfilled, the user is automatically sent an approval message (e.g., an indication, alert, message, user error, etc.) that indicates the customer's shipping request has been accepted.

In one or more embodiments in step 442, the logistics shipping provider requests a per shipment insurance (PSCI) insurance policy via the PSCI platform. For example, in one or more embodiments, the user, in step 408, requests a PSCI insurance policy at the time of booking. In one or more other embodiments, in response to the logistics shipping provider policy gateway approving the shipping request in step 440, the logistics shipping provider booking system offers PSCI insurance for the cargo shipment to the user, which may be requested or declined. In one or more embodiments, the logistics shipping provider may provide its customers with PSCI insurance that will operate to provide coverage for the shipment of cargo for which the user is contracting with the logistics shipping provider to ship to the delivery destination (e.g., delivery address). In one or more embodiments, the PSCI software that is configured to provide an insurance quote for the individual shipment of cargo in real time resides on the logistics shipping provider systems (e.g., one or more server(s) 130a-130n). In one or more embodiments, the PSCI software resides on the PSCI platform 100 and is accessible utilizing the PSCI API 401 via the network 110 hosted by the logistics shipping provider systems (e.g., one or more relevant server(s) 130a-130n).

In one or more embodiments, additional shipping information, that may not be provided by the user in the creation of a shipment contract to ship a cargo included in the cargo shipment without a PSCI insurance policy, may be required by the PSCI platform executing the PSCI software platform to provide a PSCI insurance quote to the consignor. For example, shipping information may be provided to the PSCI software platform via the logistics shipping provider computer system(s) (e.g., one or more relevant server(s) 130a-130n). For example, the additional shipping information may include but is not limited to, routing information that includes geographical mapping information for each part (i.e., leg) of the transportation route planned to ship the cargo from the origination geographical location to the destination geographical location, the type of container(s) utilized one each part of the route, the type of restraints utilized to secure the cargo on each part of the transportation route, the total weight of the cargo (e.g., weight including any packaging, platforms utilized to support the cargo, containers utilized to support/contain the cargo within the shipping container) center of gravity of the cargo, type of cargo (perishable, type of perishable cargo, etc.), the type of shipping container utilized to ship the cargo on each part of the route, manner of transport (e.g., roadway, tractor trailer, railway, waterway (e.g., by sea, ocean, river, canal crossings, lake, inlet, etc.), etc.), type of vehicle (year, make model) utilized to transport the cargo one each part of the route, customs and border regulatory information, timing information concerning the shipment (e.g., total time from pick-up to delivery of the cargo, time required for each part of the route, weight information concerning the shipping container(s) utilized to transport the cargo (e.g., pre-load weight of the shipping container, loaded weight of the shipping container, rated weight of the shipping container), etc.

In step 442, for example, information, including at least a portion of the shipping information provided by the user via the user device 102 and/or at least a portion of the information generated/and or provided by the logistics shipping provider systems (e.g., one or more server(s) 130*a*-130*n*), is transmitted to the exemplary PSCI platform 100, that includes one or more processors residing on the exemplary PSCI platform 100 utilized to execute the exemplary inventive PSCI software platform, to determine if the cargo shipment is approved/declined for insurance coverage. In one or more embodiments, the PSCI software to determine if the cargo shipment is approved/declined for insurance coverage and, thus, the processors for executing the PSCI software (processing layer) resides in one or more of the servers 120*a*-120*n* in the PSCI platform 100. In one or more other embodiments, the PSCI software to determine if the cargo shipment is approved/declined for insurance coverage resides in the relevant logistics shipping provider computer systems (e.g., one or more server(s) 130*a*-130*n*). In one or more embodiments, the PSCI system 100 is a distributed system such that certain of the functions performed by the PSCI software are performed by processors residing in one or more of the logistics shipping provider systems (e.g., one or more server(s) 130*a*-130*n*), and certain of the functions performed by the PSCI software are performed by processors residing in in one or more of the servers 120*a*-120*n* in the PSCI platform 100.

In step 444, the shipment details, which includes at least a portion of the shipping information (e.g., including at least a portion of the shipping information provided by the user via the user device 102 and/or at least a portion of the shipping information generated/and or provided by the logistics shipping provider systems) and/or other information required to request insurance via the exemplary inventive PSCI platform 100 executing the exemplary inventive software platform 400 for the identified individual cargo shipment, are received by the PSCI processing layer (e.g., one or more software components included in the exemplary inventive software platform 400) that provides one or more functions discussed herein to, for example, determine if the cargo shipment is approved or declined for insurance coverage and, if approved, provide an insurance quote in real time, or near real time. The functions performed by the exemplary PSCI platform 100 executing the exemplary inventive software platform 400 will be discussed with reference to FIG. 4C below.

Figure 4C:
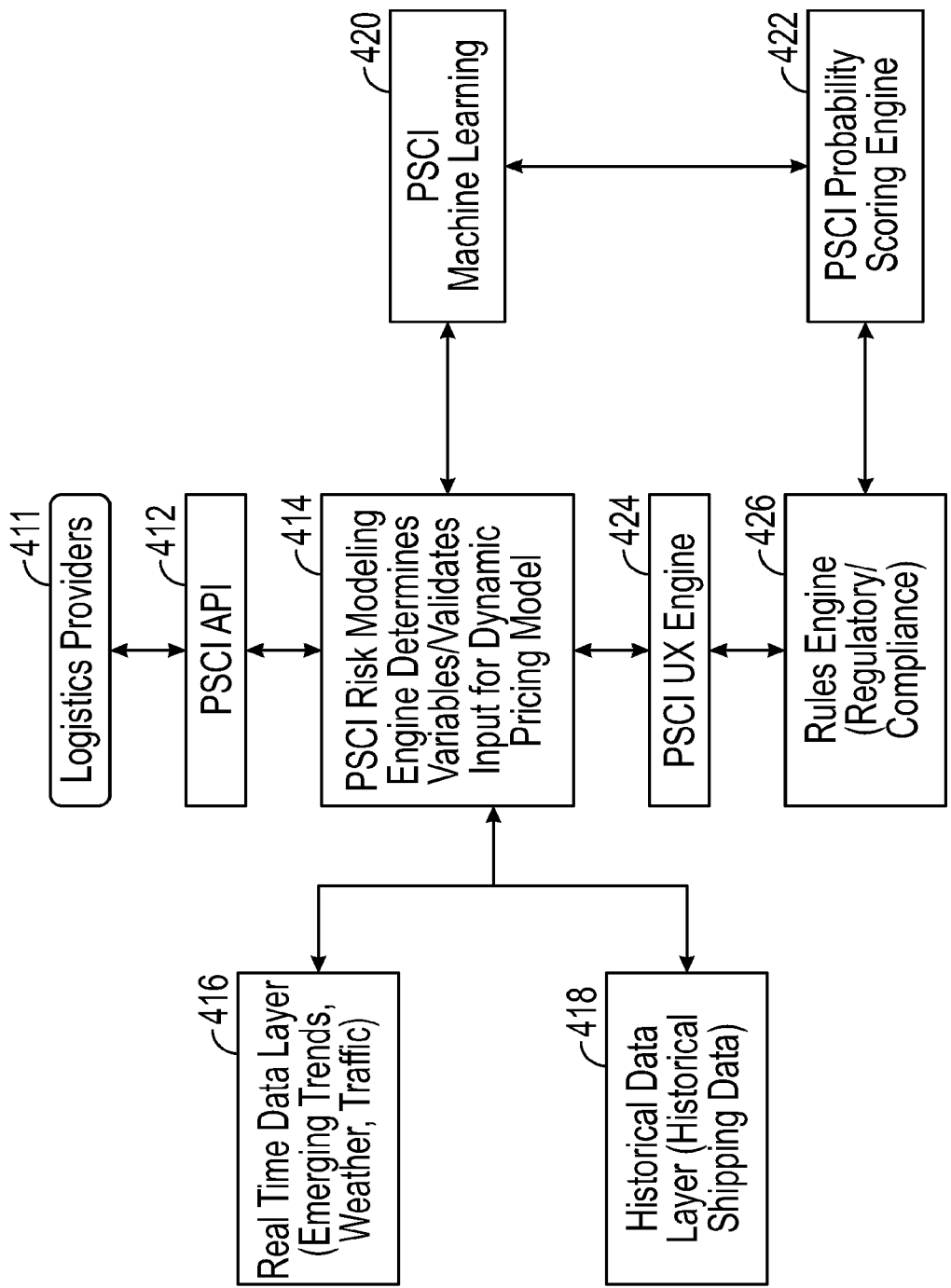

FIG. 4C is a flowchart discloses an illustrative example of one or more embodiments of the PSCI software platform 400, referenced as the PSCI policy gateway in FIG. 4B, that may be utilized for providing real time, or near real time, insurance quotes for individual cargo shipments to logistical provider shipping customers (e.g., consignors). For example, in one or more embodiments and, optionally, in combination with any embodiment disclosed herein, the exemplary PSCI computer-based platform includes one or more servers (e.g., PSCI platform servers 120*a*-120*n*) that provide one or more interfaces and/or gateways for interacting with different types of clients, for example the PSCI gateway. For example, in one or more embodiments, when a web browser residing on a user device 102 accesses the exemplary PSCI platform 100, a web interface module residing on the user device or the client software provides the client access to the PSCI gateway. In one or more embodiments, when the logistics shipping provider system client calls the PSCI API 401, the PSCI software platform 400 is made available via the PSCI API 401 such that an authorized user (e.g., the logistics shipping provider) may utilize the exemplary PSCI platform to receive an insurance quote for the individual cargo shipment in real time, or near real time, and provide an insurance policy, provided by one or more insurers and/or underwriters, to the customer (e.g., consignor).

In step 411, in one or more embodiments as disclosed herein with reference to FIG. 4C, the logistics shipping provider computer system is utilized to provide the PSCI API 401 the necessary information (i.e., the shipment details), that includes at least a portion of the shipping information, that is required by the to the exemplary PSCI platform 100 executing the PSCI software platform 400 to determine if a request for cargo insurance coverage for the identified individual cargo insurance will be accepted or denied. In one or more embodiments, if the necessary information is not received by the PSCI API 401 the PSCI platform 100 executing the PSCI software platform 400 to determine if a request for cargo insurance is approved or denied, the PSCI API 401 may provide the authorized user (e.g., logistics shipping provider, other authorized user) an indicator (e.g., message, error message, alert, etc.) that more information is required. For example, the required information provided to the PSCI API 401 such that an insurance request will be transmitted to the PSCI platform may depend upon one or more factors including, but not limited to, the type of insurance requested, the amount of insurance coverage requested, the time/date the insurance coverage begins and ends, the type of cargo, the carrier(s) utilized to transport the cargo, and/or the transportation route(s) utilized to transport the cargo. For example, in one or more embodiments, the PSCI API 401 will require at least the following information such that an insurance request will be transmitted to the PSCI platform: 1) origination/pick-up address; 2) destination/delivery address; 3) identification of the consignor; 4) type of cargo; 5) estimated value of the cargo; 6) type of cargo; and 7) identification of the logistics shipping provider. In one or more other embodiments, the required information provided to the PSCI API 401 such that an insurance request will be transmitted to the PSCI platform may be less or more depending upon the aforementioned factors.

In step 412, if it is determined that the PSCI API 401 has the necessary information (i.e., the shipment details), which includes at least a portion of the shipping information, the shipment details are transmitted to the exemplary PSCI platform 100 executing the PSCI software platform 400 via secure network 110, 270. For example, in one or more embodiments and, optionally, in combination with any embodiment disclosed herein, once the shipment details are received, the PSCI software platform 400 utilizes the shipment details to provide, among other functionality, one or more of 1) a user identification, an authentication and/or security analysis to determine if the user has permission to access the PSCI platform, 2) a compliance analysis to determine if the scheduled shipment is in compliance with one or more Federal, State and local regulatory and compliance rules, 3) a determination as to whether a request for insurance coverage of one or more individual cargo shipments is approved/denied, and/or 4) an insurance coverage quote. In one or more embodiments, a compliance analysis is not required.

For example, in one or more embodiments, one or more of the servers 120*a*-120*n* residing on the PSCI platform 100 perform a number of different services that are implemented by the PSCI software platform 400 installed and running on one more of the servers. The services performed by the PSCI platform software 400 will be described as being performed by engines that utilize software (e.g., software modules and/or components). For example, in one or more other embodiments, particular servers residing, for example, in the logistics shipping provider system (e.g., on one or more logistics shipping provider servers 130a-130n) and/or on the PSCI platform 100 (e.g, servers 120a-120n) may be dedicated to performing one or a few particular services and only have installed those components of the software modules needed for the particular services. For example, some modules may generally be installed on one or more of the non-special-purpose servers residing on the logistics shipping provider system and/or the PSCI platform 100. For example, the software of each module may be implemented in any convenient form, and parts of a module may be distributed across multiple computers so that the operations of the module are performed by multiple computers running software performing the operations in cooperation with each other. In some implementations, some of the operations of a module are performed by special-purpose hardware. For example, in one or more embodiments, the PSCI software platform 400 is generally a software and/or firmware construct provided by processor execution of, for example, software residing in PSCI utility 220 and/or applications 210 residing on one or more servers 120a-120n, and which implements specific functional aspects of the disclosure, according to one or more embodiments. In one or more other embodiments, the PSCI software platform 400 is generally a software and/or firmware construct provided by processor execution of the PSCI software on one or more servers 130a-130n residing in the logistics shipping provider system, and which implements specific functional aspects of the disclosure, according to one or more embodiments.

For example, in one or more embodiments, in step 414, the PSCI risk modeling engine 402 receives the shipment details, via PSCI API 401. For example, in one or more embodiments and, optionally, in combination with any embodiment described herein, the PSCI risk modeling engine 402, with respect to an identified request for insurance coverage for a planned cargo shipment, utilizes the shipment details to determine the commodity type of cargo of the identified cargo included in the cargo shipment, the estimated value of identified cargo included in the cargo shipment, the requested insurance value of the identified cargo included in the cargo shipment, shipping dates (estimated and actual) of the identified cargo shipment, shipping routes and possible exceptions to one or more of the shipping routes concerning the identified cargo shipment, shipping methods and possible exceptions to the shipping methods including, but not limited to, refrigeration needs/requirements (reefer insurance needs), handling specifications, waypoints, etc.

In step 424, a user's access and interaction with the exemplary PSCI platform 100 is managed by the PSCI user experience engine 403. For example, in one or more embodiments and, optionally, in combination with any embodiment described herein, the PSCI platform may utilize the PSCI user experience engine 403 to act as a gateway between a user's system (e.g., logistic shipping provider computer systems including one or more servers 130a-130n, one or more user devices 102a-102n) and the PSCI platform. For example, in one or more embodiments and, optionally, in combination with any embodiment described herein, the PSCI user experience engine 403 provides each user of the PSCI platform a unique access token to authenticate and/or verify the user's identity. For example, in step 424, this unique access token may be received by the user experience module with every request by a user to access the PSCI platform as a query parameter (e.g., /api/endpoint?access_token=2df0e411-b4b1-4aa0-8dff-51b10d13b0e4). For example, in step 424, if a user's identity and/or authentication is not verified, the user is denied access to the PSCI platform and, in one or more embodiments, one or more of an error message, denial message and/or alert is transmitted to the user over a secure network 110, 270.

In one or more embodiments and, optionally, in combination with any embodiment described herein, the PSCI user experience engine 403 utilized in step 424 includes one or more of an interface module, an identity validation module and an access management module. Together, these modules provide user control (e.g., data access definition), security/authentication and authorization. For example, the interface module provides a gateway for communication between the PSCI platform and user computer systems. This communication is established by way of a network, for example, an employer's intranet or network 110, 270 that enables a user to access the PSCI platform. The interface module provides user interfaces (e.g., one or more GUIs) by which a user can be granted access to the PSCI platform. For example, specific access rights can be given to specific logistic shipping providers. In other words, access can be limited to the data that is used to provide insurance quotes for individual cargo shipments and/or other functionality disclosed herein.

In one or more embodiments and, optionally, in combination with any embodiment described herein, the interface module may provide a user with the capability to set and/or select one or more sign-on credentials. For example, a user can select and/or modify a username, password, etc. by way of the interface module. In one or more embodiments and, optionally, in combination with any embodiment described herein, the interface module may utilize biometrics to establish the identity of a user. For example, in one or more embodiments, the interface module can be used to learn, train or gather biometric data (e.g., retinal scan information, iris scan, fingerprints, facial recognition, etc.).

In one or more embodiments and, optionally, in combination with any embodiment described herein, the identity validation module may be utilized to authenticate a user. For example, the authentication for a user can be specific to a particular user's identity and/or authority to access the PSCI platform. For example, a user may be granted the capability to use the PSCI platform to access its data and/or data that a user has provided the PSCI platform in the past (e.g., hours, days, weeks, months, years and/or decades in the past). For example, a user may be granted the capability to access one or more agreements utilized by the PSCI platform (e.g., insurance agreements, user agreements, non-disclosure agreements, etc.) and/or entered into with other service providers (e.g., insurance companies, freight forward companies, cargo management companies, etc.). For example, in one or more embodiments, once a user's identity is proven, data access can be granted to the PSCI platform and the process by which a customer is provided an insurance policy utilizing the PSCI software can commence, as will be discussed herein. In one or more embodiments and, optionally, in combination with any embodiment described herein, authentication and/or identity validation can be accomplished by way of any suitable authentication and/or identity mechanism. For example, in one or more embodiments, a username/password combination can be used. For example, in one or more embodiments, a challenge/response mechanism can be used to validate identity, whereby, one or more questions (e.g., challenges) can be posed to a user. For example, in one or more embodiments, biometrics can be employed to validate identity.

In one or more embodiments and, optionally, in combination with any embodiment described herein, the access management module can regulate which PSCI applications and/or services may be accessed by a user following a confirmed identity and/or authentication. For example, once a user's identity and authentication has been verified, a user may access the PSCI platform to enable the user to send and receive data without a need to re-enter identity and/or authentication credentials. In one or more embodiments and, optionally, in combination with any embodiment described herein, the access management module may maintain information regarding which PSCI applications and/or services are accessible by which users. For example, in one or more embodiments, the access management module may communicate with the interface module to establish which data is accessible to which applications and/or services based upon, for example, defined policies, preferences and/or rules.

In step 426, information, including at least a portion of the shipping information, may be received by the PSCI automated insurance compliance assessment rules engine 404 (referred to as the PSCI rules engine 494 herein), in response to a user entering shipping information via one or more GUIs provided by the PSCI API 401 and transmitting the shipping information to the PSCI platform, to automatically determine if one or more of the shipping characteristics associated with the shipment of cargo are not in compliance with one or more Federal, State or local regulatory and/or compliance regulations. For example, in one or more embodiments, if one or more details and/or characteristics of the shipping cargo (e.g., weight, value, type, etc.) and/or the details associated with the shipment of the cargo (e.g., mode of transportation, transport route(s) (journey legs), weather, environment, context, regional/local/country activity, etc.) are not in compliance with certain rules and/or regulations that apply to the one or more relevant cargo shipments, the PSCI rules engine 404 has one or more of an error message, denial message and/or alert transmitted to the user.

For example, in one or more embodiments, the PSCI rules engine 404 automatically reviews and assesses whether one or more details and/or characteristics of the shipping cargo are not in compliance with one or more Federal, State or local regulatory and/or compliance regulations and/or other legal compliance requirements for entities concerning cargo shipment insurance. In one or more embodiments and, optionally, in combination with any embodiment disclosed herein, the PSCI rules engine 404 stores rules data derived from leg& compliance requirements, license data derived from regulatory requirements, system setup data and supplemental system insurance application data.

In one or more other embodiments, a third party insurance compliance assessment service (e.g., ComplyAdvantage (www.complyadvantage)) is utilized to review and assess whether one or more details and/or characteristics of the shipping cargo are not in compliance with one or more Federal, State or local regulatory and/or compliance regulations and/or other leg& compliance requirements for entities concerning cargo shipment insurance. For example, in one or more embodiments, the PSCI rules engine 404 automatically extracts the insurance application data from at least a portion the shipping information received by the MCI API 401 from a user (e.g., a logistics shipping provider or a customer), generates an insurance compliance information file utilizing at least a portion of the shipping information, and has the insurance compliance information file transmitted over a secure communication network, such as network 110, 270, to an automated compliance assessment system server (not shown) utilized by the third party insurance compliance assessment service. For example, in one or more embodiments, the automated compliance assessment system has its own internal processes to audit the insurance compliance information file for compliance with Federal, state, and local legal compliance requirements. For example, in one or more embodiments, the insurance compliance information file is transmitted via the secure network to an API-based platform that may process hid-quality data for compliance purposes. For example, in one or more embodiments, the ComplyAdvantage API may be integrated into the PSCI software platform (e.g., PSCI API) to allow for the automated screening of PSCI user insurance coverage requests that include at least a portion of the shipping information received by the PSCI platform for one or more individual cargo shipments. For example, in one or more embodiments, once the shipping information is received by the platform, via PSCI API 401, in step 414, the insurance compliance information file is automatically generated by the PSCI rules engine and automatically transmitted, via the secure network 110, 270, to an insurance compliance platform (e.g., ComplyAdvantage in step 426, or another suitable compliance platform), such that the compliance platform may screen the insurance compliance information file in real time, or near real time, against insurance regulatory and/or compliance rules, sanction lists, watchlists, politically exposed persons/products lists and/or adverse media. L_ or example, in one or more embodiments, the insurance compliance information file is reviewed for legal compliance requirements imposed by Federal, State, and/or local jurisdictions, as well as licensing requirements that the client insurance provider company and related personnel must satisfy. For example, the results of the audit process are transmitted over the secure communication network 110, 270 and received by the exemplary PSCI platform 100 executing the PSCI software, with areas of noncompliance indicated. For example, in one or more embodiments, the rules engine 404 automatically transmits one of an error, message and/or alert to notify the user that one or more of the shipping characteristics for the cargo shipment are not in compliance and displays the reasoning for noncompliance.

For example, in one or more embodiments and, optionally, in combination with any embodiment disclosed herein, once the PSCI API 401 receives the shipping information in step 412 and transmits the same to the exemplary PSCI platform 100 executing, the MCI software in step 412, the PSCI rules engine 404 automatically extracts cargo shipment insurance data from the shipping information and performs an insurance compliance assessment review at step 426. In one or more embodiments and, optionally, in combination with any embodiment disclosed herein, in response to exemplary PSCI platform 100 executing the PSCI software receiving the shipping information via PSCI API 401 in step 414, the PSCI rules engine 404 automatically utilizes at least a portion of the shipping information to generate the insurance compliance information file and automatically transmit the same to the insurance compliance platform. In one or more embodiments and, optionally, in combination with any embodiment disclosed herein, in response to the exemplary PSCI platform 100 executing the PSCI software receiving the shipping information via PSCI API 401 in step 414, the PSCI rules engine 404 automatically transmits at least a portion of the shipping information to the insurance compliance platform such that an insurance compliance assessment may be triggered. In one or more embodiments, for example, PSCI rules engine 404 may automatically perform an initial insurance compliance assessment in step 426 in response to at least a portion of the shipping information, and/or any other information (e.g., results of the initial insurance compliance assessment) required to perform an insurance compliance assessment being transmitted to the PSCI rules engine 404 in step 414. For example, in one or more embodiments and, optionally, in combination with any embodiment disclosed herein, the insurance compliance assessment performed by the third party insurance compliance platform and/or the PSCI rules engine 404 may be performed automatically, and/or triggered by a change in status of any one or more characteristics of the shipping information and/or the cargo at any time during the shipping process (e.g., staging the cargo at a location to be shipped and/or during the transportation of the cargo included in the cargo shipment), or at milestones in the work flow of an insurance application in the PSCI API. In one or more embodiments and, optionally, in combination with any embodiment disclosed herein, an insurance compliance assessment may also be triggered by a request by a PSCI platform user.

In one or more embodiments and, optionally, in combination with any embodiment disclosed herein, the PSCI rules engine 404 responds to an insurance compliance assessment request in step 426, received by the logistics shipping provider in step 444 via the PSCI API 401, by transmitting an insurance compliance assessment request result message. With reference to FIGS. 4B and 4C, for example, in one or more embodiments and, optionally, in combination with any embodiment disclosed herein, in step 426, in response to a determination that the cargo shipment is not in compliance with one or more regulatory/compliance rules/regulations, the PSCI rules engine 404 transmits a message that the request for insurance coverage for one or more relevant cargo shipments has been declined. For example, in one or more embodiments, in response to the PSCI rules engine 404 transmitting or having the decline message transmitted, the PSCI API 401, in step 450, automatically communicates the message (e.g., message, alert, letter, indication, etc.) to the PSCI platform user (e.g., logistics shipping provider and/or other user) that indicates that the request for insurance coverage has been declined. For example, the message may include the one or more reasons) for the decision to decline coverage. For example, as is indicated in step 450 in FIG. 4B, the request for cargo insurance may be automatically declined if, for example, the type of cargo included in the cargo shipment to be transported by the logistics shipping provider falls within an automatic exclusion category for insurance coverage (e.g., a category that includes one or more types of cargo that may require special handling and transportation (e.g., refrigeration, shorter transportation times than what is offered, etc.), may be hazardous, may be prone to damage for one or more reasons, and/or may be excluded for other reasons, etc.). For example, in step 452, liability for the cargo included in the cargo shipment remains with the customer (i.e., the shipper).

In one or more embodiments and, optionally, in combination with any embodiment disclosed herein, the PSCI rules engine 404 responds to an insurance compliance assessment request in step 426, received by the logistics shipping provider in step 444 via the PSCI API 401, by transmitting an insurance compliance assessment request result message. With reference to FIGS. 4B and 4C, for example, in one or more embodiments and, optionally, in combination with any embodiment disclosed herein, in step 426, in response to a determination that the cargo shipment is in compliance with one or more regulatory/compliance rules/regulations, the PSCI rules engine 404 transmits a message that the request for insurance coverage for one or more relevant cargo shipments has been approved. For example, in one or more embodiments, in response to the PSCI rules engine 404 transmitting or having the approval message transmitted, the PSCI API 401, in step 446, automatically communicates the message (e.g., message, alert, letter, indication, etc.) to the PSCI platform user (e.g., logistics shipping provider and/or other user) that indicates that the request for insurance coverage has been approved. For example, the message may include an insurance quote to provide insurance coverage for the identified individual cargo shipment by an insurance provider. Once the customer (e.g., shipper) pays the logistics shipping provider for the shipment and all associated costs, and the insurance policy, and all associated costs, the liability for the cargo shipment shifts to the insurance provider at step 448. For example, as is indicated in step 446 in FIG. 4B, the request for cargo insurance may be automatically approved if, for example, the type of cargo included in the cargo shipment to be transported by the logistics shipping provider falls within a category that has been deemed to be one for which an insurance provider can provide coverage.

In one or more embodiments and, optionally, in combination with any embodiment disclosed herein, at least a portion of the information utilized by the insurance compliance platform and/or the automated insurance compliance assessment rules engine to render an insurance compliance assessment is transmitted to the machine learning engine referenced in FIG. 4C and discussed herein, for example, with reference to step 420.

In step 416, in one or more embodiments, real time cargo shipment data provided by the real time layer information module for a given cargo shipment is received, and/or compiled, and transmitted to the PSCI risk modeling engine 402 and/or one or more PSCI databases 150a-150n, 251 that are accessible by the PSCI risk modeling engine 402. For example, in one or more embodiments, the sensor data may be utilized by the PSCI platform to dynamically impact the insurance coverage quote offer with respect to the individual cargo shipment. For example, real time and/or near real time sensor data may be utilized by the PSCI platform, with respect to one or more individual cargo shipments, to provide a quote for an offer for insurance coverage, and/or dynamically change the quote for the insurance coverage to decline coverage, provide additional coverage, change the insurance policy premium with respect to an offer for insurance coverage, or rescind a denial of insurance coverage. For example, in one or more embodiments, the dynamic change of insurance coverage may be based upon one or more weather related occurrences, environmental occurrences, contextual occurrences (traffic information (e.g., congestion, accidents), road closures, Department of State warnings), sensed conditions of the cargo, and/or one or more external factors that may impact the cargo during shipment. For example, in one or more embodiments, the insurance policy premium may be changed by changing one or more of the commodity price modifiers, the risk probability values and/or the total price offered to a consignor to provide insurance coverage for one or more individual shipments, discussed herein. For example, in one or more embodiments, one or more commodity price modifiers and/or risk probability values, utilized to determine the insurance policy premium, may be dynamically changed by the PSCI risk modeling engine 402 based at least in part on the real time shipment data. For example, in one or more embodiments, one or more commodity price modifiers are set by the authorized user (e.g., insurance provider), and one or more risk probability values, utilized to determine the insurance policy premium, may be dynamically changed by the PSCI risk modeling engine 402 based at least in part on the real time shipment data. For example, in one or more embodiments, real time shipment data may include but is not limited to sensor data (e.g., environmental, weather, cargo condition/information and/or sensor data, equipment failure/malfunction, fire, theft, etc.). For example, the sensor may include sensor data collected and/or compiled from one or more sensors 290 and/or one or more telecommunication and/or telematics devices 140, 295. For example, in one or more embodiments, the system executing the PSCI software may interface with internal databases and/or external proprietary databases and/or public databases to provide real time shipment data concerning weather conditions, weather trends, weather forecasts and any other data that utilizes weather data and/or data that may be utilized to obtain weather information that may impact a given cargo shipment, including but not limited to the weather parameters discussed herein. For example, in one or more embodiments, the system executing the PSCI software may be provided by one or internal PSCI servers that access one or more internal or remote databases and/or one or more logistic shipping provider servers that access one or more internal or remote databases. For example, in one or more embodiments, the exemplary inventive PSCI platform executing the PSCI software may interface with internal databases and/or external proprietary databases and/or public databases to provide real time shipment data concerning current and/or trending news (e.g., traffic accidents, Department of State warnings, weather forecasts, regional and/or global conflict, work force upheavals (e.g., strikes), work stoppages, militia movements, violent and/or territorial and/or intimidation skirmishes, tactics or conflicts, intimidation tactics, data concerning terrorists groups, organizations, movements and/or activity), and any other data that utilizes news data and/or data that may be utilized to obtain current and/or trending news information that may impact a given cargo shipment. For example, in one or more embodiments and, optionally, in combination with any embodiment disclosed herein, the real time shipment data that may impact a given cargo shipment may be provided as model data and/or observational data. For example, in one or more embodiments and, optionally, in combination with any embodiment disclosed herein, the real time shipment data may be provided via a Platform as a Service (PaaS).

For example, in one or more embodiments, for an individual cargo shipment that includes perishable cargo where a refrigerated truck is required to transport the cargo included in the cargo shipment, one or more sensors and/or telematics devices one or more sensors 290 and/or one or more telecommunication and/or telematics devices 140, 295 may be tracking temperature control of the cargo storage area of the refrigerated truck. In one or more embodiments, in step 416, the sensor data related to the temperature of the refrigerated truck is received and compiled by one or more databases (e.g., one or more PSCI databases 251 residing on the PSCI platform, one or more network databases 150a-150n, one or more third party databases 1701-170n) in real time, or near real time, and utilized by the PSCI risk modeling engine to determine if insurance coverage should be provided, if the insurance policy premium for the insurance coverage should be increased or decreased, or if the provided insurance coverage should be altered. For example, if the sensor data one or more sensors 290 and/or one or more telecommunication and/or telematics devices 140, 295 indicated that the cargo storage container included in the refrigeration truck was not pre-cooled before the perishable cargo included in the cargo shipment was placed in the container, the PSCI risk modeling engine 402 in step 414 may be configured to automatically utilize the sensor data to perform one or more functions including, but not limited to, deny insurance coverage, offer a higher insurance policy premium for insurance coverage, offer a higher insurance quote for insurance coverage, or alter the terms of an existing insurance contract. For example, in one or more embodiments, each one of the aforementioned functions may be performed without underwriter intervention, review, authorization or approval.

In step 418, in one or more embodiments, historical shipment data provided by the historical layer information module for a given cargo shipment is received, and/or compiled, and transmitted to the PSCI risk modeling engine 402 and/or one or more PSCI databases 150a-150n, 251 that are accessible by the PSCI risk modeling engine 402. In one or more other embodiments, the historical layer information module is included in the PSCI risk modeling engine 402 and is configured to receive or compile historical shipment data utilized by the PSCI risk modeling engine 402 to provide quotes for insurance coverage for individual cargo shipments. For example, one or more commodity modifiers, utilized to determine the insurance policy premium, may be dynamically changed by the PSCI risk modeling engine 402 based at least in part on the historical shipment data. For example, in one or more embodiments, historical shipment data that includes data for similar shipments to the relevant cargo shipment is compiled by the PSCI risk modeling engine 402. For example, the historical shipment data may be compiled by the PSCI risk modeling engine 402 for any suitable duration of time (e.g., 1-12 months prior to the shipment date, 1-5 years prior to the shipment date, 5-10 years prior to the shipment date, 10-20 years prior to the shipment date, etc.) required to provide the suitable amount of risk information to provide a model of insurance risk to assist in providing an insurance quote. For example, in one or more embodiments, historical shipment data may include shipping information for previous similar cargo shipments for any suitable historical period (e.g., hours, days, months, years, decades, etc.), and/or claims made with respect to cargo shipments for any suitable historical period (e.g., hours, days, months, years, decades, etc.), and/or historical sensor data for any suitable historical period (e.g., hours, days, months, years, decades, etc.), including but not limited to sensor data disclosed herein (e.g., environmental, weather, cargo condition/information and/or sensor data, equipment failure/malfunction, fire, theft, etc.) previously collected from one or more sensors 290 and/or one or more telecommunication and/or telematics devices 140, 295 for similar shipments to the relevant cargo shipment compiled for any suitable duration of time. For example, historical sensor data over an entire supply chain may be utilized by the PSCI risk modeling engine 402 in step 414 to model and/or determine a loss history (cargo shipment shortfall history) for a particular storage, a particular shipper, a particular supplier (insured), a particular product, a particular mode of transport, a particular cargo container, a particular product packaging, and any combination thereof. For example, in one or more embodiments, historical shipment data may include historical weather data and/or environmental data is compiled for similar transportation routes that may be impacted by one or more similar or relevant weather or environmental conditions. For example, the historical weather data and/or environmental data may be compiled by the PSCI risk modeling engine 402 for any suitable duration of time (e.g., 1-12 months prior to the shipment date, 1-5 years prior to the shipment date, 5-10 years prior to the shipment date, 10-20 years prior to the shipment date, etc.) required to provide the suitable amount of risk information to model an insurance risk.

In one or more embodiments and, optionally, in combination with any embodiment disclosed herein, the PSCI risk modeling engine 402 may utilize real time shipment data, historical shipment data, and/or any other suitable data and/or historical data in steps 416 and 418 (e.g., the supply chain historical data) to generate an insurance quote to provide insurance coverage for an individual cargo, model an insurance risk for one or more individual cargo shipments, and/or determine a loss benchmark and/or standard (cargo shipment shortfall benchmark) for any of a particular storage, a particular shipper, a particular supplier (insured), a particular product, a particular mode of transport, a particular cargo container, a particular product packaging, and any combination thereof. In one or more embodiments and, optionally, in combination of any embodiment described above or below, the historical shipment data for a given cargo shipment that is compiled may be, without limitation, historical piracy data, historical theft data, historical terrorist data, historical natural disaster data, historical regional/global conflict data, historical political risk data, weather, news (e.g., strike announcements), etc. In one or more embodiments, the data collection component (e.g., the real time layer information module and/or the historical layer information module) of the PSCI risk modeling engine 402 can also include one or more PSCI data crawlers configured to collect real time shipment data and/or historical shipment data and store the same in one or more PSCI databases 150a-150n, 251 that are accessible by the PSCI risk modeling engine 402. In one example, the PSCI data crawler(s) may comprise a web crawler that can, for example, utilize identification information (e.g., key words) about one or more relevant individual cargo shipments to gather relevant real time shipment data and/or historical shipment data from the Internet or any publicly accessible online source of information. In some embodiments, the data crawling can be automated using a bot. Furthermore, the bot can use natural language processing to parse web page content and select relevant content. For example, the data collection component the PSCI risk modeling engine 402 may monitor news feeds and match data, including name, identification, field, events, places, and other relevant characteristics, to one or more relevant cargo shipments to identify potentially relevant material. In one or more embodiments, the data collection component the PSCI risk modeling engine 402 utilizes the PSCI data crawler(s) to collect relevant real time shipment data and/or historical shipment data by parsing textual content from various news feeds and identify keywords relevant to one or more relevant cargo shipments.

For example, in one or more embodiments, in step 414, the PSCI risk modeling engine 402 utilizes at least a portion of the shipment details to determine possible exceptions to one or more of the mode of transport (e.g., road, water, rail, air, and/or any combination of the aforementioned) of the identified cargo shipment, the commodity type(s) of cargo of the identified cargo included in the cargo shipment, the estimated value of the identified cargo included in the cargo shipment, the requested and the estimated actual shipping dates of the identified cargo shipment, and/or the identified and/or requested shipping routes of the identified cargo shipment. In one or more embodiments, for example, the PSCI risk modeling engine 402 utilizes one or more of at least a portion of the shipment details, historical shipment data or real time shipment data received by the PSCI databases, or sources utilized and accepted by the relevant insurance industry (e.g., Kelley Blue Book®, internal policies, external policies, industry practice) or to determine if the declared estimated value of the identified cargo included in the cargo shipment is within an acceptable value range (e.g., 1%, 3.5%, 5%, 7.5%, 10%, or within any predetermined acceptable range) of the estimated value of the identified cargo included in the cargo shipment, according to industry standards, minus any depreciation. For example, in one or more embodiments, the acceptable value range (measured in the relevant monetary value (e.g., U.S. dollars, Euros, Pounds, etc.)) may depend upon a range within which the estimated value of the identified cargo included in the cargo shipment falls (e.g., 1% for an estimated value that falls within a first value range, 3.5% for an estimated value that falls within a second value range that is greater than the first value range, 5% for an estimated value that falls within a third value range that is greater than the second and first value ranges, etc.). For example, in one or more embodiments, in response to the PSCI risk modeling engine 402 determining that the declared estimated value of the identified cargo included in the cargo shipment, provided by the customer/consignor and/or the logistics shipping provider, is outside of an acceptable value, the PSCI user experience engine 403 has an indicator (e.g., message, text message, alert, error message, and/or any other suitable type of indicator) automatically transmitted to the shipping logistics provider and/or the customer/consignor, via the PSCI API 401. For example, an indicator that includes a solution (e.g., an estimated value of the identified cargo included in the cargo shipment as determined by the PSCI risk modeling engine 402) is automatically transmitted to the customer/consignor and/or the shipping logistics provider.

For example, in one or more embodiments, in step 414, the PSCI risk modeling engine 402 may determine that a provided estimated time of transit (e.g., transit time required to ship the identified cargo included in the cargo shipment from its origination geographical location to the identified destination), included in the received shipment details, is incorrect. For example, in one or more embodiments, the PSCI risk modeling engine 402 utilizes one or more of at least a portion of the shipment details, historical shipment data and/or real time shipment data received by the PSCI databases, or sources utilized and accepted by the relevant insurance industry to determine if the provided estimated transit time of the identified cargo shipment is within an acceptable value range. For example, in one or more embodiments, in response to the PSCI risk modeling engine 402 determining that estimated transit time, provided by the customer/consignor and/or the logistics shipping provider, is outside of an acceptable value, an indicator is automatically transmitted to the customer/consignor and/or the shipping logistics provider. For example, in one or more embodiments, the PSCI user experience engine 403 has an indicator (e.g., message, text message, alert, error message, and/or any other suitable type of indicator) automatically transmitted to the shipping logistics provider and/or the customer/consignor, via the PSCI API 401. For example, an indicator that includes a solution (e.g., an estimated time of travel, and/or a suggested mode of transport and/or a transportation route, as determined by the PSCI risk modeling engine 402) is automatically transmitted to the customer/consignor and/or the shipping logistics provider.

For example, in one or more embodiments, the PSCI risk modeling engine 402 utilizes one or more of at least a portion of the shipment details, historical shipment data or real time shipment data received by the PSCI databases, or sources utilized and accepted by the relevant insurance industry to determine if the provided mode of transport (e.g., road, water, air, rail, etc.) utilized in the identified cargo shipment is an acceptable mode of transport. For example, in one or more embodiments, in response to the PSCI risk modeling engine 402 determining that the provided (details provided by the customer/consignor and/or the logistics shipping provider) mode of transport is not acceptable based upon acceptable and/or provided criteria (e.g., estimated time or transport, geographical locations of the origination and destination, weather, regional conflict, risk of theft, risk of damage, unavailable resources (e.g., refrigeration container/truck, container, restraints, fuel, personnel, and/or other details provided by the customer/consignor and/or the logistics shipping provider)), an indicator is automatically transmitted to the customer/consignor and/or the shipping logistics provider. For example, in one or more embodiments, the PSCI user experience engine 403 has an indicator (e.g., message, text message, alert, error message, and/or any other suitable type of indicator) automatically transmitted to the shipping logistics provider and/or the customer/consignor, via the PSCI API 401. For example, in one or more embodiments, in response to a determination by the PSCI risk modeling engine 402 that the mode of transport for one or more of the transport legs in a transport route, provided by the customer/consignor and/or the logistics shipping provider, was confined to an option (e.g., road, water, air, rail, etc.) that is determined to be impossible or improbable based upon acceptable and/or provided criteria (e.g., estimated time or transport, geographical locations of the origination and destination, weather, regional conflict, risk of theft, risk of damage, unavailable resources, etc.), an indicator that includes a solution (e.g., the addition of another mode of transport not included in the original shipment details, including one of rail, air, water, road, etc. for one or more of the transport legs, and/or a suggested transport route, and/or a suggested addition of a transport leg to be included in the provided transport route or taken instead of an identified transport leg in the provided transport route) is automatically provided to the customer/consignor and/or the shipping logistics provider, via the PSCI API 401. For example, in one or more embodiments, the PSCI user experience engine 403 has an indicator (e.g., message, text message, alert, error message, and/or any other suitable type of indicator) automatically transmitted to the shipping logistics provider and/or the customer/consignor, via the PSCI API 401.

In step 414, the PSCI risk and modeling engine 402 receives the shipment details provided by the identified logistics shipping provider, via the PSCI API 401. For example, in one or more embodiments, the shipment details provided by a user device 102 and/or the logistics shipping provider computer system (e.g., one or more server devices 130a-130n), via the PSCI API 401, is received by the PSCI risk modeling engine 402 to automatically calculate the risk characteristics that are unique to an individual cargo shipment utilizing one or more tools and/or methods (e.g., complex computer-generated models to predict the likelihood of loss).

In one or more embodiments and, optionally, in combination with any embodiment disclosed herein, in step 414, at least a portion of the real time shipment data and/or a least a portion of the historical shipment data is provided to the PSCI risk modeling engine 402 that may enable a user to calculate the risk characteristics that are unique to an individual cargo shipment utilizing one or more of the risk modeling methods and/or tools disclosed herein. For example, the sensor data provided by one or more sensor devices 290(a)-(n) and/or one or more telecommunication and/or telematics devices 140, 295, real time cargo shipment data, and historical cargo shipment data and real time data (e.g., data concerning a given cargo type, weather trends and/or forecasts, traffic trends and/or forecasts, regional conflict data and/or forecasts, travel pathway condition information and/or forecasts, etc.) are processed by the PSCI risk modeling engine 402 to automatically provide an insurance policy quote to the consignor (e.g., logistics shipping provider) based upon a dynamic insurance pricing model in real time, or near real time.

For example, in one or more embodiments and, optionally, in combination with any embodiment disclosed herein, the dynamic insurance pricing model generated and utilized by PSCI risk modeling engine 402 bases the insurance quote on the estimated value of the shipment based upon a base level algorithm that can be adjusted by modifiers.

In one or more embodiments and, optionally, in combination with any embodiment disclosed herein, the dynamic insurance pricing model utilized by PSCI risk modeling engine 402 to provide an insurance quote to a consignor may be based upon an insurance policy premium, a technology solution value, and a distribution fee. For example, in one or more embodiments, the insurance policy premium may be the amount of money paid to the insurance company for the insurance policy you are purchasing. For example, in one or more embodiments, the base insurance policy premium may be calculated by PSCI risk modeling engine 402 utilizing the predetermined estimated value of the cargo included in the cargo shipment (i.e., the insured value) times the 'risk probability value'. The base insurance policy premium is referred to as the 'probable maximum loss' (PML) and calculated by the formula [risk]=[insured value]*[risk probability value]. For example, the 'insured value' of the cargo included in the cargo shipment may be provided by the customer/consignor at the time of booking the shipment with the logistics shipping provider or determined by the PSCI risk modeling engine utilizing one or more sources utilized for determining the value of an asset (minus depreciation) (e.g., Kelley Blue Book®, etc.). In one or more embodiments, the estimated value of the cargo included in the cargo shipment is the insured value. For example, in one or more embodiments, the 'risk probability value' is a value below 1 (e.g., 0.025) and is a measurement of the probability that there will be a claim on the insurance policy.

For example, in one or more embodiments, the PSCI risk modeling engine 402 is configured to dynamically adjust an insurance pricing model according to the commodity price modifiers and the desired underwriter premiums by dynamically adjusting the 'risk probability value' based upon one or more of shipment details, real time shipment data and historical shipment data obtained from one or more sources, as discussed herein. For example, the 'maximum allowed probability' can be configured by an insurance provider, and/or the PSCI system for an insurance provider, via the PSCI policy management utilized to set the values for the PSCI insurance bracket identifiers disclosed pursuant to Table 2, provided herein. For example, the 'maximum allowed probability' is configured for each commodity type of cargo, as discussed with reference to FIGS. 5A through 5G herein. For example, in one or more embodiments, the base insurance policy premium equals the PML, which may be determined by the PSCI risk modeling engine 402 utilizing the following exemplary formula (1):

Base Insurance Policy Premium(risk)=[$insured value]*[risk probability value].

In one or more embodiments, the PSCI computer-based system utilizes technological solutions to streamline business processes and operations. For example, in one or more embodiments and, optionally, in combination with any embodiment disclosed herein, the exemplary PSCI computer-based platform 100 executing the exemplary inventive PSCI software platform 400 automates one or more complex and high-risk processes, such as property assessment, fraud detection, claims verification and/or insurance premium processing, using artificial intelligence (AI). The costs for these technological solutions may also be included in the insurance premium. For example, in one or more embodiments and, optionally, in combination with any embodiment disclosed herein, the base technology solution value may be calculated by [insured value]*[risk probability value]. Similar to the base insurance policy premium, the PSCI system is configured to dynamically adjust the 'risk probability value' for the technology solution calculation as well. For example, in one or more embodiments, the base technology solution value may be determined by PSCI risk modeling engine 402 utilizing the following exemplary formula (2):

Technology Solution Value=[$insured value]*[risk probability value].

In one or more embodiments, the PSCI computer-based system may include the occurrence of one or more distribution fees and/or commissions and/or sales costs (collectively referred to herein as distribution fee(s)). For example, the one or more distribution fees may take into account the process of calculating, allocating, and reconciling distribution fees provided to distributors of a the PSCI based insurance policy. For example, asset managers utilizing the PSCI platform may offer a commission, either a one-time or ongoing commission, to distributors of insurance contracts as an incentive for offering and/or establishing clients (e.g., customers and/or logistics shipping providers) for the PSCI insurance. For example, in one or more embodiments and, optionally, in combination with any embodiment disclosed herein, the dynamic insurance pricing model utilized by PSCI risk modeling engine 402 determines the distribution fee value based upon a predetermined percentage of the sum of the insurance policy premium and the technology solution value. For example, in one or more embodiments, the distribution fee value may be determined by PSCI risk modeling engine 402 utilizing the following exemplary formula (3):

Distribution Fee Value=predetermined percentage* (Insurance Policy Premium+Technology Solution Value).

For example, the illustrative calculations using the provided formula (1), formula (2) and formula (3) yield a dynamic insurance pricing model that is based upon the estimated value of the cargo included in the identified cargo shipments. For example, in one or more embodiments, the dynamic insurance pricing model may yield an insurance quote determined by the following exemplary formula (4):

Insurance Quote=Insurance Policy Premium+Technology Solution Value+Distribution Fee Value.

In one or more embodiments, for example, to satisfy the payment obligations under the shipping contract with the logistics shipping provider, the consignor (i.e., the sender of the goods) would pay for the shipment cost provided by the logistics shipping provider (e.g., costs to ship the cargo), and possibly a value added tax (VAT), the insurance policy premium (Insurance Policy Premium) and possibly an insurance premium tax (IPT), the technology costs (Technology Solution Value), and the distribution fee (Distribution Fee Value) and possibly a value added tax (VAT). The taxes, if any, depend on the combination of jurisdiction of the consignor, the underwriter, the particular insurance provider and/or jurisdiction of the logistic shipping provider, etc. For example, in one or more embodiments, the PSCI risk modeling engine 402 will determine a receipt for the consignor which, for example, may itemized the aforementioned costs and taxes.

In one or more embodiments, the PSCI platform automatically provides instant insurance quotes to a consignor for one or more individual cargo shipments in real time, or near real time. For example, in one or more embodiments, the PSCI risk modeling engine 402 is configured to dynamically adjust an insurance pricing model according to the carried commodity price modifiers and the desired underwriter premiums using one or more modifiers. For example, in one or more embodiments and, optionally, in combination with any embodiment described herein, the PSCI risk modeling engine 402 determines the insurance policy premium based upon the value of the cargo included in the cargo shipment and type of cargo that is to be shipped by the logistics shipping providers. For example, the one or more modifiers may be used to affect the valuation of the cargo shipment. For example, in one or more embodiments and, optionally, in combination with any embodiment disclosed herein, the price of insurance coverage for an individual cargo shipment determined by the dynamic adjusted insurance pricing model can be based, at least in part, upon one or more of 1) the estimated value of the shipment (insured value), 2) the commodity price modifiers, which can be a set or dynamically adjusted value, based on, for example, the commodity type of cargo to be shipped, and utilized to adjust the pricing of the premium to be competitive in the market and maximize profits, 3) the risk probability value which is a measurement of the probability that there will be a claim on the insurance policy, and/or 4) additional parameters that are agreed upon in advance by, for example, an insurance provider and/or an underwriting partner (discussed with reference to Table 2). For example, in one or more embodiments, the commodity price modifiers, utilized to differentiate (e.g., set the value of a commodity price modifier based on, for example, the commodity type of cargo to be shipped to adjust the pricing to be competitive in the market and maximize profits) the insurance premiums, the technology solutions and/or the distribution fees utilized by the PSCI risk modeling engine 402 to automatically determine an insurance quote and/or insurance policy premium for an individual cargo shipment, may be the following as provided in Table 1:

TABLE 1

| Commodity Modifier Type | Commodity Modifier Value |
|---|---|
| Default Modifier | 1 |
| Exclusion Modifier | 0 |
| Increased Modifier | >1 (increases the insurance premium) |
| Decreased Modifier | <1 (decreases the insurance premium) |

In step 414, in one or more embodiments and, optionally in combination with any embodiment disclosed herein, the exemplary insurance policy premium function, the exemplary technology solution tuned on, and the exemplary distribution fee function (and all applicable taxes) are utilized by the PSCI risk modeling engine 402 to model an insurance risk with respect to an individual cargo shipment and automatically determine an insurance quote and/or insurance policy premium for the individual cargo shipment in real time, or near real time. In one or more embodiments, the PSCI risk modeling engine 402 is configured to modify an insurance pricing model by utilizing one or more commodity price modifiers, as referenced in Table 1 provided below, when applying the exemplary insurance policy premium function, the exemplary technology solution function, and the exemplary distribution fee function to the insurance pricing model. In one or more other embodiments, the PSCI risk modeling engine 402 is configured to modify an insurance pricing model by modifying one or more risk probability values, while utilizing one or more set commodity price modifiers, when applying the exemplary insurance policy premium function, the exemplary technology solution function, and the exemplary distribution fee function to the insurance pricing model. For example, applying an increased commodity price modifier of 1.05 with respect to the exemplary insurance policy premium function would result in a five percent (5%) increase in the value of the insurance policy premium, which may be determined by the following exemplary formula (5):

Adjusted Insurance Policy Premium=1.05*[$insured value]*[risk probability value].

For example, an increased commodity price modifier of 1.05 with respect to the exemplary technology solution function would result in a five percent (5%) increase in the value of the technology solution value, which may be determined by the following exemplary formula (6):

Adjusted Technology Solution Value=1.05*[$insured value]*[risk probability value].

For example, a decreased commodity price modifier of 0.95 with respect to the exemplary insurance policy premium function would result in a five percent (5%) decrease in the value of the insurance policy premium, which may be determined by the following exemplary formula (7):

Adjusted Insurance Policy Premium=0.95*[$insured value]*[risk probability value].

For example, a decreased commodity price modifier of 0.95 with respect to the exemplary technology solution function would result in a five percent (5%) decrease in the value of the technology solution value, which may be determined by the following exemplary formula (8):

Adjusted Technology Solution Value=0.95*[$insured value]*[risk probability value].

In one or more embodiments, the utilization of the risk probability value(s) and/or commodity price modifier(s) included in the calculation of an insurance policy premium performed by the PSCI risk modeling engine 402 allows for the conventional underwriting process to be removed from the process of providing insurance coverage for a cargo shipment. For example, in one or more embodiments and, optionally, in combination with any embodiment described herein, the PSCI risk modeling engine 402 automatically determines the insurance policy premium based upon certain underwriter parameters including, for example, the value of the cargo included in the cargo shipment and/or the commodity type of cargo (as disclosed herein with reference to FIGS. 5A-5G) that is to be shipped by the logistics shipping providers and the mode of transportation utilized to ship the cargo.

In one or more embodiments, the utilization of the risk probability value(s) and/or the commodity price modifier(s) included in the calculation of a technology solution value performed by the PSCI risk modeling engine 402 allows for the adjustment of the technology fee for each commodity type of cargo in order to react to market demands, without having to change the insurance premium. For example, in one or more embodiments, the costs for these technological solutions utilized to provide a real time, or near real time, insurance quote to provide insurance coverage for an identified cargo shipment, disclosed herein, may also be provided without having to change the insurance premium. For example, in one or more embodiments and, optionally, in combination with any embodiment disclosed herein, the risk probability value(s) and/or the commodity price modifier(s) utilized to calculate the technology solution value may be calculated independently of one another and of the risk probability value(s) and/or the commodity price modifier(s) utilized to calculate the insurance policy premium.

In step 444, the shipping information that is required by the PSCI risk modeling engine 402 to provide an insurance quote for the identified cargo shipment (shipment details), is received, via the PSCI API 401. For example, in one or more embodiments, the consignor declares the necessary information required to determine the commodity types of the cargo included in the individual cargo shipment in step 408, as illustrated in FIG. 4B, at the time of providing the necessary details to enter into a shipping contract with the logistics shipping provider. For example, in one or more embodiments, in step 442, once the shipment details are provided to the PSCI API 401, the same is transmitted to the exemplary PSCI platform 100. For example, in one or more embodiments, the logistics shipping provider declares the necessary information required to determine the commodity types of the cargo included in the cargo shipment in step 442, as illustrated in FIG. 4B. In one or more other embodiments, the insurance cargo policies for the relevant logistic shipping provider(s) are accessibly stored in one or more PSCI databases 150a-150n, 251 in advance and may be utilized by the PSCI risk modeling engine 402 in combination with at least a portion of the shipment details received via the PSCI API 401 to automatically determine the commodity transport modifiers utilized to generate an insurance pricing model for an individual cargo shipment. For example, in one or more embodiments, the PSCI risk modeling engine 402 at step 414 determines the commodity types of the cargo included in the cargo shipment and the transport types of transport utilized to transport the cargo included in the cargo shipment, utilizing at least a portion of the shipping information provided by one or more of the consignor or the logistics shipping providers. In one or more embodiments, the PSCI risk modeling engine 402 utilizes the commodity types and the transport types to adjust the risk probability value(s) and/or commodity price modifiers to, in turn, adjust the minimum insurance premium and/or base insurance price for an insurance policy. For example, the PSCI risk modeling engine 402 utilizes known commodity types and the transport types that the underwriter has pre-approved for insurance coverage, and the underwriter's desired insurance premiums and price factors associated with each of the commodity types and the transport types. For example, desired premiums and price factors are represented by the risk probability value(s) and/or the commodity price modifiers and are used by the PSCI risk modeling engine 402 to adjust the minimum insurance premium and/or base insurance price for an insurance policy. For example, once the underwriter parameters are known, the PSCI risk modeling engine 402 automatically applies the parameters to one or more individual cargo shipments to provide a quote for insurance coverage in real time, or near real time, i.e. a process that does not require an underwriting valuation, review and/or authorization.

For example, in one or more embodiments and, optionally, in combination with any embodiment described herein, the exemplary computer-based inventive PSCI platform executing the exemplary inventive PSCI software (i.e., the PSCI risk modeling engine 402) receives underwriter parameters from certain authorized users (e.g., insurance providers, underwriters, etc.) that allow the authorized users to an sell insurance policy(ies) in real time, or near real time, to a consignor at the time of booking the shipment through the identified logistics shipping provider for one or more individual cargo shipments—e.g., a process that does not require an underwriting valuation, underwriting review and/or underwriting authorization before the insurance policy(ies), via an insurance quote provided in real time or near real time, is offered to the consignor at the time the consignor enters into a shipping contract with a logistics shipping provider.

For example, in one or more embodiments and, optionally, in combination with any embodiment disclosed herein, an authorized user (e.g., insurance company (insurer), underwriting company (underwriter)) may utilize the secure PSCI platform portal to provide information that is accessibly stored in one or more PSCI databases 150a-150n, 251 and utilized by the PSCI risk modeling engine 402 to offer insurance policies and provide insurance quotes in real time, or near real time, to consignors. For example, the information provided by one or more authorized users may include, but is not limited to, one or more of the following: 1) the commodity types of cargo that is insurable by the insurer/underwriter; 2) modes of transportation, that may be utilized to ship the cargo, that are insurable by the insurer/underwriter; 3) areas in which the insurer/underwriter are willing to insure and/or exclude insurance coverage; 4) the maximum coverage in which the insurer/underwriter will provide for each commodity type of cargo; 5) cargo insurance policies entered into by one or more logistics shipping providers; 6) and/or other information necessary to offer per shipment cargo insurance to a consignor at the time of entering a shipment contract with a logistics shipping provider; and 6) (optional) a logo for the PSCI platform website.

For example, in one or more embodiments and, optionally, in combination with any embodiment disclosed herein, the PSCI risk modeling engine 402 provides a dynamic automated computer-based pre-underwriting solution for participant authorized insurance providers (e.g., insurance company (insurer), underwriting company (underwriter)) that can be dynamically modified by, for example, the PSCI risk modeling engine based upon PSCRA data, and/or the authorized insurance providers. For example, in one or more embodiments and, optionally, in combination with any embodiment disclosed herein, the automated pre-underwriting process(es) performed by the exemplary inventive PSCI platform 100 executing the exemplary inventive PSCI software platform 400 is based on one or more pre-underwriting PSCI insurance bracket values.

For example, in one or more embodiments, the insurance bracket values and/or options, associated with their respective PSCI insurance bracket identifiers, are provided, via the PSCI API 401, by authorized insurance providers (e.g., insurance entities, underwriter entities), and stored in one or more PSCI databases 150a-150n, 251 to be utilized by the PSCI risk modeling engine 402 to automatically perform the automated pre-underwriting process and provide insurance quotes for individual cargo shipments in real time, or near real time. For example, in one or more embodiments and, optionally, in combination with any embodiment disclosed herein, each of the one or more of the PSCI insurance bracket identifiers provided in Table 2 will be provided by an authorized insurance provider for each commodity type of cargo (i.e., commodity type), provided for example in FIGS. 5A through 5G. For example, in one or more embodiments, a list of the one or more pre-underwriter policy criteria (referred to herein as PSCI insurance bracket identifiers) utilized by the PSCI risk modeling engine 402 to automatically perform the automated pre-underwriting process may include one or more of the following, as provided in Table 2:

TABLE 2

| PSCI Insurance Brackets | Value | Alternative Value |
| --- | --- | --- |
| 1. commodity type | See FIGS. 5A-5G | See FIGS. 5A-5G |
| 2. max value | predetermined maximum value per individual cargo shipment | predetermined maximum value per individual cargo shipment |
| 3. min value | predetermined minimum value per individual cargo shipment | predetermined minimum value per individual cargo shipment |
| 4. max duration | predetermined maximum time period to deliver cargo for the individual cargo shipment | predetermined maximum time period to deliver cargo for the individual cargo shipment |
| 5. transport mode | road, water, air, and/or rail, etc. for individual cargo shipment (See FIG. 5H) | road, water, air, and/or rail, etc. for individual cargo shipment |
| 6. international | yes, no | yes, no |
| 7. asset type | type of carrier (e.g., railcar, trailer, vessel, airplane, etc.) utilized to deliver cargo for individual cargo shipment | type of carrier (e.g., railcar, trailer, vessel, airplane, etc.) utilized to deliver cargo for individual cargo shipment |
| 8. tracking | yes, no | yes, no |
| 9. min volume | predetermined minimum load per individual cargo shipment | predetermined minimum load per individual cargo shipment |
| 10. min premium | predetermine minimum insurance premium per individual cargo shipment | predetermine minimum insurance premium per individual cargo shipment |
| 11. max daily exposure | predetermined maximum daily exposure to risk per individual cargo shipment | predetermined maximum daily exposure to risk for individual cargo shipment |

TABLE 2-continued

| PSCI Insurance Brackets | Value | Alternative Value |
|---|---|---|
| 12. risk probability value | value less than 1 that represents the likelihood that there will be a claim for the individual cargo shipment | value less than 1 that represents the likelihood that there will be a claim for the individual cargo shipment |

For example, in one or more embodiments and, optionally, in combination with any embodiment disclosed herein, the PSCI risk modeling engine 402 utilizes one or more of the PSCI insurance bracket identifiers provided in Table 2 to automatically perform the automated pre-underwriting process, for one or more qualifying insurance providers, and determine an insurance quote that may be provided to a customer/consignor in response to receiving shipment details for an identified cargo shipment and/or if insurance may be provided by the qualifying insurance provider. For example, in one or more embodiments, the PSCI insurance bracket identifier 'commodity type' (e.g., 'fish and crustaceans, mollusks and other aquatic invertebrates; cereals; or any other suitable cargo classification as provided, for example, in FIGS. 5A through 5G) is utilized to determine if the type of cargo included in the cargo shipment is one for which insurance may be provided and what type of cargo (e.g., see FIGS. 5A-5G) is included in the identified individual cargo shipment. For example, in one or more embodiments, the PSCI insurance bracket identifier 'max value' (e.g., $200 k per load, $300 k per load, or any other suitable value provided by an insurance provider) is utilized to determine the maximum estimated value of the cargo included in the identified individual cargo shipment for which an insurance provider will provide insurance coverage. For example, in one or more embodiments, the PSCI insurance bracket identifier 'min value' (e.g., $15 k per load, $10 k per load, or any other suitable value provided by an insurance provider) is utilized to determine the minimum estimated value of the cargo included in the identified individual cargo shipment for which an insurance provider will provide insurance coverage. For example, in one or more embodiments, the PSCI insurance bracket identifier 'max duration' (e.g., 3 weeks, 8 weeks, or any other suitable duration of time provided by an insurance provider) is utilized to determine the maximum duration of time for which an insurance provider will provide insurance coverage for a cargo shipment. For example, in one or more embodiments, the PSCI insurance bracket identifier 'transport mode' (e.g., road only; road, rail, air and ocean; etc.) is utilized to determine the types of transport for which an insurance provider will provide insurance coverage for an individual cargo shipment. For example, in one or more embodiments, the PSCI insurance bracket identifier 'international' (e.g., no, yes) is utilized to determine if an insurance provider will provide coverage for a cargo shipment wherein the transport route crosses international border(s). For example, in one or more embodiments, the PSCI insurance bracket identifier 'asset type' (e.g., trailer only, or any other suitable asset provided by an insurance provider) is utilized to determine if the types of transport containers, that may be utilized to transport the cargo included in an identified individual cargo shipment, are ones for which an insurance provider will provide insurance coverage. For example, in one or more embodiments, the PSCI insurance bracket identifier 'tracking' (e.g., no, yes) is utilized to determine if tracking is required for an insurance provider to provide insurance coverage for an individual cargo shipment. For example, in one or more embodiments, the PSCI insurance bracket identifier 'min volume' (e.g., trailer, pallet, or any other suitable volume provided by an insurance provider) is utilized to determine the minimum volume of cargo included in an individual cargo shipment for which an insurance provider will provide insurance coverage. For example, in one or more embodiments, the PSCI insurance bracket identifier 'min premium' (e.g., $20 per load, $100 per load, or any other suitable value provided by an insurance provider) is utilized to determine the minimum premium for which an insurance provider will provide insurance coverage for the identified cargo shipment. For example, in one or more embodiments, the PSCI insurance bracket identifier 'max daily exposure' (e.g., $20 million, $100 million, or any other suitable value provided by an insurance provider) is utilized to determine the maximum daily exposure that may be incurred for an identified individual cargo shipment for which an insurance provider will provide insurance coverage. For example, in one or more embodiments, the PSCI insurance bracket identifier 'risk probability value' (e.g., 0.0014, 0.0007, or any other suitable value provided by an insurance provider) is a value less than 1 (<1) that represents the likelihood that there will be a claim, and is utilized to determine an insurer's risk exposure or loss potential with respect to an insurance policy for an identified individual cargo shipment.

For example, in one or more embodiments, the PSCI risk modeling engine 402 may utilize one or more of the PSCI insurance bracket values (e.g., max value, min value, max duration, transport mode, international, asset type, tracking, min volume, min premium, max daily exposure, as disclosed with respect to Table 2, provide herein, for one or more commodity types), provided by one or more of the insurance providers that utilize the PSCI platform to provide insurance coverage for individual cargo shipments, to identify qualifying insurance providers for an identified cargo shipment. For example, in one or more embodiments, one or more qualifying insurance providers (e.g., an insurance provider for which one or more of the provided pre-underwriting PSCI insurance bracket values (e.g., max value, min value, max duration, transport mode, international, asset type, tracking, min volume, min premium, and/or max daily exposure, as disclosed with respect to Table 2, provided herein, for one or more commodity types) may be identified for an identified cargo shipment) are identified such that the PSCI risk modeling engine 402 may generate an insurance quote for that particular insurance provider utilizing the dynamic pricing model. In one or more embodiments, the PSCI risk modeling engine 402 may also modify the generated quote and/or generate one or more modified insurance quotes for that particular insurance provider, utilizing techniques disclosed herein. For example, in one or more embodiments, one or more of the modified insurance quotes may based upon, for example, one or more risk probability values output by the neural network 407, utilizing data (e.g., real time shipment data, historical shipment data, sensor and/or telematic data, and/or other data (e.g., different transport mode) relevant to the identified cargo shipment)

provided by one or more of the PSCI risk modeling engine 402, PSCI machine learning engine 405 and/or PSCI probability scoring engine 406, as disclosed herein.

In one or more embodiments, the PSCI platform executing the PSCI software platform provides one or more GUIs, to each insurance provider (i.e., authorized user) that provides insurance coverage utilizing the PSCI platform, that allow the user to provide the aforementioned values/options for each of the PSCI bracket identifiers. For example, FIGS. 5I and 5J illustrate an exemplary GUIs provided by the PSCI platform that may be utilized by an authorized user of the PSCI platform to manage the rights of certain users. For example, in one or more embodiments and as illustrated in FIG. 5I, an authorized user (e.g., an insurance provider, an underwriter) may provide one or more of a commodity price modifier (e.g., 1.1) and a value (e.g., 30) for the PSCI bracket identifier 'min premium', in data respective data fields included in the GUI, that may be received and applied to a base premium policy value by the PSCI risk modeling engine 102 to generate a dynamic pricing model and provide an insurance quote for an identified cargo shipment. For example, in one or more embodiments and as illustrated in FIG. 5J, an authorized user (e.g., an insurance provider, an underwriter) may provide one or more of a commodity price modifiers for certain commodity types of cargo to be shipped by a logistics shipping provider, information that may be received and applied to a base premium policy value by the PSCI risk modeling engine 102 to generate a dynamic pricing model and provide an insurance quote for an identified cargo shipment.

For example, in one or more embodiments, utilization of one or more PSCI insurance bracket identifiers by the PSCI risk modeling engine enables the exemplary inventive PSCI platform 100 executing the exemplary inventive software platform 400 to automatically provide an insurance quote to a customer/consignor in real time, or near real time, in response to receiving shipment details for an identified individual cargo shipment without undergoing an underwriting process. For example, in one or more embodiments and, optionally, in combination with any embodiment disclosed herein, one or more of alternative PSCI insurance bracket identifiers may be provided as, for example, provided in Table 2, such that the PSCI risk modeling engine 402 may automatically perform the automated pre-underwriting process. For example, in one or more embodiments and, optionally, in combination with any embodiment disclosed herein, if more than a predetermined number (e.g., <1, ≤3, or any other suitable number of insurance providers) of insurance providers are identified to provide insurance coverage for the identified individual cargo shipment, the PSCI risk modeling engine 402 may utilize one or more of alternative PSCI insurance bracket identifiers provided in Table 2 to automatically perform the automated pre-underwriting process and determine an insurance quote that may be provided to a customer/consignor in response to receiving shipment details for an identified cargo shipment.

An exemplary list of the types of commodities (i.e., cargo), upon which the risk probability values and/or the commodity price modifiers may be based to determine the insurable commodities, for which a consignor may receive insurance coverage, and the insurance premiums that will be required to provide coverage for the same, is provided in FIGS. 5A-5G. For example, with reference to FIGS. 5A-5G, an authorized insurer/underwriter may utilize the secure PSCI platform portal to provide underwriter parameters for the transport of cargo included in an individual cargo shipment that is classified under the commodity type "LIVE ANIMALS." For example, in one or more embodiments, the insurer/underwriter may have concluded that the risk is such that a higher risk probability value (e.g., a value <1) or a lower risk probability value (e.g., a value <1) is appropriate for a cargo included in a cargo shipment that falls under the commodity type "LIVE ANIMALS. For example, in one or more embodiments, the insurer/underwriter may have concluded that the risk is such that a commodity price modifier of 1.5 is appropriate for a cargo included in a cargo shipment that falls under the commodity type "LIVE ANIMALS. For example, in one or more embodiments, the PSCI risk modeling engine 402 is configured access the identified insurance provider's information (e.g., insurance policy that covers a cargo included in the cargo shipment that falls under the commodity type "LIVE ANIMALS") to offer an insurance quote for an insurance policy offered by the insurer/underwriter to a consignor for the individual shipment of cargo that falls within the commodity type "LIVE ANIMALS" for 1.5 times the rate of a base premium. For example, in one or more embodiments, the insurer/underwriter may have concluded that the risk is such that a commodity price modifier of 0.5. For example, in one or more embodiments, the PSCI risk modeling engine 402 is configured to offer an insurance quote for an insurance policy offered by the insurer/underwriter to a consignor for an individual shipment of cargo that falls within the commodity type "LIVE ANIMALS" for times (i.e., half) the rate of the base premium. For example, if the commodity price modifier for the above example is "0" or "−1", in one or more embodiments, the PSCI risk modeling engine 402 is configured to decline to insure the individual shipment of cargo that falls within the commodity type "LIVE ANIMALS".

FIG. 5H is an exemplary list of the transportation types (e.g., road, sea, air, rail, etc.), that may be utilized to transport the various types of commodities, upon which one or more of risk probability values and/or commodity price modifiers may be based. For example, in one or more embodiments, the transportation types are utilized to determine which type(s) of transport may be available to transport the insurable commodity(ies), for which a consignor may receive insurance coverage, and the insurance premiums that will be required to provide coverage for the selected type of transport to transport the commodity. For example, with reference to FIG. 5H, an authorized insurer/underwriter may utilize the secure PSCI platform portal to provide underwriter parameters for a particular mode of transport utilized in a cargo shipment that falls under one of the transport type provided (e.g., "ROAD"). For example, in one or more embodiments, the insurer/underwriter may have concluded that the risk is such that a higher risk probability value (e.g., a value >1) or a lower risk probability value (e.g., a value <1) is appropriate for an individual cargo shipment that falls under the transport type "Road", i.e., cargo included in the cargo shipment is to be shipped by the logistics shipping provider by road. For example, in one or more embodiments, the insurer/underwriter may have concluded that the risk is such that a commodity price modifier of 1.5 is appropriate for a particular commodity type of cargo included in a cargo shipment that is to be shipped by the logistics shipping provider by road. For example, in one or more embodiments, the PSCI risk modeling engine 402 may be configured to offer an insurance quote, for an insurance policy offered by the insurer/underwriter to a consignor for a particular commodity type of cargo included in a cargo shipment that utilizes a mode of transport that is classified under the transport type "ROAD", for 1.5 times the rate of a base premium. For example, in one or more embodiments, the insurer/underwriter may have concluded that the risk is such that a commodity price modifier of 0.5 is appropriate under another commodity type of cargo included in a cargo shipment that is classified under the transport type "ROAD". For example, if the commodity price modifier for the above example is "0" or "−1", in one or more embodiments, the PSCI risk modeling engine 402 may be configured to decline to insure (e.g., transmit or have an error message, text, message, alert, etc. that represents a decline of insurance transmitted to a consignor and/or other authorized user) the individual shipment of cargo that utilizes a mode of transport that is classified under the transport type "ROAD".

Figure 6A:
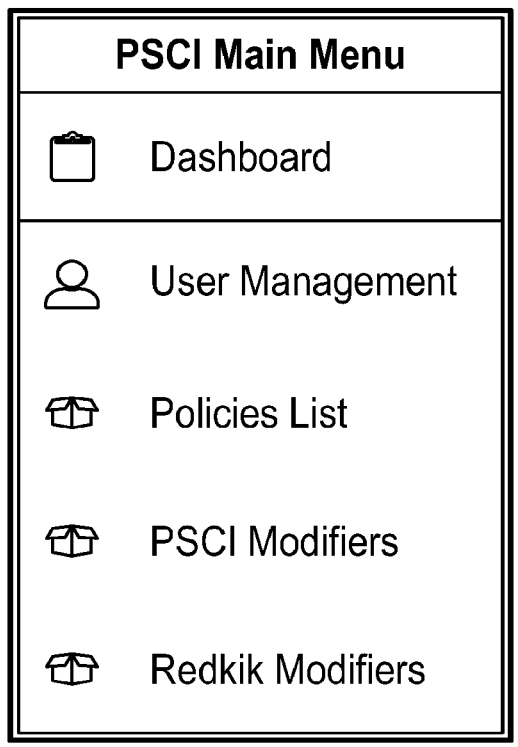

FIGS. 6A through 6F illustrate exemplary graphical user interfaces (GUIs) provided, for example, via a web page, integrated API 401, app, plug-in software and/or via any other suitable method, as disclosed herein, that may be utilized by an authorized user (e.g., insurer, underwriter, customer/consignor, etc.) that accesses the secure PSCI web-based platform via a portal. In one or more embodiments and, optionally, in combination with any embodiment disclosed herein, the PSCI user experience engine 403 generates the GUIs (e.g., exemplary GUIs disclosed with reference to FIGS. 6A-6F) that allow authorized users of the computer-based PSCI platform to upload/download user information to/from one or more PSCI databases 150a-150n, 251, disclosed herein, that may be utilized by the PSCI risk modeling engine 402 to provide insurance coverage and/or one or more insurance quotes for individual cargo shipments in real time, or near real time. For example, once accessed, an authorized user may provide information that is utilized by the PSCI risk modeling engine 402 to automatically offer insurance quotes for insurance policies that cover one or more individual cargo shipments to a consignor in real time, or near real time, during the cargo shipment booking process with the logistic shipping provider. For example, in one or more embodiments and, optionally, in combination with any embodiment described herein, the PSCI platform, via the PSCI user experience engine 403, provides access to a secure portal by which authorized and authenticated user entities (e.g., insurance company, underwriter, etc.) may access the PSCI platform via a network (e.g., the Internet) to provide and update certain information concerning the user. For example, in one or more embodiments, once the authorized user accesses the secure PSCI web-based platform via a portal, the user may see the exemplary main menu, as illustrated in FIG. 6A, that includes certain accessible categories such as, for example, dashboard, user management, policies list, pricing modifiers and PSCI modifiers.

Figure 6B:
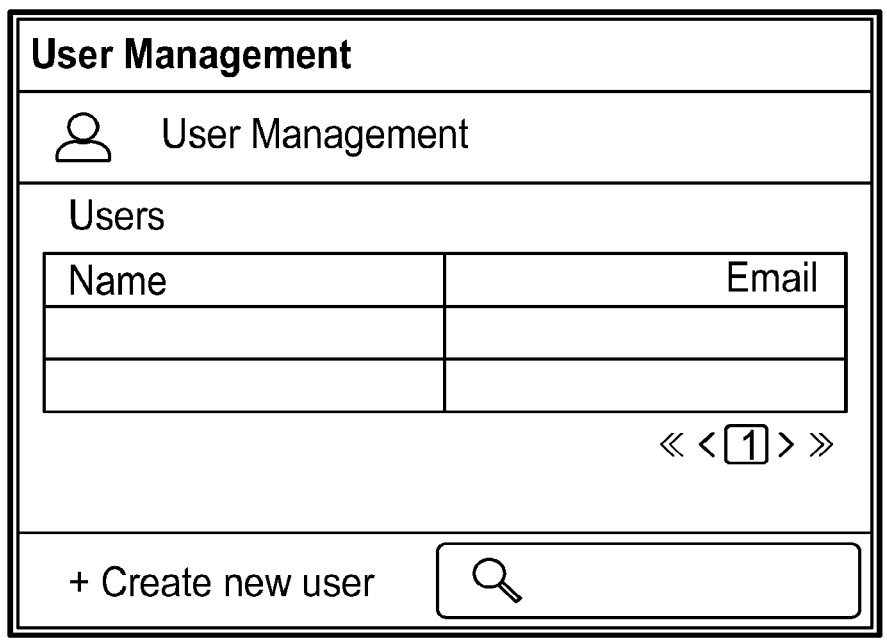

FIG. 6B illustrates an exemplary GUI provided by the PSCI platform that may be utilized by an authorized user of the PSCI platform to manage the rights of certain users. For example, authorized users may enter their username and email addresses to perform various functions on the PSCI platform. In one or more embodiments, new users may be provided access to the PSCI platform by interacting with the "Create new user" option illustrated in the exemplary GUI illustrated in FIG. 6B. For example, in one or more embodiments, the types of information that may be viewed and/or updated on the PSCI portal includes but is not limited to, for example, one or more of a user's name, a user's contact details, policy numbers for insurance contracts associated with the user, total number of policies for each user, total value of policies for each user, the commodity types of cargo that a user currently insures or would insure, shipping routes utilized for one or more cargo shipments that a user currently approves and/or or would approve for insure coverage, authorized shipping routes for each commodity type of cargo, a user's current exposure, a user's collected and/or dispersed insurance premiums, risk probability values, commodity price modifiers (e.g., pricing modifiers), PSCI modifiers, user preferences, etc. For example, in one or more embodiments, the types of information that may be viewed and/or updated on the PSCI portal includes but is not limited to, for example, values/options for each of the PSCI insurance bracket identifiers, as disclosed with reference to Table 2 herein.

For example, in one or more embodiments, in the pricing modifiers section, a user may adjust the minimum premium, risk probability value, base price and/or pricing modifiers for different commodities which, in turn, impact how a specific insurance policy premium is calculated. For example, in one or more embodiments, once an insurance policy has been provided to the PSCI platform, an authorized user may view the existing insurance policy by interacting with the "Policies List" option illustrated in the exemplary GUI illustrated in FIG. 6C. In one or more embodiments, an authorized user may add an insurance policy that, for example, will cover a cargo included in a cargo shipment that is within one of the commodity types of cargo described in the commodity type list illustrated in FIGS. 5A-5G. For example, in one or more embodiments, the existing insurance policies attributed to an authorized user may be provided to the user via a GUI by the PSCI 100 platform requesting the same from one or more PSCI databases 150a-150n, 251, as illustrated in FIG. 6F. For example, FIG. 6F illustrates an exemplary GUI that includes references, to exemplary insurance policies attributed to an authorized user utilizing the PSCI platform 100, which may include one or more of reference identifiers, commodity type identifiers (e.g., reference identifiers and descriptions of the commodity), the premiums associated with each insurance policy, and/or the date and time each insurance was purchased. In one or more embodiments, each of the references may include links to the or more insurance policies associated with the reference.

Figures 6C, 6D:

For example, in one or more embodiments and, optionally, in combination with any embodiment described herein, FIG. 6D illustrates an exemplary GUI that may be utilized by one or more logistic shipping providers to provide shipment details to the exemplary inventive PSCI platform 100. For example, in one or more embodiments, the exemplary GUI illustrated in FIG. 6D is utilized to transmit shipment details to the PSCI platform 100 (e.g., one or more PSCI server devices 120a-120n) to automatically receive one or more insurance quotes for insurance coverage for the identified cargo shipment. For example, as illustrated in FIG. 6D, the shipment details may include one or more of 'Start date' which represents the date (e.g., month, day, year) the delivery will commence, 'End date' which represents the date (e.g., month, day, year) the delivery will terminate, 'Start location' which represents the geographical location (e.g., address, latitude and longitude pair, etc.) of the start of the delivery (e.g., the location from where the identified cargo included in a cargo shipment will be picked up, the starting location of the first transport leg, etc.), 'End location' which represents the geographical location (e.g., address, latitude and longitude pair, etc.) of the end of the delivery (e.g., the location to where the identified cargo included in a cargo shipment will be delivered, the end location of the last transport leg, etc.), 'Commodity type' which represents an identification of the type of cargo included in a cargo shipment that will may insured by an insurance provider utilizing the PSCI platform (e.g., the identification of a commodity type of cargo as provided in exemplary FIGS. 5A-5G), 'Commodity description' which represents a description of the commodity that may be insured by an insurance provider utilizing the PSCI platform (e.g., a description of the commodity identified by a commodity type of cargo as provided in exemplary FIGS. 5A-5G), 'Insured value' which represents an estimated value of the cargo included in a cargo shipment that may be insured by an insurance provider utilizing the PSCI platform; 'Shipment ID' which represents any tracking code available to identify the cargo shipment that may be insured by an insurance provider utilizing the PSCI platform, and 'Organization/Company name', "First name' and 'Last name', 'Email, 'Street Address' 'City', 'State' and 'Postcode' which represent the details of the customer for the insurance policy that may be utilized to provide insurance coverage for the identified cargo shipment. For example, in one or more embodiments, a subset of the shipment details described in FIG. 6D is required for the PSCI platform to provide one or more insurance quotes for the identified cargo shipment. For example, in one or more embodiments, the necessary information may include, for example, 'Start date', 'End date', 'Start location', 'End location', 'Commodity type', 'Insured value', 'First name' and 'Last name'.

FIG. 6E illustrates an exemplary insurance quote received by an authorized user of the PSCI platform. For example, although only a single insurance quote is described with reference to FIG. 6E, an output of the PSCI platform may include one or more insurance quotes that may, in turn, be selected by an authorized user or a customer consignor (i.e., the one or more insurance quotes may be provided by the logistics shipping provider to the customer/consignor for selection (e.g., accept/decline)). For example, in one or more embodiments and, optionally, in combination with any embodiment described herein, in response to receiving shipment details, the exemplary inventive PSCI platform 100 executing the exemplary inventive software platform 400 provides the customer/consignor with one or more insurance quotes in real time to provide insurance coverage for the identified cargo shipment. In one or more embodiments and, optionally, in combination with any embodiment described herein, in response to receiving shipment details, the exemplary inventive PSCI platform 100 executing the exemplary inventive software platform 400 provides the customer/consignor with one or more insurance quotes in near real time to provide insurance coverage for the identified cargo shipment. For example, in one or more embodiments, after the user (e.g., customer/consignor, logistics shipping provider, other authorized user) enters the necessary shipment details into the data fields, as disclosed with reference to FIG. 6D, the user submits the necessary shipment details (e.g., has the shipment details transmitted to the PSCI platform 100, pushes the 'Submit' button provided on the user's screen to have the shipment details transmitted to the PSCI platform 100, etc.) to the PSCI platform and receives one or more insurance quotes in real time. In one or more embodiments, the one or more insurance quotes are provided in near real time.

For example, in one or more embodiments and, optionally, in combination with any embodiment described herein, the PSCI risk modeling engine 402, once a request is received for an insurance quote for a cargo shipment, is configured to automatically seek an optimal insurance quote (e.g., the lowest price) based upon the underwriter parameters, generate an insurance quote for insurance coverage of the one or more individual shipments, and transmit or have transmitted the insurance quote to the consignor for acceptance or decline. When the customer/consignor/logistics shipping provider has confirmed the purchase of the shipping contract that includes the insurance offer, a notification (e.g., email, text, alert, message, etc.) is transmitted to the consignor and/or logistics shipping provider that details the insurance coverage. In one or more embodiments and, optionally, in combination with any embodiment described herein, the PSCI platform executing the exemplary PSCI platform 400 (e.g., via execution of the PSCI user experience module 403) may allow for the collection of all insurance payments for the insurer(s), underwriter(s), etc. and disperse the payments to the same in a predetermined time period (e.g., daily, weekly, monthly, bi-monthly, etc.). In one or more embodiments, the PSCI user experience module 403 can also provide, to authorized users, user reports, on demand and/or in a predetermined time period, that detail the number and type of insurance policy requests/approvals/denials, the commodity types of cargo included in a cargo shipment for which insurance has been requested/approved/denied, payments collected, insurance claims made, and/or any other relevant information required for an insurer and/or underwriter to provide underwriter parameters (e.g., information utilized by the PSCI risk modeling engine 402 to determine one or more risk probability values and/or commodity price modifiers) to the PSCI platform. For example, in one or more embodiments, each offer and/or acceptance and/or decline of insurance provided by an insurance company and/or an underwriter company via the PSCI platform, each quote provided by an insurance company and/or an underwriter company that was provided and/or accepted and/or declined for one or more individual cargo shipments, each risk probability value and/or commodity price modifier provided by an insurance company and/or an underwriter company for 1) each commodity type of cargo included in a cargo shipment, disclosed for example with reference to FIGS. 5A-5G, and 2) each transport type, disclosed for example with reference to FIGS. 5H, and/or any other information associated with providing insurance coverage, a quote and/or a commodity price modifier may be accessibly stored, by one or more PSCI platform server devices 120a-120n in one or more of the databases 251, and/or third party databases 170a-170n, and/or network databases 150a-150n, and utilized by the PSCI risk modeling engine 402 to determine one or more risk probability values and/or commodity price modifiers, and/or provide insurance quotes for individual cargo shipments.

FIG. 7A illustrates an exemplary request format, that is generated by the PSCI platform executing the PSCI software, using at least a portion of the shipping information and/or the user information provided by one or more of the provider insurance companies and/or underwriter companies, and utilized to generate an one or more insurance quotes that will be processed by the PSCI risk modeling engine 402. For example, in one or more embodiments and, optionally, in combination with any embodiment disclosed herein, once the PSCI risk modeling engine 402 is provided with a valid request for an insurance coverage quote, the PSCI risk modeling engine 402 is configured to generate an array of quotes utilizing at least a portion of the shipping information and/or the user information provided by one or more of the provider insurance companies and/or underwriter companies. For example, FIG. 7A illustrates a chart that describes one or more exemplary data fields, the type of field (e.g., array, string, datetime, policyholder, address) associated with each exemplary data field, and a description of the information that will be input into the one or more data fields of the generated array of quotes to be utilized by the PSCI risk modeling engine 402 to provide an insurance quote request(s) to a consignor for the individual shipment of cargo. For example, one or more of the data fields in the insurance quote request generated by the PSCI risk modeling engine 402 may include one or more of the following: 1) "journeyLegs", which is a text field wherein the input data represents the legs included in the transportation route of a shipment journey; 2) "startTime", which is data that represents the start date and time of the one or more legs in a transportation route of a shipment journey; 3) "endTime", which is data that represents the end date and time of the one or more legs in a transportation route of a shipment journey; 4) "startLocation", which is data that represents the starting location (e.g., latitude/longitude data, or address data) of the one or more legs in a transportation route of a shipment journey; 5) "endLocation", which is data that represents the ending location (e.g., latitude/longitude data, or address data) of the one or more legs in a transportation route of a shipment journey; 6) "transportTypes", which is data that represents the types of transport (e.g., truck, boat, plane, train, etc.) used to transport the cargo included in a cargo shipment on the one or more legs in a transportation route of a shipment journey; 7) "transportFeatures", which is data that represents special features (e.g., refrigeration is required, a dark shipping container is required, air transport is required, etc.) concerning the transportation route of a shipment journey, and/or the transport (e.g., truck, boat, plane, train, etc.) used to transport the cargo included in a cargo shipment on the one or more legs in a transportation route of a shipment journey; 8) "commodityType", which is data that represents the commodity type or other description that describes and/or references the commodity to be insured; 9) "commodityDescription", which is data that represents a description of and/or other identifiers that describes and/or references the commodity being insured; 10) "insuredValue", which is data that represents the estimated value of the commodity to be insured; 11) "shipmentId", which is data (e.g., tracking code, GPS location, address, and/or any other information that may be utilized to determine the location of the cargo included in a cargo shipment) that represents the location of the commodity to be insured; 12) "policyholder", which is data that represents a description of and/or other identifiers that describes and/or references the customer to which the policy will be provided for the commodity being insured; 13) "forename", which is data that represents the customer's, for which the policy will be provided for the commodity being insured, forename, and/or a description of and/or other identifiers that describes and/or references the customer's forename; 14) "surname", which is data that represents the customer's, for which the policy will be provided for the commodity being insured, surname, and/or data that represents a description of and/or other identifiers that describes and/or references the customer's surname; 15) "email", which is data that represents the customer's, for which the policy will be provided for the commodity being insured, email, and/or data that represents a description of and/or other identifiers that describes and/or references the customer's email; 16) "telephone", which is data that represents the customer's, for which the policy will be provided for the commodity being insured, telephone number, and/or data that represents a description of and/or other identifiers that describes and/or references the customer's telephone number; 17) "address", which is data that represents the customer's, for which the policy will be provided for the commodity being insured, address information including the number and/or street (e.g., data that represents the number and street name), and/or locality (e.g., data that represents the city, town, village, post town, or other locality within which the street address may be found), and/or region (data that represents the province, such as a state, county, or canton within which the locality may be found), and/or postcode (e.g., data that represents the postal code, post code, ZIP code or other short code associated with the address by the relevant country's postal system), and/or country (e.g., data that represents the country name), and/or data that represents a description of and/or other identifiers that describes and/or references the customer's address information including the number and/or street, and/or locality, and/or region, and/or postcode, and/or country.

FIG. 7B illustrates an exemplary response format that is generated by the PSCI platform executing the PSCI software to provide one or more insurance quotes for cargo insurance to a consignor. For example, in one or more embodiments, the PSCI risk modeling engine 402 utilizes the array of quotes, discussed with reference to FIG. 7A, and generates a response to the request for cargo insurance utilizing at least a portion of the data provided in the array of quotes. For example, in one or embodiments, the PSCI platform executing the PSCI software utilizes at least a portion of the data disclosed with respect to the request format disclosed with reference to FIG. 7A to determine whether one or more identified cargo shipments qualify for insurance coverage and, in response to a positive determination (i.e., the one or more individual cargo shipments qualify for insurance coverage), provides one or more quotes for insurance coverage in real time, or near real time. For example, FIG. 7B illustrates a chart that describes one or more exemplary response data fields, the type of field (e.g., string, Boolean, float, array) associated with each exemplary data field, and a description of the information that will be input into the one or more data fields to be utilized by the PSCI risk modeling engine 402 to provide one or more quotes for insurance coverage in real time. For example, one or more of the data fields in the response format may include one or more of the following: 1) "id", which is data that represents a unique identification used to reference one or more insurance quotes for one or more individual shipments to be used by the PSCI platform executing the PSCI software to perform additional functions; 2) "accepted", which is data that represents a determination of whether the quoted risk associated with providing insurance coverage for the one or more individual shipments is accepted or not; 3) "premium", which is data that, in response to the quoted risk being accepted, represents a determination of the total premium to be payed by the consignor upon acceptance of the cargo insurance quote; and 4) "amendment", which is data that represents an array of strings describing steps that may be taken to obtain an acceptance of the risk associated with providing insurance coverage for the one or more individual shipments, and/or obtain one or more lower premiums (e.g., steps that can be taken to lower the risk) to be paid by the consignor concerning the risk associated with providing insurance coverage for the one or more individual shipments.

FIG. 7C is a chart that discloses an exemplary format of data that may be utilized to provide data that represents one or more previous insurance quotes provided to a consignor for purchase. For example, in one or more embodiments and, optionally, in combination with any embodiment disclosed herein, the PSCI risk modeling engine 402, or an authorized user of the PSCI platform utilizing a GUI provided by PSCI API 401, may request data that represents one or more previous insurance quotes provided to a consignor for purchase. For example, in one or more embodiments, the PSCI user experience engine 403, in response to the request, will provide data, that represents one or more previous insurance quotes provided to a consignor for purchase, to an authorized user. For example, FIG. 7C illustrates a chart that describes one or more exemplary data fields, the type of field (e.g., string, Boolean, float, array) associated with each exemplary data field, and a description of the information that will be input into the one or more data fields to be utilized by the PSCI platform executing the PSCI software to select and provide an offer (i.e., an insurance quote) from one or more previous quote requests for purchase. For example, one or more of the data fields in the request for previous quotes format may include, for example, the following: 1) "id", which is data that represents a unique identification used to reference the insurance quotes for the quoted risk associated with the individual shipment to be insured. For example, in one or more embodiments and, optionally, in combination with any embodiment disclosed herein, the PSCI risk modeling engine 402 may utilize at least a portion of the requested data (e.g., the one or more generated premiums), disclosed with respect to the response to the request for cargo insurance format with reference to FIG. 7B, to, for example, generate one or more risk models that may include one or more premiums for an identified individual cargo shipment, and/or to generate a request for purchase that includes one or more insurance quote offers from a previous insurance quote request for purchase. For example, in one or more embodiments, the PSCI machine learning engine 405 and/or the neural network 407, discussed herein, may utilize at least a portion of the requested data (e.g., the one or more generated premiums) in its analyses and/or generated simulations.

FIG. 7D is a chart that discloses an exemplary format of data that may be utilized to provide data that represents a list of risks which were purchased by or provided to a customer (e.g., consignor) for individual cargo shipments between a specific period of time (e.g., hours, days, weeks, months, years, decades, etc.). For example, in one or more embodiments and, optionally, in combination with any embodiment disclosed herein, the PSCI risk modeling engine 402, or an authorized user of the PSCI platform may utilizing a GUI, provided by PSCI API 401, may request data that represents a list of risks which were purchased by or provided to a customer (e.g., consignor) for individual cargo shipments between a specific period of time. For example, FIG. 7D illustrates a chart that describes one or more exemplary data fields, the type of field (e.g., date, string, Boolean, float, array) associated with each exemplary data field, and a description of the information that will be input into the one or more data fields to be utilized by the PSCI platform executing the PSCI software to generate information in response to a request from one or more authorized users for the list of insurance risks from a start date to an end date. For example, one or more of the data fields in the request may include, for example, the following: 1) "from", which is data that represents the start date for a list of risks that were purchased by and/or provided to a consignor; and 2) "to", which is data that represents the end date for a list of risks that were purchased by and/or provided to a consignor. For example, in one or more embodiments and, optionally, in combination with any embodiment disclosed herein, the PSCI risk modeling engine 402 may utilize at least a portion of the requested data (e.g., a list of risks which were purchased by or provided to a customer for individual cargo shipments between a specific period of time) provided by the PSCI user experience engine 403 to, for example, generate one or more risk models that may include one or more premiums for an identified individual cargo shipment, and/or to generate a request for purchase that includes one or more insurance quote offers from a previous insurance quote request for purchase. For example, in one or more embodiments, the PSCI machine learning engine 405 and/or the neural network 407, discussed herein, may utilize at least a portion of the requested data in its analyses and/or generated simulations.

FIG. 7E is a chart that discloses an exemplary format of data that may be generated by the exemplary inventive PSCI platform executing the exemplary inventive PSCI software in response to an authorized user providing a start date and an end date included in the user request for a list of risks which were purchased by or provided to a customer (e.g., consignor) for individual cargo shipments between a specific period of time (e.g., hours, days, weeks, months, years, decades, etc.). For example, FIG. 7E illustrates a chart that describes one or more exemplary data fields, the type of field (e.g., date, datetime, integer, string, Boolean, float, array) associated with each exemplary data field, and a description of the information that will be generated by the PSCI user experience engine 403 in response to the request from one or more authorized users for the list of insurance risks from a start date to an end date. For example, one or more of the data fields in the request may include for each insurance policy identified pursuant to the request, for example, the following: 1) "startTime", which is data that represents the date the insurance policy for the individual cargo shipment became effective and the time that the insurance coverage of the individual cargo shipment began; and 2) "endTime", which is data that represents the date the insurance policy for the individual cargo shipment ended and the time that the insurance coverage of the individual cargo shipment ended; 3) "purchaseTime", which is data that represents the date the insurance policy for the individual cargo shipment was purchased and the time that the insurance policy was purchased; 4) "commodityType", which is data that represents an identification of the commodity type of the cargo included in the individual cargo shipment (e.g., referencing one or more of the commodity types of cargo recited in the commodity list disclosed with reference to FIGS. 5A-5G) that was covered by the insurance policy; 5) "insuredValue", which is data that represents the total insured value of the cargo included in the individual cargo shipment that was covered by the insurance policy; 6) "travelType", which is data that represents an identification of the mode of transportation, utilized in an individual cargo shipment, classified under a transport type (e.g., referencing one or more of the transport types recited in the transport type list disclosed with reference to FIGS. 5A-5H). For example, in one or more embodiments and, optionally, in combination with any embodiment disclosed herein, the PSCI risk modeling engine 402 may utilize one or more of the insurance policies provided by the PSCI user experience engine 403 to, for example, generate one or more risk models that may include one or more premiums for an identified individual cargo shipment, and/or to generate a request for purchase that includes one or more insurance quote offers from a previous insurance quote request for purchase. For example, in one or more embodiments, the PSCI machine learning engine 405 and/or the neural network 407, discussed herein, may utilize one or more of the insurance policies provided by the PSCI user experience engine 403 to in its analyses and/or generated simulations.

FIG. 7F is a chart that discloses an exemplary format of data (e.g., delivery completion data) that may be generated by the exemplary inventive PSCI platform executing the exemplary inventive PSCI software in response to a notification from one or more authorized users (e.g., logistics shipping provider, insurer, underwriter, consignor, etc.) that the delivery of the cargo, included in the individual cargo shipment that was insured by one of the PSCI insurance providers, has been completed. For example, in one or more embodiments, the PSCI user experience engine 403 may be configured to receive, from a logistics shipping provider, information (e.g., the identification of the initially purchased insurance for the relevant individual cargo shipment, the insurance policy number of the insurance policy provided to cover the cargo shipment, the shipment identification utilized to in the initial quote to identify the individual shipment of cargo) and generate data in the exemplary format disclosed with respect to FIG. 7F to be accessibly stored in one or more of the PSCI databases. For example, FIG. 7F illustrates a chart that describes one or more exemplary data fields, the type of field (e.g., string, date, datetime, integer, string, Boolean, float, array) associated with each exemplary data field, and a description of the information that will be input into the one or more data fields to be utilized by the PSCI platform executing the PSCI software to generate information in response to the notification of the completed cargo shipment delivery. For example, one or more of the data fields included in the generated information in response to the notification includes, for example, the following: 1) "offerId", which is data that represents the identification of the initially purchased insurance offer; 2) "shipmentId", which is data that represents the logistics shipping provider's identification of the cargo to be shipped that was utilized in the initial insurance quote offered to the consignor; 3) "policyNumber", which is data that represents the policy number of the insurance policy generated by the PSCI user experience engine 403 when the insurance policy was purchased by the consignor; and 4) "dateTime", which is data that represents the date and time a delivery associated with the insured individual cargo shipment was completed. For example, in one or more embodiments and, optionally, in combination with any embodiment disclosed herein, the PSCI risk modeling engine 402 may utilize at least a portion of the delivery completion data to, for example, generate one or more risk models that may include one or more premiums for an identified individual cargo shipment, and/or to generate a request for purchase that includes one or more insurance quote offers from a previous insurance quote request for purchase. For example, in one or more embodiments, the PSCI machine learning engine 405 and/or the neural network 407, discussed herein, may utilize at least a portion of the delivery completion data to in its analyses and/or generated simulations.

One having ordinary skill in the art with the benefit of this specification will appreciate that the exemplary formulas (1)-(8) provided above provide the basic functionality of the dynamic insurance pricing model, and are provided for a better understanding of the functionality of the dynamic insurance pricing model. For example, in one or more embodiments and, optionally, in combination with any embodiment described herein, in step 420, the dynamic insurance pricing model, generated by the PSCI risk modeling engine 402, may be based at least in part on the Monte Carlo method of computational algorithms (e.g., the Solovay-Strassen type algorithms, the Baillie-PSW type algorithms, the Miller-Rabin type algorithms, and/or Schreier-Sims type algorithms). For example, in one or more embodiments and, optionally, in combination with any embodiment described herein, in step 420, the dynamic insurance pricing model may consider, for example, at least a portion of the shipment details provided by consignors and/or logistics shipping providers, parameters provided by an insurer/underwriter that are utilized to determine what risk the insurer/underwriter is willing to accept, one or more risk probability values, one or more commodity price modifiers, historical shipment data, real time shipment data, the user's experience associated with one or more individual cargo shipments, commodity types, coverage type(s), and/or one or more quality metrics associated with the insured. In one or more embodiments and, optionally, in combination with any embodiment described herein, the dynamic insurance pricing model and/or one or more of the exemplary functions utilized in the dynamic insurance pricing model may be continuously trained by, for example without limitation, applying at least one machine learning technique, such as, but not limited to, unsupervised machine learning techniques, supervised machine learning techniques, artificial neural networks (ANN), decision tree(s), random forest (RF), boosted decision tree techniques, bagging, support-vector machines (SVMs), gradient boosting, naïve Bayes classifiers, K nearest neighbor techniques, classification regression trees, deep long short-term memory (LSTM) techniques, and/or other suitable techniques, to the collected and/or compiled data that is relevant to one or more individual cargo shipments, data including sensor data, historical shipment data, real time shipment data, the user's experience associated with cargo shipments, commodity types, coverage type and/or one or more quality metrics associated with the insured.

For example, in one or more embodiments and, optionally, in combination with any embodiment disclosed herein, the PSCI machine learning engine 405 utilized in step 420 uses machine learning techniques/processes/algorithms, via a machine learning module, to improve the functionality of PSCI computer systems (e.g., one or more PSCI server devices 120a-120n utilized in the PSCI platform) executing the PSCI software platform 400 by allowing the computer systems to continuously mature and learn over time in discovering one or more optimal and/or recommended risk probability values for an authorized user (e.g., insurer and/or underwriter) of the PSCI platform, and/or one or more optimal and/or recommended commodity price modifiers for an authorized user of the PSCI platform, and/or one or more reference risk probability values and/or commodity price modifiers for an expert or other authorized user. As discussed herein, the exemplary inventive PSCI platform 100 executes the exemplary inventive software platform 400 to, for example, generate one or more dynamic pricing models using the risk probability values and commodity price modifiers to generate insurance quotes for individual cargo shipments in real time, or near real time. For example, as more and more users interact with the PSCI machine learning engine 405, a repository of data accessibly stored in one or more PSCI databases (e.g., historical shipment data and other data including but not limited to one or more of a user's name, a user's contact details, policy numbers for insurance contracts associated with the user, total number of policies for each user, total value of policies for each user, the commodity types of cargo that a user currently insures or would insure according to insurance policies provided by the insurers/underwriters, shipping routes and route legs utilized for one or more logistics shipping providers, authorized shipping routes for each commodity type of shipment cargo, a user's current exposure, a user's collected and/or dispersed insurance premiums, risk probability values, commodity price modifiers (e.g., pricing modifiers), PSCI modifiers, and/or user preferences), data that describes behaviors, interactions, patterns and/or the like with respect to cargo shipments, may be utilized by the PSCI machine learning engine 405 to generate cargo shipment models that enable the PSCI risk modeling engine 402 to generate increasingly better dynamic pricing models (e.g., dynamic pricing models that include premiums based upon more accurate risks assessments for the shipment cargo) upon which the provided insurance quotes are based. For example, in one or more embodiments, information such as environmental information, weather information, and/or contextual information (e.g., transportation routes, types of cargo, cargo containers, cargo restraints, information concerning the carriers utilized by the logistics shipping providers, etc.) associated with cargo shipments, and/or other historical shipment data described above (collectively referred to as PSCI learning data, hereinafter), may be gathered by continuously monitoring users' interactions and patterns of use with the PSCI platform and gathering real time shipment data and sensor information over time to continuously improve the accuracy and applicability of insurance recommendations (premiums, approval and declining of insurance coverage, etc.) and the determination of one or more risk probability values and/or one or more commodity price modifiers in developing and/or improving the accuracy of the dynamic insurance pricing model in step 414 generated by PSCI risk modeling engine 402.

For example, in one or more embodiments, a simulated cargo shipment is developed by the PSCI machine learning engine 405 by processing the PSCI learning data associated with the simulated cargo shipment. In one or more embodiments and, optionally, in combination with any embodiment described herein, the machine learning engine utilized in step 420 (with reference to FIG. 4C) is configured to dynamically and in real-time optimize the dynamic insurance pricing model utilized by the PSCI risk modeling engine 402 to provide insurance quotes for one or more individual cargo shipments utilizing at least a portion of the PSCI learning data. For example, in one or more embodiments, the machine learning engine utilized in step 420 is configured to simulate multiple different cargo shipments, that may include, for example one or more similar cargo shipment characteristics to a relevant cargo shipment (e.g., a cargo shipment for which a user is utilizing the PSCI platform to provide insurance coverage in real time, or in near real time). For example, the PSCI learning data utilized to develop simulated cargo shipment models may include, but is not limited, for example, information concerning a particular cargo container utilized to contain the identified commodity type of cargo included the individual cargo shipment, a particular shipper utilized to transport the identified commodity type of cargo included the individual cargo shipment, a particular supplier of the identified commodity type of cargo included the individual cargo shipment, a particular product, a particular mode of transport utilized to transport the identified commodity type of cargo included the individual cargo shipment, a particular cargo container, a particular product packaging utilized to package the identified commodity type of cargo included the individual cargo shipment, historical weather data and/or environmental data compiled for similar transportation routes, and/or other historical shipment data (i.e., sensor data, telematics data), other relevant types of information disclosed herein and/or any combination thereof with respect to the relevant cargo shipment. For example, in one or more embodiments, the PSCI learning data utilized by the PSCI machine learning engine 405 to develop simulated cargo shipment models may include additional categories of PSCI learning data associated with a particular commodity type of cargo included in an individual cargo shipment may include one or more of data that is relevant to the transport route, regions (e.g., state, country, region, county, etc.) and mode of transportation utilized by the identified cargo shipment, including historical piracy data, historical theft data, historical terrorist data, historical natural disaster data, historical regional/global conflict data, historical political risk data, historical weather data, historical news data, or any other suitable relevant historical data.

In one or more embodiments, PSCI learning data may be processed via one or more machine learning algorithms, discussed with reference to FIG. 4D, to simulate model cargo shipments for which risk probability values may be generated by the PSCI probability scoring engine 406 to dynamically optimize the model cargo shipments and, thus, the pricing models utilized to calculate insurance premiums. For example, in one or more embodiments, the exemplary neural network 407 may be trained and utilized to compare the simulated pricing models to the one or more relevant reference pricing models, and determine one or more model risk probability values and/or one or more model commodity price modifiers to apply to one or more dynamic pricing models generated for one or more identified cargo shipments to dynamically modify the premiums, as disclosed herein. As used herein, machine learning may refer to the process of a computer learning over time without being explicitly programmed. The machine learning module engine utilized in step 420 may apply various machine learning algorithms, techniques, methods, and/or the like to the tracked real time shipment data and static historical shipment data compiled in, for example, one or more PSCI databases 150a-150n, 251, third party databases 170a-170n, network databases 160a-160n and/or remote PSCI servers 175 to build models for optimizing the dynamic insurance pricing model generated by the PSCI risk modeling engine 402 to provide an insurance quote to a user of the PSCI platform. For example, in one or more embodiments, the PSCI machine learning engine 405 discards low quality and/or irrelevant data to simulate improved model cargo shipments for which risk probability values may be generated, thereby conserving memory to reduce storage requirements, and reducing processing overhead. The processes performed by the PSCI machine learning engine 405 to remove the low quality and/or irrelevant data to simulate model cargo shipments increases the efficiency of the PSCI machine learning engine 405 and, thus, the PSCI platform 100. For example, the processes performed by PSCI machine learning engine 405 and the neural network 407 improve the operating efficiency of the PSCI platform 100 by removing low quality and/or irrelevant data to avoid processing such low quality and/or irrelevant data. Such processes further increase the computational efficiency of the PSCI platform 100 by removing illogical data that would require additional processing cycles to analyze. Further, removing low quality and/or irrelevant data from the simulated model cargo shipments generated by the PSCI machine learning engine 405 and input into the neural network 407 reduces the storage requirements associated with the simulated model cargo shipments and the data points utilized as input into the neural network 407 taken from the simulated model cargo shipments. As such, the processes performed by the PSCI machine learning engine 405 and the neural network 407 are directed to one or more improvement(s) in the functioning of a computer, for example, one or more server devices 120 included in the PSCI platform 100.

Figure 4D:
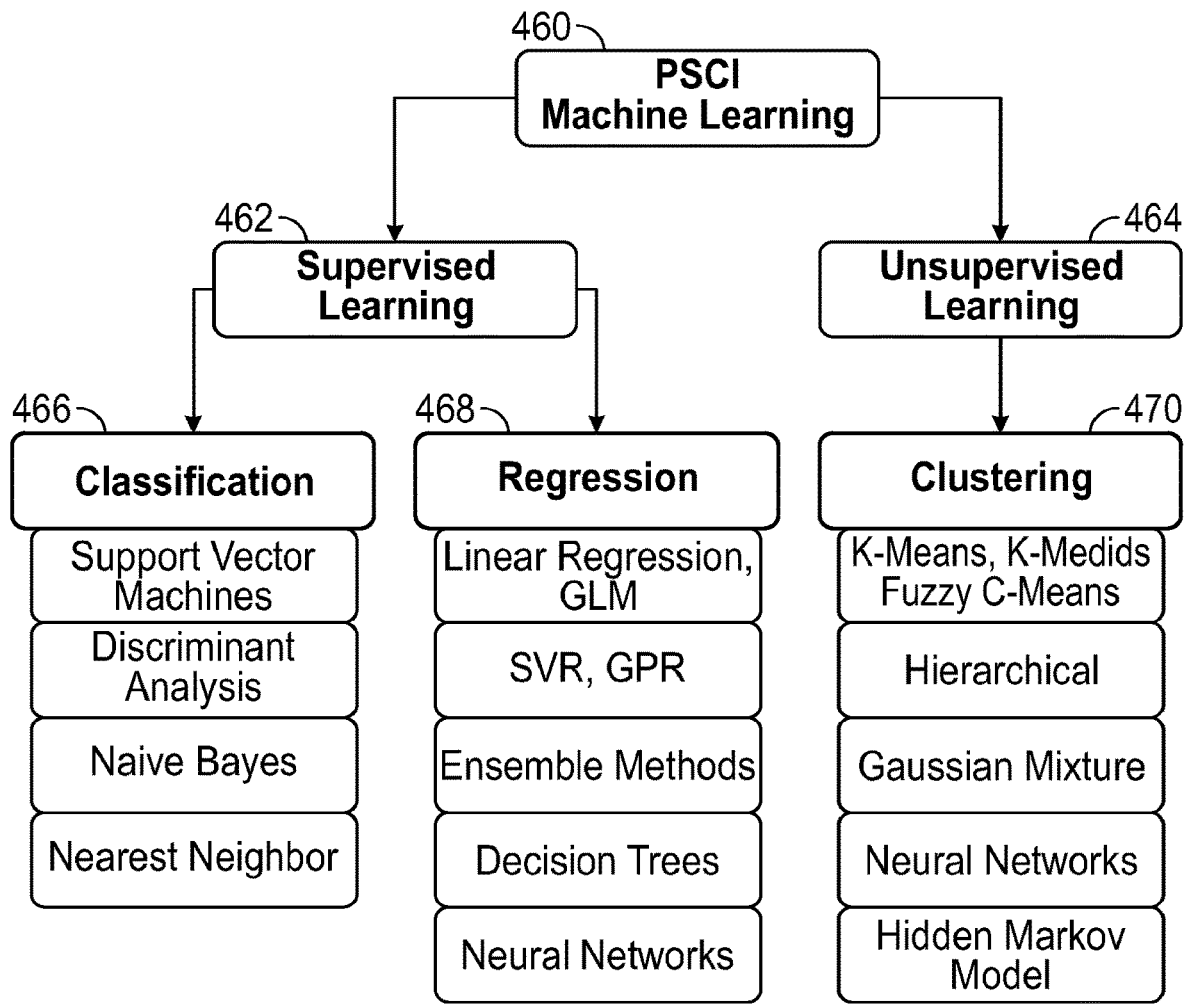
FIG. 4D illustrates a schematic diagram of an exemplary supervised and unsupervised machine learning engine utilized by the PSCI platform executing the PSCI software platform according to one or more embodiments of the present disclosure.

For example, with reference to FIG. 4D, in one or more embodiments and, optionally, in combination with any embodiment described herein, the machine learning techniques may be classified as supervised machine learning and unsupervised machine learning. For example, FIG. 4D provides specific examples of machine learning algorithms utilized by the PSCI machine learning engine 405 that may be utilized in step 420, for both supervised 462 and unsupervised 464 learning, to continuously train the dynamic insurance pricing model and/or one or more of the exemplary functions utilized in the dynamic insurance pricing model generated by PSCI risk modeling engine 402. For example, in one or more embodiments, supervised machine learning techniques that utilize an objective function(s) that is clearly defined are utilized by the PSCI machine learning engine 405 to continuously train the dynamic insurance pricing model and/or one or more of the exemplary functions utilized in the dynamic insurance pricing model generated by PSCI risk modeling engine 402. For example, the objective function is the function that one or more of the machine learning algorithms are attempting to optimize using the provided inputs and weights and/or other factors that are determined using the PSCI learning data. In one or more embodiments, one or more factors may have different levels of impact on the results. For example, a single factor alone may not be significant, but when two or more factors are observed in conjunction with the remaining factors, these two or more factors may have a significant impact on the overall result(s).

For example, in one or more embodiments and, optionally, in combination with any embodiment described herein, unsupervised machine learning techniques may be utilized by the PSCI machine learning engine 405 to continuously train the dynamic insurance pricing model and/or one or more of the exemplary functions utilized in the dynamic insurance pricing model generated by PSCI risk modeling engine 402. For example, with respect to the unsupervised machine learning techniques, the objective functions are not predefined. For example, the PSCI learning data that is provided to the unsupervised machine learning techniques is utilized in such a way that the outcome is created.

While specific exemplary machine learning algorithms utilized by the PSCI machine learning engine 405 to continuously train the dynamic insurance pricing model are illustrated in FIG. 4D, any appropriate machine learning algorithm, in light of the subject matter disclosed herein, may be utilized to continuously train the dynamic insurance pricing model and/or one or more of the exemplary functions utilized in the dynamic insurance pricing model may be utilized. For example, in one or more embodiments and, optionally, in combination with any embodiment described herein, classification algorithms 466 may include support vector machines, discriminant analysis, naive Bayes, and nearest neighbor algorithms may be utilized to employ a supervised learning technique to continuously train the dynamic insurance pricing model and/or one or more of the exemplary functions utilized in the dynamic insurance pricing model. For example, in one or more embodiments and, optionally, in combination with any embodiment described herein, various regression algorithms 468, such as linear regression, GLM, SVR, GPR, ensemble methods, decision trees, and neural networks, may be utilized to employ a supervised learning technique to continuously train the dynamic insurance pricing model and/or one or more of the exemplary functions utilized in the dynamic insurance pricing model. For example, in one or more embodiments and, optionally, in combination with any embodiment described herein, various clustering algorithms 270, such as K-means, K-medoids, fuzzy C-means, hierarchical, Gaussian mixture, neural networks, and hidden markov model, may be utilized to employ an unsupervised learning technique to continuously train the dynamic insurance pricing model and/or one or more of the exemplary functions utilized in the dynamic insurance pricing model generated by the PSCI risk modeling engine 402.

In step 420, for example, in one or more embodiments and, optionally, in combination with any embodiment described herein, an exemplary neutral network technique utilizing neural network 407 may be utilized by the PSCI machine learning engine 405 to continuously train the dynamic insurance pricing model and/or one or more of the exemplary functions utilized in the dynamic insurance pricing model generated by the PSCI risk modeling engine 402. For example, the exemplary neutral network technique may be one of, without limitation, artificial neural network (ANN), feedforward neural network, probabilistic neural network (PNN), recurrent neural network (RNN), radial basis function network, perception neural network (e.g., 5-layer perception neural network), convolutional neural network (CNN), or one or more other suitable neural networks. In one or more embodiments and, optionally, in combination of any embodiment described above or below, an exemplary implementation of a suitable neural network algorithm may be executed by the PSCI machine learning engine 405 utilizing neural network 407 in step 420 via the following: (a) define the neural network algorithm (e.g. ANN, or any other suitable neural network) to be utilized; (b) receive the PSCI learning data and/or sensor data; (c) train the dynamic insurance pricing model and/or one or more of the exemplary functions utilized in the dynamic insurance pricing model; (d) determine the accuracy of the exemplary trained dynamic insurance pricing model and/or one or more of the exemplary functions utilized by the dynamic insurance pricing model; (e) apply the exemplary trained and/or one or more of the exemplary functions to process newly received shipment details, real time shipment data and/or sensor data; and (f) continuously train the dynamic insurance pricing model and/or one or more of the exemplary functions utilized in the dynamic insurance pricing model utilizing the newly received shipment details, real time shipment data and/or sensor data and PSCI learning data (optional step). In one or more embodiments, the optional step (f) can be done parallel to steps (a)-(e).

Figure 4E:
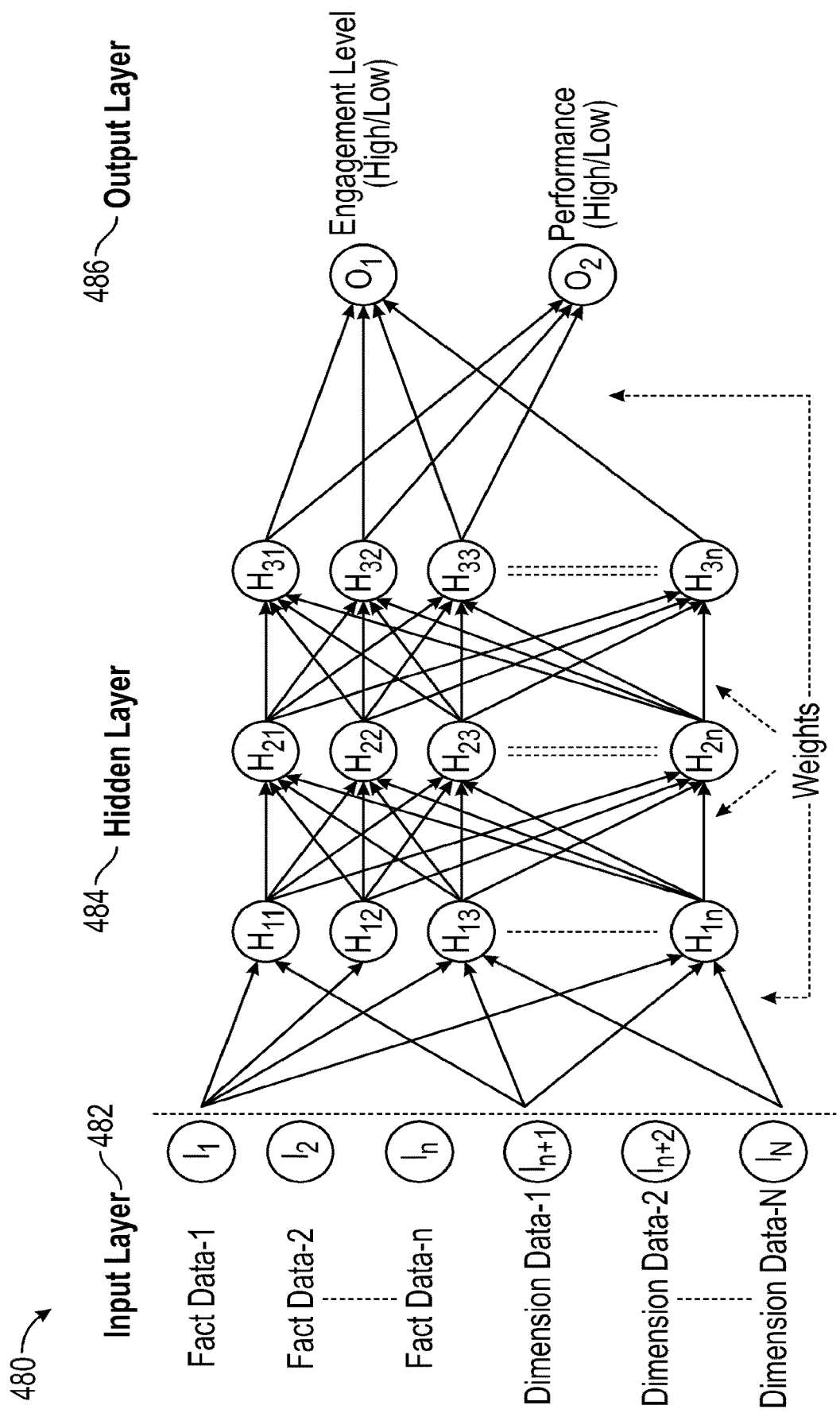
FIG. 4E illustrates exemplary sample layers of artificial neural networks utilized by the PSCI platform executing the PSCI software platform according to one or more embodiments of the present disclosure.

FIG. 4E illustrates one embodiment of the neural network 407 that includes an artificial neural network 480 that includes a number of different layers, such as input layers 482, hidden processing layers 484, and output layers 486. For example, in step 420, in one or more embodiments and, optionally, in combination with any embodiment described herein, an exemplary neutral network technique utilized by the PSCI machine learning engine 405 utilizing neural network 407 may be an artificial neural network (e.g., ANN 480). For example, the artificial neural network (ANN) 480 is designed to simulate the way the human brain analyzes and processes information. For example, the ANN 480 is the foundation of artificial intelligence (AI) and solves problems that would prove impossible or difficult by human or statistical standards. For example, the exemplary ANN 480, discussed with reference to FIG. 4E, is designed and trained using sets of PSCI learning data over previous patterns of the shipment details utilized to provide one or more insurance quotes and provide insurance policies for individual cargo shipments. For example, the PSCI machine learning engine in step 420 may receive historical shipment data provided by, for example, one or more PSCI databases 150a-150n, 251, third party databases 170a-170n, network databases 160a-160n and/or remote PSCI servers 175. As applied herein, for example, the ANN 480 may be trained using shipment details, information concerning the carriers utilized by the logistics shipping providers, historical shipment data and/or sensor data for previous cargo shipments of any kind (e.g., similar cargo type, dissimilar cargo type, cargo with similar weight parameters, cargo with similar dimensional parameters, shipping transportation routes (e.g., transportation routes concerning shipments with similar delivery routes, destinations, origins and/or routing legs/sections, etc.) or any other PSCI learning data for any suitable range of time (e.g., hours, days, weeks, months, years, decades, etc.). For example, in one or more embodiments, after the ANN 480 is trained, when the PSCI risk modeling engine 402 receives shipment details for a new cargo shipment, via PSCI API 401, at step 414, the ANN 480 receives the new shipment details at step 420, generates an optimal recommendation (e.g., one or more risk probability values and/or one or more commodity price modifiers) for generating the dynamic pricing model, and provides the same to the PSCI risk modeling engine 402, via PSCI machine learning module 405, such that an optimal insurance quote of insurance coverage for the identified cargo shipment may be provided to the logistics shipping provider, via an optimized dynamic pricing model.

In one or more embodiments, for example, the ANN 480 may, based upon PSCI learning data that includes input historical data, provide one or more risk probability values and/or one or more commodity price modifiers (e.g., increased/decreased risk probability value and/or increased, decreased or exclusion commodity price modifier) to the PSCI risk modeling engine 402, via PSCI machine learning module 405. For example, the one or more risk probability values and/or one or more commodity price modifiers may be applied to the exemplary insurance policy premium function and/or the technology solution function so that the PSCI risk modeling engine 402 may, for example, with the aid of the automated insurance compliance assessment rules engine at step 426 (discussed herein), determine whether the cargo shipment is in compliance with one or more regulatory rules and/or regulations, and/or determine with the aid of the user experience module at step 426 whether insurance coverage should be provided for the cargo shipment, and/or approve an insurance policy for the cargo shipment, and/or decline an insurance policy for the cargo shipment, and/or determine the dynamic insurance pricing model policy for the cargo shipment.

For example, in one or more embodiments and, optionally, in combination with any embodiment described herein, the ANN 480 may be configured as a backend server residing on the PSCI platform 100, and may receive data continuously over a network 110, 270. For example, in one or more embodiments, the machine learning engine continuously receives PSCI learning data including historical shipment data. For example, in one or more embodiments, when the amount of PSCI learning data that is received satisfies a predefined threshold (e.g., a minimum amount of data), the ANN 480 automatically generates information for optimizing the dynamic insurance pricing model. In certain embodiments, the received PSCI learning data may be a subset of the full set of available data, and the ANN 480 may process the subset of data to ensure that the processing will result in meaningful, new, and/or valid results prior to processing the full set of data.

For example, in one or more embodiments and, optionally, in combination with any embodiment described herein, the ANN 480 may include a number of different layers, as illustrated in FIG. 4E, the layers including one or more input layers 482, one or more hidden processing layers 484, and one or more output layers 486. For example, in one or more embodiments, the one or more input layers 482 receive the PSCI learning data and other historical data compiled at step 418 and feeds the input to the processing layers 484 of the ANN 480. In one or more embodiments, for example, the processing layer 484 has multiple different nodes, e.g., processing units, devices, modules, and/or the like, that are configured to transform the received historical shipment data and output the transformed data into subsequent processing nodes as input, and so on. In one or more embodiments, for example, the ANN 480 is considered optimized and/or trained when a set of weights are determined that minimizes the errors between a set of estimated results of the processing layers of an experimental insurance pricing module and the actual results of a reference insurance pricing module for a relevant cargo shipment that occurred within a relevant time period. For example, in one or more embodiments, the error percentage may be, for example, less than 5%, less than 1%, less than 0.5%, less than 0.25%, less than 0.10%, or within any suitable measure as would be appreciated by one having skill in the art. In one or more embodiments, for example, the weights are stored and used for later processing on new data sets as the PSCI machine learning engine 405 is utilized over time. In one or more embodiments, for example, the weights may be utilized to determine the value of the risk probability values or simulated risk probability values, the value of the commodity price modifiers or simulated commodity price modifiers, whether an insurance policy recommendation should be generated for a user of the PSCI platform, what kinds of insurance policy recommendations should be generated, and/or the like.

In step 422, for example, in one or more embodiments and, optionally, in combination with any embodiment disclosed herein, in step 422, for one or more individual cargo shipments, the PSCI probability scoring engine 406 generates a total aggregate risk distribution model utilizing one or more methods (i.e., Monte Carlo model) that determines the percentage of a policy's risk exposure or loss potential that is accepted by the underwriter. For example, the percentage of the policy's risk exposure or loss potential indicates the probability that there will be a claim on the insurance policy. For example, in step 422, in one or more embodiments and, optionally, in combination with any embodiment described herein, the risk associated with the optimized dynamic pricing model generated by the PSCI risk and modeling engine 402, utilizing one or more of the optimized risk probability values and/or the optimized commodity price modifiers generated by the PSCI machine learning engine 405, is received by the PSCI probability scoring engine 406.

For example, in one or more embodiments, an aggregate risk distribution is utilized, for one or more identified individual cargo shipments, to compare the total range of loss potential (measured in a monetary value (e.g., U.S. dollars, Euros, Pounds, etc.) to the probability of that loss occurring (e.g., % probabilities of the filing of a claim with respect to the identified cargo shipment) for each cargo shipment. For example, the total aggregate risk distribution (e.g., there is Y % chance that a claim will be filed for X (or less) monetary amount) may be provided as a cumulative probability distribution function which indicates for any given point on a probability curve denoted as (x, y). For example, the total aggregate risk distribution may also indicate that there is '(1−Y)' probability that the losses will be greater than 'X'. As discussed herein, in one or more embodiments, an underwriting function that is typically utilized by insurance providers to provide insurance coverage, is not required for the PSCI platform to provide an insurance quote to provide insurance coverage to a consignor as the underwriters utilizing the PSCI platform to provide insurance coverage for individual cargo shipments have provided one or more values for PSCI insurance bracket identifiers (discussed with reference to Table 2, provided herein) for each commodity type of cargo for which insurance provider will provide insurance coverage under the PSCI platform. For example, in one or more embodiments, the amount of risk that an underwriter is willing to accept for each commodity type of cargo included in an individual cargo shipment is received, via one or more PSCI databases, by the PSCI risk modeling engine 402 and compared to the total aggregate risk distribution for the relevant insurance provider to determine if the individual cargo shipment qualifies for insurance coverage. For example, an aggregate risk curve is generated and utilized by the PSCI probability scoring engine 406 and utilized by the PSCI risk and modeling engine 402, in one or more embodiments, to determine if one or more underwriters would provide insurance coverage for an identified cargo shipment. For example, in one or more embodiments, in response to a shipping customer requesting $X amount of dollars (e.g., the estimated value of the cargo included in the cargo shipment) of coverage for an individual cargo shipment, the PSCI risk modeling engine 402 may determine that a premium of $Y dollars is required to provide insurance to cover the cargo shipment based upon the aggregate risk curve is generated by utilized by the PSCI probability scoring engine 406 for an identified insurance provider. For example, in one or more embodiments, based upon underwriter data that is accessible by the PSCI probability scoring engine 406, the PSCI risk modeling engine 402 will utilize the aggregate risk curve generated by the PSCI probability scoring engine 406 and compare the amount of risk (e.g., expressed as X percentage) that an underwriter is willing to accept for the commodity type of cargo included in the identified cargo shipment, and other data (if appropriate). For example, in one or more embodiments, the PSCI risk modeling engine 402 will utilize the aggregate risk curve generated by the PSCI probability scoring engine 406 to determine the correlation of the loss potential ($XX) to a calculated premium associated with the identified cargo shipment—i.e., determine that there is a X % chance (amount of risk) that the determined loss potential ($XX, amount of money) could be greater than the premium paid by the consignor for insurance coverage for the relevant cargo shipment). For example, if the amount of risk (i.e., X %) is less than the predetermined amount of risk provided by the underwriter, then the request for an insurance policy will be automatically offered to the consignor. For example, if the amount of risk (i.e., X %) is greater the predetermined amount of risk provided by the underwriter, then an insurance policy requested by the consignor will be automatically declined.

Figure 4F:
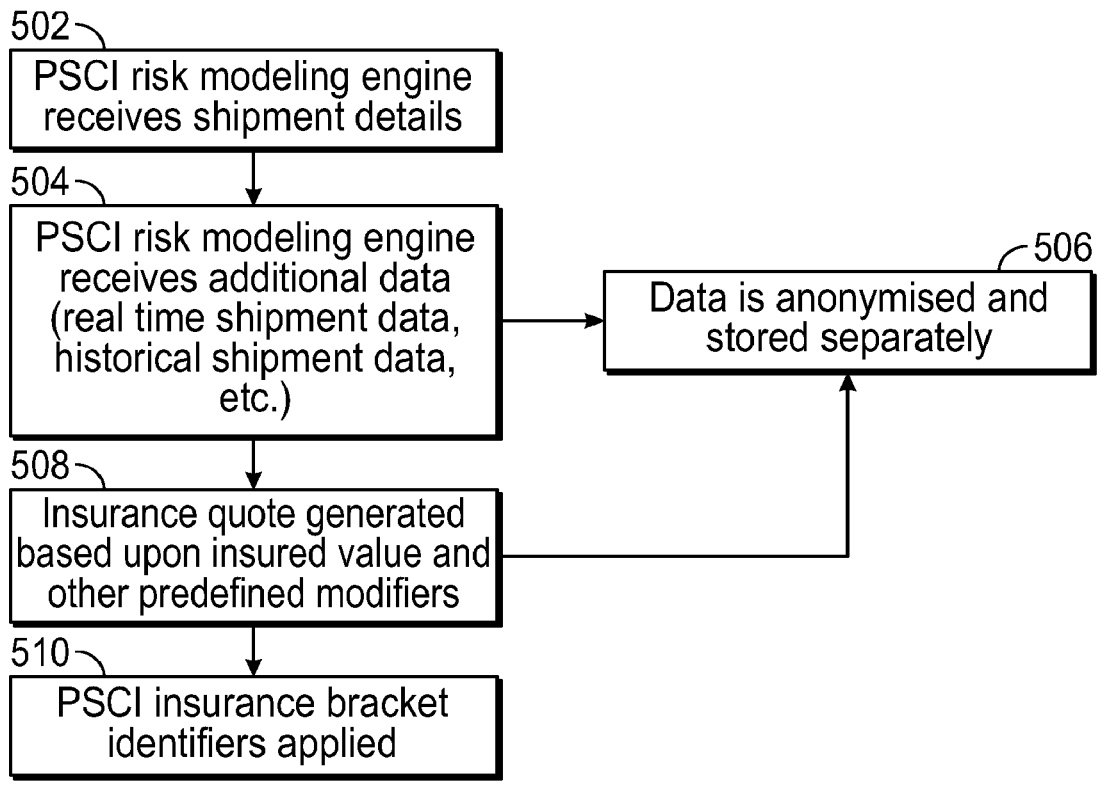

FIG. 4F is a flowchart depicting operational steps for PSCI risk modeling engine 402, an engine that generates a dynamic pricing model. For example, in one or more embodiments, the PSCI risk modeling engine 402 generates a dynamic pricing model in response to receiving shipment details for an identified individual cargo shipment, to determine an insurance quote in real time for an identified individual cargo shipment. In one or more embodiments, as will be disclosed with reference to FIGS. 4H and 4I, the PSCI risk modeling engine 402 utilizes the PSCI machine learning engine 405 in conjunction with artificial intelligence (e.g., a ANN 480) to generate increasingly better and improved dynamic pricing models (e.g., models that utilize one or more of the formulas 1-8 disclosed herein that include premiums based upon more accurate risks assessments for the shipment cargo) upon which the provided insurance quotes are based to develop and/or improve the accuracy of the computer-based PSCI platform utilized to generate the dynamic insurance pricing model, as discussed herein with reference to steps 414, 420 and 422, generated by PSCI risk modeling engine 402.

In step 502, for example, in one or more embodiments, shipment details, that include at least a portion of the shipping information provided by the customer/consignor to the logistics shipping provider GUI, are received by the PSCI risk modeling engine 402 for an identified individual cargo shipment.

In step 504, for example, in one or more embodiments, one or more of real time shipment data (discussed with reference to step 416 and FIG. 4C), historical shipment data (discussed with reference to step 418 and FIG. 4C), and/or other data (e.g., sensor data, telematics data, etc.) that is relevant to the identified individual cargo shipment is received by the PSCI risk modeling engine 402. For example, in one or more embodiments, sensor data, that is recorded before and/or during the transportation of the cargo included in the identified cargo shipment transported via land, sea, air, or with any combination, is received by remote sensors or telematics devices. For example, the sensor data may include environmental, contextual, behavioral, psychological, and/or other cargo shipment related data. For example, one or more sensors may be attached to the cargo container to record and store environmental conditions as a function of time. In one or more embodiments, the sensors are pre-programmed to record environmental data, contextual data, behavioral data, psychological data, and/or other cargo shipment related data at a desired sampling rate that can vary depending on the unique requirements of the insurance provider, the shipper, the logistics shipping provider and/or the cargo's sensitivity to adverse conditions. In one or more embodiments, at least a portion of one or more of the real time shipment data, historical shipment data, and/or other data (e.g., sensor data, telematics data, etc.) received by the PSCI risk modeling engine 402 is obtained from one or more PSCI databases 150a-150n, 251. In one or more embodiments, at least a portion of the data is received from third party sources. For example, in one or more embodiments, the data requested by the PSCI risk modeling engine 402 may be expressed as data points and utilized by the PSCI machine learning engine 405, PSCI probability scoring engine 406 and/or the exemplary neural network 407 to model and generate one or more risk probability values utilizing techniques disclosed herein.

In step 506, at least a portion of the data received by the PSCI risk modeling engine 402 in step 504 (e.g., the information received from third party databases and/or other external sources) is anonymized and stored in one or more PSCI databases 150a-150n, and/or one or more remote PSCI servers 175 to be utilized by the PSCI machine learning engine 405 in conjunction with artificial intelligence (e.g., a ANN 480) to generate increasingly better dynamic pricing models. For example, in one or more embodiments, one or more data anonymization processes is performed to encrypt identifiers that connect the stored data to the identified individual cargo shipment for later use by the PSCI software platform 400 to improve the functioning of the computer-based PSCI platform. For example, one or more of the PSCI risk modeling engine 402, software running on one or more of the PSCI databases 150, 251, or the PSCI user experience engine 403 operates to perform one or more anonymisation processes on the relevant received data. For example, the exemplary inventive PSCI platform 100 executing the exemplary software 400 comprises an anonymisation policy module included in one of, for example, the PSCI risk modeling engine 402, one or more of the PSCI databases 150, 251, or the PSCI user experience engine 403. In one or more embodiments, the anonymisation policy module is responsible for carrying out the required actions to perform an anonymisation (action) on received data relevant to the identified cargo shipment.

In step 508, for example, in one or more embodiments, the PSCI risk modeling engine 402 generates a dynamic pricing model based upon at least a portion of the shipment details and/or the data received in step 504. For example, in one or more embodiments, the PSCI risk modeling engine 402 compares the shipment details to the one or more relevant PSCI insurance bracket identifiers and applies the results to the dynamic pricing model to calculate an insurance quote. For example, in one or more embodiments, the shipment details may include for example, with respect to the identified individual cargo shipment, one or more of the estimated value, the commodity type of cargo included in the identified individual cargo shipment, the origination and destination addresses/geographical locations, the transport route (and optionally the transport legs included in the transport route), the estimated time it will take to deliver the cargo included in an individual cargo shipment from the origination to the destination, the identity of the customer/consignee, logistics shipping provider, mode of transport, etc. For example, in one or more embodiments, the dynamic pricing model based, for example, on one or more of the provided formulas (1)-(8), is utilized to provide an insurance quote based upon the commodity type of cargo included in the cargo shipment and the estimated value of the cargo included in the individual cargo shipment. For example, one or more risk probability values and/or one or more commodity price modifiers, as discussed above with respect to formulas (1)-(8), may be determined based upon the identified commodity type of cargo, as provided, for example, in FIGS. 5A through 5G. In one or more embodiments, the dynamic pricing model, the provided quote, and at least a portion of the information utilized to generate the dynamic pricing model, is anonymised and stored in one or more PSCI databases 150a-150n, and/or one or more remote PSCI servers 175 according to the processes disclosed with respect to step 506.

In step 510, for example, in one or more embodiments, in response to generating an insurance quote, the PSCI risk modeling engine 402 automatically performs the automated pre-underwriting process(es) utilizing the values for one or more of the PSCI insurance bracket identifiers. For example, in one or more embodiments, the PSCI risk modeling engine 402 automatically determines the commodity type of cargo included in the identified cargo shipment and, based upon the determined commodity type of cargo, applies one or more values of the PSCI insurance bracket identifiers (e.g., max value, min value, max duration, transport mode, international, asset type, tracking, min volume, min premium, max daily exposure, as disclosed with respect to Table 2 provide herein) to generated insurance quotes for the insurance providers utilizing the PSCI platform (referred to herein as qualified insurance providers) that is within the norms of the insurance provider pre-underwriting specifics.

For example, if the calculated insurance quote in step 508 is below a minimum premium value provided by an insurance provider, the insurance quote is raised by the PSCI risk modeling engine 402 to the minimum premium value. The generated one or more insurance quotes may be provided to the logistics shipping provider and/or the customer/consignor for selection by the customer/consignor, as disclosed herein.

Figure 4G:
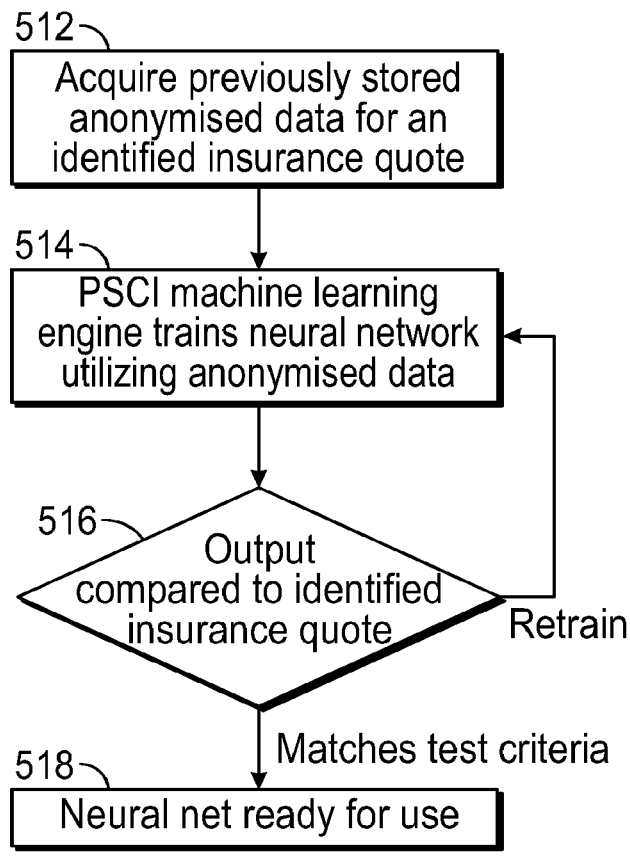

FIG. 4G is a flowchart depicting operational steps utilized by one or more of the PSCI machine learning engine 405, PSCI probability scoring engine 406 and/or the neural network 407 to train the PSCI platform to generate increasingly better dynamic pricing models, by which provided insurance quotes are generated, to improve the accuracy of the computer-based PSCI platform. In step 512, previously stored and anonymized PSCI learning data, for one or more identified insurance quotes associated with identified cargo shipments for which insurance was provided pursuant to the PSCI platform, is obtained. For example, in one or more embodiments, the PSCI machine learning engine 405 requests, from one or more PSCI databases 150a-150n, 251, previously stored and anonymised PSCI learning data (e.g., PSCI learning data as disclosed with respect to step 420 herein) that is relevant to the identified insurance quote.

In step 514, for example, at least a portion of the acquired PSCI learning data is utilized to train the neural network 407 utilized by the PSCI machine learning engine 405 to generate increasingly better dynamic pricing models. For example, in one or more embodiments, the PSCI machine learning engine 405 applies unsupervised learning techniques, disclosed herein with reference to FIG. 4D, to continuously train the neural network 407 to more accurately account for potential risk associated with insuring an individual cargo shipment. For example, in one or more embodiments, once the neural network 407 is properly trained, the neural network may utilize at least a portion of the PSCI learning data for an identified cargo shipment, that is to be shipped by a customer/consignor utilizing one or more logistics shipping providers, to determine a risk probability value (e.g., a percentage utilized to measure the related risk associated with the transport of a cargo included in an individual cargo shipment from an origination to a destination) associated with transporting the cargo included in an individual cargo shipment from its origin to its destination and dynamically modify an insurance generated by the PSCI risk modeling engine 402.

For example, in one or more embodiments and, optionally, in combination of any embodiment described herein, the exemplary neural network (ANN 407) receives previously stored and anonymised PSCI learning data values that the PSCI machine learning engine 405 has collected, based on simulations performed utilizing the one or more machine learning techniques (e.g., supervised and/or unsupervised machine learning techniques), and feeds the input layer 482 (e.g., data value input layers Fact Data-1 through Fact Data-n, and Dimensional Data-1 to Dimensional Data-n, as provided in FIG. 4E) the data which is, in turn, communicated to the processing layers 484 of the exemplary neural network 407. In one or more embodiments, the exemplary trained neural network model then propagates those values through connections within the processing layers 484 to a particular processing layer. For example, for a particular commodity type of cargo included in an individual cargo shipment (e.g., Live animals), categories of PSCI learning data values are feed into the input layer 482 of the exemplary neural network 407 to the processing layers 484, and the output data provided to the output layer 486 is compared to a reference risk probability value that is considered to be correct for the variable input category of PSCI learning data values. For example, in one or more embodiments, the various categories of PSCI learning data values utilized by the neural network are obtained from simulated models of cargo shipments generated by the PSCI machine learning engine 405. For example, in one or more embodiments, the reference risk probability values for each simulated cargo shipment are determined by the PSCI probability scoring engine 406. For example, in one or more embodiments, the various categories of PSCI learning data values associated with a particular commodity type of cargo included in an individual cargo shipment (e.g., Live animals) may include one or more of storage containers utilized to transport the identified commodity type of cargo included in the individual cargo shipment, a particular shipper utilized to transport the identified commodity type of cargo included the individual cargo shipment, a particular supplier of the identified commodity type of cargo included the individual cargo shipment, a particular mode of transport utilized to transport the identified commodity type of cargo included the individual cargo shipment, a particular cargo container utilized to contain the identified commodity type of cargo included the individual cargo shipment, a particular product packaging utilized to package the identified commodity type of cargo included the individual cargo shipment, historical weather data and/or environmental data compiled for similar (i.e., the same or similar) transportation routes utilized in the individual cargo shipment, transportation dates, historical environmental conditions for relevant date ranges compiled for regions of which the transportation routes utilized in the individual cargo shipment cross, historical sensor data collected for the identified or a similar commodity type of cargo included in the individual cargo shipment, historical telematics data collected for the identified commodity type of cargo included in the individual cargo shipment, and/or other historical relevant shipment data collected for the identified commodity type of cargo included in the individual cargo shipment, and/or any combination thereof with respect to the identified commodity type of cargo included in the individual cargo shipment. For example, in one or more embodiments, additional categories of PSCI learning data values may be utilized by the exemplary neural network 407.

For example, in one or more embodiments, the various categories of PSCI learning data values associated with a particular commodity type of cargo included in an individual cargo shipment (e.g., Live animals) may include one or more of data that is relevant to the transport route, regions (e.g., state, country, region, county, etc.) and mode of transportation utilized by the identified cargo shipment, including historical piracy data, historical theft data, historical terrorist data, historical natural disaster data, historical regional/global conflict data, historical political risk data, historical weather data, historical news data, or any other suitable relevant historical data. For example, in one or more embodiments, the PSCI machine learning engine 405 discards low quality and/or irrelevant PSCI learning data utilized to simulate improved model cargo shipments for which risk probability values may be generated to, thereby conserve memory to reduce storage requirements, and reduce processing overhead. The processes performed by the PSCI machine learning engine 405 to remove the low quality and/or irrelevant data to simulate model cargo shipments increases the operating efficiency of the PSCI machine learning engine 405 and, thus, the PSCI platform 100. Such processes further increase the computational efficiency of the PSCI platform 100 by removing illogical data that would require additional processing cycles to analyze. As such, the processes performed by the PSCI machine learning engine 405 and the neural network 407 are directed to one or more improvement(s) in the functioning of a computer, for example, one or more server devices 120 included in the PSCI platform 100.

For example, in one or more embodiments and, optionally, in combination with any embodiments disclosed herein, the processing layers 484 may include multiple different nodes that include, for example, one or more of software components, processing/processor units, devices and/or modules (and/or the like) that are configured to transform one or more of the received categories of PSCI learning data values associated with a particular commodity type of cargo included in an individual cargo shipment and output the transformed data into subsequent processing nodes as input, and so on. For example, in one or more embodiments and, optionally, in combination with any embodiments disclosed herein, one or more (e.g., all or a subset included in one or more processing layers 484) of the neural network connections included in the processing layers 484 (e.g., layers $H_{11}$ through $H_{1n}$, and $H_{n1}$ through $H_{nn}$) may include a numerical weighting value (e.g., a value between −1 and 1) that is utilized by the exemplary neural network 407 to modify the original values provided in each category of PSCI learning data values (e.g., propagated value=original value*numerical weighting value). For example, in one or more embodiments and, optionally, in combination with any embodiments disclosed herein, the nodes of the particular processing layer $H_{XX, (X=1 \text{ to } n)}$ receive the before mentioned propagated values as input. For example, in one or more embodiments and, optionally, in combination with any embodiments disclosed herein, each node of the particular layer $H_{XX, (X=1 \text{ to } n)}$ may include a function that combines the received PSCI learning data values for a particular category (e.g., summing all received inputs). For example, each node in the particular processing layer $H_{XX, (X=1 \text{ to } n)}$ may further contain one or more activation functions that determines when a PSCI learning data value(s) in a particular category would be output on a connection of connections to the next layer $H_{XX+1, (X=1 \text{ to } n)}$ (e.g., output+1 if the combined value of the inputs is >0 and output −1 if the combined value of the inputs is <0, and output 0 if the combined value of the inputs is =0). For example, each node of an exemplary output layer $H_{XX, (x=1 \text{ to } n)}$ may correspond to a predefined category for the input PSCI learning data values, as disclosed above. For example, the combined input PSCI learning data values for each node of the output layer may determine a category determined for the input (e.g., the category for the output node that has the largest combined input values). For example, in one or more embodiments and, optionally, in combination with any embodiments disclosed herein, by combining input PSCI learning data values for each node of the output layer the exemplary neural network (e.g., ANN 480) structure, the combined input values may be utilized by the PSCI machine learning engine 405 to determine a category for some PSCI learning data input that is not otherwise identified in a particular category.

For example, in one or more embodiments, in step 516, the results of the processing layers 484 output in the output layer 486 are compared to the actual results of the reference quote (e.g., the risk probability value utilized to generate the dynamic pricing model that generates the insurance quote). For example, in one or more embodiments, if the results of the processing layers 484 output in the output layer 486 are not within a predetermined test criteria threshold (e.g., 1% error rate, less than 1% error rate, 3% error rate, minimum amount of data utilized to determine the desired value) of the actual results of the reference quote, the neural network is continuously fed data (i.e., retrained), as referenced in step 516 in FIG. 4G, until the results of the processing layers 484 output in the output layer 486 are within the predetermined test threshold. For example, in one or more embodiments, the exemplary neural network (e.g., ANN 480) is considered trained, in step 518 when the set of weights, as illustrated in FIG. 4E, are determined that minimizes the errors between the estimated results of the processing layers and the actual results. For example, in one or more embodiments, the one or more of the steps 512, 514 and 516 could have been performed numerous times (e.g., tens, hundreds, thousands, ten thousands, hundred thousands, millions, etc. of cycles). For example, in one or more embodiments, the one or more of the steps 512, 514 and 516 could have been performed utilizing numerous cargo shipment models (e.g., tens, hundreds, thousands, ten thousands, hundred thousands, millions, etc.). For example, in one or more embodiments, the one or more of the steps 512, 514 and 516 could have been performed numerous times utilizing numerous cargo shipment data points (e.g., tens, hundreds, thousands, ten thousands, hundred thousands, millions, etc.) included in the numerous models. In one or more embodiments, for example, the determined weights are stored and used by the PSCI machine learning engine 405 and neural network 407 for later processing of new PSCI data (e.g., shipment details) received by the PSCI risk modeling engine 402 data sets as the machine learning engine 405 and neural network 407 uses the PSCI platform to dynamically modify the insurance quote (e.g., dynamically modify the risk probability value associated with the new insurance quote) provided by the PSCI risk modeling engine for a new identified cargo shipment. For example, in one or more embodiments, the determined weights are utilized by the PSCI machine learning engine 405 and neural network 407 to determine the proficiency level of the PSCI platform and whether the insurance quote provided for the new identified cargo shipment should be modified. Such processes further increase the computational efficiency of the PSCI platform 100 by removing illogical cargo shipment data points that would require additional processing cycles performed by the neural network 407 to analyze. Further, removing low quality and/or irrelevant cargo shipment data points from the input of the neural network 407 reduces the storage requirements associated with the simulated model cargo shipments and the data points utilized as input into the neural network 407 taken from the simulated model cargo shipments, and improves the hardware processing speed of the one or more processors 105 included in the PSCI platform 100. As such, the processes performed by the PSCI machine learning engine 405 and the neural network 407 are directed to one or more improvement(s) in the functioning of a computer, for example, one or more server devices 120 included in the PSCI platform 100.

Figure 4H:
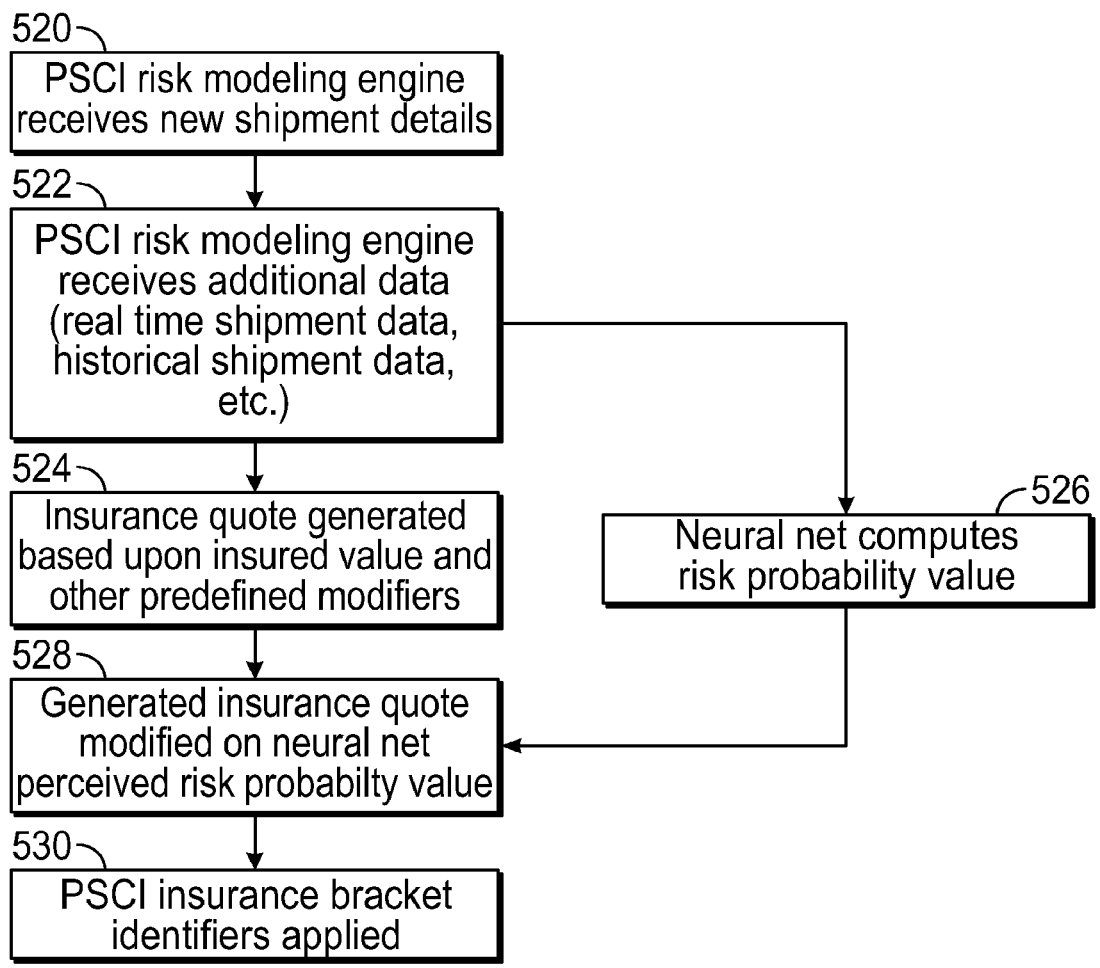

FIG. 4H is a flowchart depicting operational steps utilized by one or more of the PSCI machine learning engine 405, PSCI probability scoring engine 406 and/or the neural network 407 to dynamically modify an insurance quote provided by the PSCI risk modeling engine 402 to generate increasingly better dynamic pricing models, by which provided insurance quotes are generated, and to improve the accuracy of the computer-based PSCI platform. In step 520, for example, in one or more embodiments, shipment details, that include at least a portion of the shipping information provided by the customer/consignor to the logistics shipping provider GUI, are received by the PSCI risk modeling engine 402 for a new identified individual cargo shipment. In step 504, for example, in one or more embodiments, one or more of real time shipment data (discussed with reference to step 416 and FIG. 4C), historical shipment data (discussed with reference to step 418 and FIG. 4C), and/or other data (e.g., sensor data, telematics data, etc.) that is relevant to the identified individual cargo shipment is received by the PSCI risk modeling engine 402.

In step 522, for example, in one or more embodiments, at least a portion of one or more of real time shipment data (discussed with reference to step 416 and FIG. 4C), historical shipment data (discussed with reference to step 418 and FIG. 4C), and/or other data (e.g., sensor data, telematics data, etc.) that is relevant to the new identified individual cargo shipment is received by the PSCI risk modeling engine 402. For example, in one or more embodiments, the data requested by the PSCI risk modeling engine 402 may be expressed as data points and utilized by the PSCI machine learning engine 405, PSCI probability scoring engine 406 and/or the exemplary neural network 407 to model and generate one or more risk probability values utilizing techniques disclosed herein.

In step 524, for example, in one or more embodiments, the PSCI risk modeling engine 402 generates a new dynamic pricing model, including a generated risk probability value, based upon at least a portion of the new shipment details and/or the data received in step 522, in a similar manner to the processes described with reference to step 508, to provide an insurance quote for the new identified cargo shipment that is based upon the generated risk probability value. In one or more embodiments, for example, an insurance quote may be provided for each qualifying insurance provider (e.g., an insurance provider for which one or more of the provided pre-underwriting PSCI insurance bracket values (e.g., max value, min value, max duration, transport mode, international, asset type, tracking, min volume, min premium, max daily exposure, as disclosed with respect to Table 2, provided herein, for one or more commodity types of cargo included in the identified cargo shipment), provided for that particular insurance provider, has been met for the identified commodity type of cargo included in the identified cargo shipment).

In step 526, for example, in one or more embodiments, at least a portion of the shipment details, and/or the real time shipment data, and/or the historical shipment data and/or other data received by the PSCI risk modeling engine 402 is provided to the exemplary neural network 407, via the PSCI risk modeling engine 402 and/or the PSCI machine learning engine 405, as disclosed herein, to output a risk probability value utilizing techniques disclosed herein. For example, the exemplary neural network 407 is now trained, based upon the processing algorithm steps disclosed with reference to FIG. 4G, to output one or more model risk probability values (e.g., recommendations) based upon at least a portion of the shipment details, and/or the real time shipment data, and/or the historical shipment data and/or other data received by the PSCI risk modeling engine 402 in step 522, utilizing one or more of the techniques disclosed herein. For example, in one or more embodiments, the exemplary neural network 407 may output one or more alternative model risk probability values, for a model individual cargo shipment that includes the same Start date, End date, Start location, End location, transport route and mode of transportation (e.g., one of road, water, air, rail), that are lower/higher than the generated probability risk value generated by the PSCI risk modeling engine 402 in step 524. For example, in one or more embodiments, the exemplary neural network 407 may output one or more alternative model risk probability values, for a model individual cargo shipment that includes a cargo that is classified under the same commodity type of cargo, and has the same insured value of cargo as the identified cargo shipment but, rather, that includes one or more of a different Start date, a different End date, a different Start location, a different End location, a different transport route, different one or more transport legs included in the route, a different mode of transportation (e.g., one of road, water, air, rail), that are lower/higher than the generated probability risk value generated by the PSCI risk modeling engine 402 in step 524.

For example, in one or more embodiments, real time shipment data, received by the PSCI risk modeling engine 402, may be provided to the exemplary neural network 407 utilizing techniques disclosed herein, such that the trained neural network 407 may output one or more modified risk probability values for one or more qualifying insurance providers for the identified cargo shipment. For example, in one or more embodiments, at least a portion of the real time shipping data is input into a cargo shipment model, that includes data measurements provided by one or more of the sensors, and, thereafter, that cargo shipping model is fed to the input layers of the neural network 407 such that a model risk probability value associated with the cargo shipment model and, thus, the portion of the real time shipping data input into the cargo shipment model, is output by the neural network utilizing one or more techniques disclosed herein. For example, in one or more embodiments, the real time shipment data that includes sensor data, generated by one or more sensor devices (e.g., 290, see FIG. 2) and received by one or more accessible databases (e.g., PSCI databases 150, 251, and/or one or more databases 150a-150n, 160a-160n, and/or 170a-170n accessible via PSCI platform server devices 120a-120n), concerning the cargo included in the identified cargo shipment, is received by the PSCI risk modeling engine 402. For example, in one or more embodiments, sensor data, utilized to measure the temperature and humidity of the space inside a cargo container utilized to transport the cargo included in the identified cargo shipment, is received by the PSCI risk modeling engine 402 and automatically provided to the PSCI machine learning engine 405, in response to the receipt of the sensor data, to generate a cargo shipment model that includes the temperature and humidity data measurements provided by the one or more of the sensors. For example, in one or more embodiments, the cargo shipment model generated by the PSCI machine learning engine 405 can include one or more similar characteristics (e.g., one or more of the same commodity types of cargo, same mode of transport, same container utilized to transport the cargo, etc.) to the identified cargo shipment. In one or more embodiments, the generated cargo shipping model is fed to the input layers of the neural network 407 such that a model risk probability value, for a cargo shipment that is impacted by the real time shipping data input into the cargo shipment model (i.e., the temperature and humidity measurement data), is output by the neural network utilizing one or more techniques disclosed herein.

For example, sensor data that is relevant to the identified cargo shipment may include, but not be limited to, one or more of moisture sensor data, humidity sensor data, temperature sensor data, dew point sensor data, atmospheric pressure and density sensor data, wind sensor data, cloud sensor data, precipitation sensor data, evaporation sensor data, atmospheric stability sensor data, frost sensor data, radiation and other meteorological parameter sensor data, air sensor data, water sensor data, pollution sensor data, emissions sensor data, waste sensor data, water transportation condition sensor data, cargo shock sensor data, rail transportation condition sensor data, road transportation condition sensor data, air transportation condition sensor data, railway transportation condition sensor data, turbulence sensor data, and/or the visibility sensor data, and/or any other sensor data that may be relevant to and/or impact a cargo shipment. For example, in other embodiments, other real time shipment data may be utilized in a manner similar to the exemplary sensor data, disclosed above, such that the generated cargo shipping model is fed to the input layers of the neural network 407 such that a model risk probability value, for a cargo shipment that is impacted by the real time shipping data input into the cargo shipment model, is output by the neural network utilizing one or more techniques disclosed herein. For example, in one or more embodiments, real time data, that may be utilized by the PSCI machine learning engine 405 to obtain a model risk probability value for a cargo shipment that is impacted by the relevant real time shipping data, may also include, for example, one or more of telematics data received from one or more telematics devices 140, 295 information about transportation contextual information, environmental data, and/or global conflict data (e.g., intelligence, information, trends, etc.), and/or traffic data (e.g., intelligence, information, trends, etc.) and/or weather data (e.g., intelligence, information, trends, etc.) received from one or more third party sources (e.g., third party databases 170a-170n) and/or data crawlers utilized by the PSCI platform 100 and/or the third party sources data concerning the cargo itself, and/or other relevant data (e.g., value data, data that indicates damage to the cargo, depreciation/appreciation in value, cargo attributes (weight, height, width, container/packaging/restraint/transport requirements), and/or other real time shipment data disclosed herein.

For example, in one or more embodiments, historical shipment data, received by the PSCI risk modeling engine 402, may be provided to the exemplary neural network 407 utilizing techniques disclosed herein, such that the trained neural network 407 may output one or more modified risk probability values for one or more qualifying insurance providers for the identified cargo shipment. For example, in one or more embodiments, at least a portion of the historical shipping data is input into a cargo shipment model, that includes, for example, historical data obtained from one or more PSCI databases 150, 251, and or one or more third party sources, and, thereafter, that cargo shipping model is fed to the input layers of the neural network 407 such that a model risk probability value associated with the cargo shipment model and, thus, the portion of the historical shipping data input into the cargo shipment model, is output by the neural network utilizing one or more techniques disclosed herein. For example, in one or more embodiments, the cargo shipment model generated by the PSCI machine learning engine 405 can include relevant historical data in addition to one or more similar characteristics (e.g., one or more of the same commodity types of cargo, same mode of transport, same container utilized to transport the cargo, etc.) to the identified cargo shipment. In one or more embodiments, the generated cargo shipping model that includes historical shipment data is fed to the input layers of the neural network 407 such that a model risk probability value, for a cargo shipment that is impacted by the historical shipping data input into the cargo shipment model (i.e., the temperature and humidity measurement data), is output by the neural network utilizing one or more techniques disclosed herein.

For example, in one or more embodiments, the historical shipment data requested and received by the PSCI risk modeling engine 402 for the identified cargo shipment may include one or more of data for one or more previous cargo shipments that included certain commodity types of cargo that are relevant (e.g., identical or similar) to the identified cargo shipment, data for previous transport routes or route legs that are similar to the transport route for the identified cargo shipment, and/or data for one or more storage facilities, shippers, suppliers, modes of transport, cargo containers, product packaging and any combination thereof that is relevant to the identified cargo shipment. For example, the historical shipment data requested and received by the PSCI risk modeling engine 402 for the identified cargo shipment may include data, that is relevant to the transport route, regions (e.g., state, country, region, county, etc.) and mode of transportation utilized by the identified cargo shipment, including historical piracy data, historical theft data, historical terrorist data, historical natural disaster data, historical regional/global conflict data, historical political risk data, historical weather data, historical news data, or any other suitable relevant historical data. For example, as disclosed herein, one or more third party sources (e.g., third party databases 170a-170n) and/or data crawlers utilized by the PSCI platform 100 and/or the third party sources may be utilized to obtain historical shipment data concerning, for example, the cargo route, the route legs included in the cargo route, the cargo itself, the region through which the route extends, and/or other relevant historical data that may be utilized to determine a risk probability value with respect to the cargo shipment.

In step 528, for example, in one or more embodiments, the PSCI risk modeling engine 402 may dynamically modify the dynamic pricing model to modify the insurance quote and, thus the generated risk probability value, based upon one or more model risk probability value recommendations output by the exemplary neural network 407 in step 526. For example, the model risk probability value output by the neural network 407 may be based upon a cargo shipping model that includes at least a portion the relevant real time shipment data and/or historical shipment data and/or other relevant data received by the PSCI modeling risk engine received in step 522. For example, in one or more embodiments, the risk probability value generated by the PSCI risk modeling engine 402 for the dynamic pricing model associated with the identified cargo shipment may be modified by incorporating one or more of model probability risk values, output by the neural network 407, into the dynamic pricing model to modify the calculated premium value. For example, in one or more embodiments, the generated risk probability value included in the new dynamic pricing model may be modified based upon a satisfied threshold requirement when compared to the model risk probability value. For example, in one or more embodiments, the generated risk probability value included in the new dynamic pricing model may be modified based upon one or more recommendations output by the neural network 407 (e.g., changing one or more of the Start date, changing the End date, changing the Start location, changing the End location, changing the transport route, changing the one or more transport legs included in the route, changing the mode of transportation (e.g., one of road, water, air, rail), and/or changing another relevant characteristic of the cargo shipment). For example, if a shipment cargo model that includes a different mode of transportation, than what is utilized in the new identified cargo shipment, is fed into the input layers of the exemplary neural network 107, the output model risk probability value may be lower/higher than the generated risk probability value for the identified cargo shipment. In this instance, for example, in one or more embodiments, the generated insurance quote may be utilized to generate the insurance quote provided to the consignor if one or more of the criteria described herein (e.g., if the output model risk probability value is higher than the generated risk probability value) concerning the modification of the generated risk probability value, with respect to a disclosed embodiment, is met. For example, in one or more embodiments, the output model insurance policy premium may be utilized to generate the insurance quote provided to the consignor if one or more of the pre-underwriting criteria described herein (e.g., if the output model risk probability value is lower than the generated risk probability value) concerning the modification of the generated risk probability value, with respect to a disclosed embodiment, is met. In this manner, in one or more embodiments, the PSCI risk modeling engine 402 may utilize one or more of the PSCI machine learning engine 405, PSCI probability scoring engine 406 and/or the exemplary neural network 407, as disclosed herein, to provide suggestions (e.g., change the mode of transport, etc.) to the consignor, with respect to an insurance quote provided for one or more qualifying insurance providers, on how to lower the provided insurance policy premium associated with the provided insurance quotes.

For example, in one or more other embodiments, for example, if the one or more risk probability values output by the exemplary neural network 407 were for a model individual cargo shipment that includes the same Start date, End date, Start location, End location, transport route and mode of transportation (e.g., one of road, water, air, rail) as the identified cargo shipment (i.e., output risk probability values are lower/higher than the generated probability risk value generated by the PSCI risk modeling engine 402 in step 524), the generated risk probability value may be modified based upon a ratio of the generated risk probability value to the model risk probability value. For example, in one or more other embodiments, for example, if the one or more risk probability values output by the exemplary neural network 407 were for a model individual cargo shipment that includes the same Start date, End date, Start location, End location, transport route and mode of transportation (e.g., one of road, water, air, rail) as the identified cargo shipment (i.e., output risk probability values are lower/higher than the generated probability risk value generated by the PSCI risk modeling engine 402 in step 524), the higher (or lower) of the generated risk probability value and the model risk probability value may be utilized to generate an insurance policy premium and, thus, an insurance quote if the model risk probability value satisfies a certain threshold requirement with respect to the generated risk probability value (e.g., the generated risk probability value is within a certain percentage (e.g., 1>, 2.2>, 5>, etc.) of the model risk probability value. In one or more embodiments, one of the mean, the average, the median or any other suitable measurement for modifying the generated risk probability value to generate an insurance quote for an individual cargo shipment may be utilized. For example, in one or more other embodiments, for example, if the one or more risk probability values output by the exemplary neural network 407 were for a model individual cargo shipment that includes the same Start date, End date, Start location, End location, transport route and mode of transportation (e.g., one of road, water, air, rail) as the identified cargo shipment (i.e., output risk probability values are lower/higher than the generated probability risk value generated by the PSCI risk modeling engine 402 in step 524), the generated insurance quote may be utilized to generate the insurance if one or more of the aforementioned criteria described concerning the modification of the generated risk probability value, with respect to a disclosed embodiment, is not met.

In step 530, for example, in one or more embodiments, in response to selecting one of the generated insurance quote or the modified insurance quote, the PSCI risk modeling engine 402 automatically performs the automated pre-underwriting process(es) utilizing the values for one or more of the PSCI insurance bracket identifiers, utilizing a similar process(es) as disclosed with respect to step 510. For example, in one or more embodiments, insurance providers may provide values for one of the PSCI insurance bracket identifiers to be utilized in the automated pre-underwriting process, as discussed herein with respect to Table 2. For example, with respect to each of the qualifying insurance providers, if the commodity type of cargo included in the identified cargo shipment is a cargo for which a minimum premium value 'min premium' of $X is provided (i.e., the PSCI insurance bracket identifier 'min value' is determined for each qualifying insurance provider for each generated premium), then the PSCI risk modeling engine will compare the premiums, with respect to each dynamic pricing model generated for each qualifying insurance provider, and determine if the one or more premium values are lower than the provided PSCI insurance bracket identifier 'min value'. For example, in one or more embodiments, each of the identified lower premiums are raised to the 'min premium' of $X, and the corresponding insurance quotes utilizing the new raised premiums are utilized by the PSCI risk modeling engine 402 to generate respective insurance quotes. For example, in step 530, the PSCI risk modeling engine may compare other PSCI insurance bracket identifier values, provided by qualifying insurance providers to modify the generated premiums and/or deny insurance coverage, including one or more of 'commodity type', 'max value', 'min value', 'max duration', 'transport mode', 'international', 'asset type', 'tracking', 'min volume', 'min premium', 'max daily exposure' and 'risk probability value (i.e., risk percentage)'. For example, in one or more other embodiments, the PSCI insurance bracket identifier value for 'commodity type', provided by one or more insurance providers, may be compared to one or more shipment details (e.g., commodity type, and/or commodity description) by the PSCI risk modeling engine 402 in steps 524 or 528 to determine if the cargo included in the cargo shipment is one that may qualify to be insured by the respective insurance providers.

In one or more other embodiments and, optionally, in combination with any embodiment described herein, for example, steps 524, 528 and 530 are not performed such that the model risk probability value is utilized to generate an insurance policy premium and, thus, an insurance quote without utilizing the pre-underwriting criteria to modify the insurance policy premium. For example, in these embodiments, the output model risk probability value may be utilized by the PSCI risk modeling engine 402 to generate the insurance quote provided to the consignor. In this manner, in these embodiments, the PSCI risk modeling engine 402 may utilize one or more of the PSCI machine learning engine 405, PSCI probability scoring engine 406 and/or the exemplary neural network 407, as disclosed herein, to provide insurance quotes for the individual cargo shipment without the utilization of pre-underwriting criteria provided by insurance providers to perform the pre-underwriting process. In these embodiments, each insurance quote provided to the consignor to provide insurance for the individual cargo will be automatically assigned to an insurance provider without applying the pre-underwriting criteria to the shipment details and/or the output model risk probability value. In these embodiments, the PSCI risk modeling engine 402 may apply a commodity modifier to the insurance policy premium and a commodity modifier to the technology fee to generate the respective adjusted insurance policy premium and the adjusted technology fee utilized to generate the insurance quotes, as disclosed herein, that will be provided to the consignor for her selection.

In one or more embodiments and, optionally, in combination with any embodiment described herein, the PSCI risk modeling engine 402 is also configured to automatically provide suggestions to one or more of the customer/consignor/cargo owner and or the logistics shipping provider concerning how to reduce the premium associated with an insurance quote for insurance coverage for an identified cargo shipment. For example, in one or more embodiments, the PSCI risk modeling engine 402 may receive data from the PSCI machine learning engine 405 utilizing the neural network 407 that suggests, based upon the analytics, that utilizing one or more different transport routes will result in a lower premium and, thus, costs savings to the consignor. For example, the PSCI risk modeling engine 402 may be configured to provide an insurance quote in real time for a customer requesting to book a shipment in August from Baltimore, MD to Houston, TX on an LTL (less than truckload) refrigerated truck. In this example, the PSCI risk modeling engine 402 may be configured to offer an insurance quote for the requested shipment, first and second alternative insurance quotes for shipping the same cargo included in the individual cargo shipment via airfreight (i.e., $1^{st}$ alternative insurance quote with telematics and $2^{nd}$ alternative insurance quote without telematics), third and fourth alternative insurance quotes for shipping the same cargo included in the individual cargo shipment for a truckload refrigerated truck (i.e, $3^{rd}$ alternative insurance quote with telematics, and $4^{th}$ alternative insurance quote without telematics), and fifth and sixth alternative insurance quotes for shipping the same cargo included in the individual cargo shipment via rail ($5^{th}$ alternative insurance quote with telematics, and $6^{th}$ alternative insurance quote without telematics). For example, in one or more embodiments and, optionally, in combination with any embodiment described herein, the PSCI risk modeling engine 402 is also configured to automatically provide suggestions concerning how to reduce the premium associated with an insurance quote for insurance coverage for an identified cargo shipment based on weather forecast for the region. For example, the PSCI risk modeling engine 402 may be configured to provide an insurance quote in real time for a customer requesting to book an individual cargo shipment in August from Baltimore, MD to Houston, TX by road. In this example, the PSCI risk modeling engine 402 may have received real time shipment data that suggests that there may be a delay in the predetermined start and or delivery time for the shipment due to unfavorable weather conditions along the transport route. wherein thereon an LTL (less than truckload) refrigerated truck. In this example, for example, the PSCI risk modeling engine 402 may be configured to provide first and second alternative insurance quotes, in real time, for shipping the same cargo included in the individual cargo shipment via airfreight (i.e, $1^{st}$ alternative insurance quote with telematics and $2^{nd}$ alternative insurance quote without telematics), an option that would avoid the unfavorable weather and the shipping delay.

One having ordinary skill in the art with the benefit of this specification will appreciate that the PSCI risk modeling engine 402, the PSCI machine learning engine 405 and the neural network 407 can be utilized to provide risk assessments for cargo insurance products, and other insurance products including general liability insurance, homeowners insurance, commercial insurance, extended liability insurance, personal insurance, long term disability insurance, short term disability insurance, flexible combinations of short and long term disability insurance and/or property insurance. For example, in one or more embodiments and, optionally, in combination with any embodiment disclosed herein, the PSCI learning data that is utilized to train the neural network 407 utilized by the PSCI machine learning engine 405 to generate increasingly better dynamic pricing models, as disclosed herein, may include data from insurance scenarios wherein general liability claims have been filed with respect to general liability insurance policy. In this example, the risk for a general liability insurance may be calculated by the formula [risk]=[commodity price modifier]*[insured value]*[risk probability value]. In one or more embodiments, the estimated value of the asset to be insured is the insured value. For example, in one or more embodiments, the 'risk probability value' is a value below 1 (e.g., 0.025) and is a measurement of the probability that there will be a claim on the insurance policy. For example, previously stored and anonymized learning data, for one or more identified insurance quotes associated with identified assets for which general liability insurance was provided, may be obtained by the PSCI machine learning engine 405. For example, in these examples, at least a portion of the acquired learning data may be utilized to train the neural network 407 utilized by the PSCI machine learning engine 405 to generate increasingly better dynamic pricing models for general liability insurance products, as discussed herein with respect to the cargo insurance products. For example, in one or more embodiments, the PSCI machine learning engine 405 applies unsupervised learning techniques, disclosed herein with reference to FIG. 4D, to continuously train the neural network 407 to more accurately account for potential risk associated with general liability insurance products. For example, in one or more embodiments, once the neural network 407 is properly trained, the neural network may utilize at least a portion of the learning data for a general liability insurance products to determine a risk probability value (e.g., a percentage utilized to measure the related risk associated with the asset) and dynamically modify an insurance policy premium generated by the PSCI risk modeling engine 402, as discussed herein with respect to the cargo insurance products. One having ordinary skill in the art with the benefit of this disclosure appreciates that the techniques discussed herein with respect to FIGS. 4A through 4H, with respect to cargo insurance products, may be utilized to determine risk assessment (e.g., risk probability values) for homeowners insurance, commercial insurance, extended liability insurance, personal insurance, long term disability insurance, short term disability insurance, flexible combinations of short and long term disability insurance and/or property insurance products.

Figure 8:
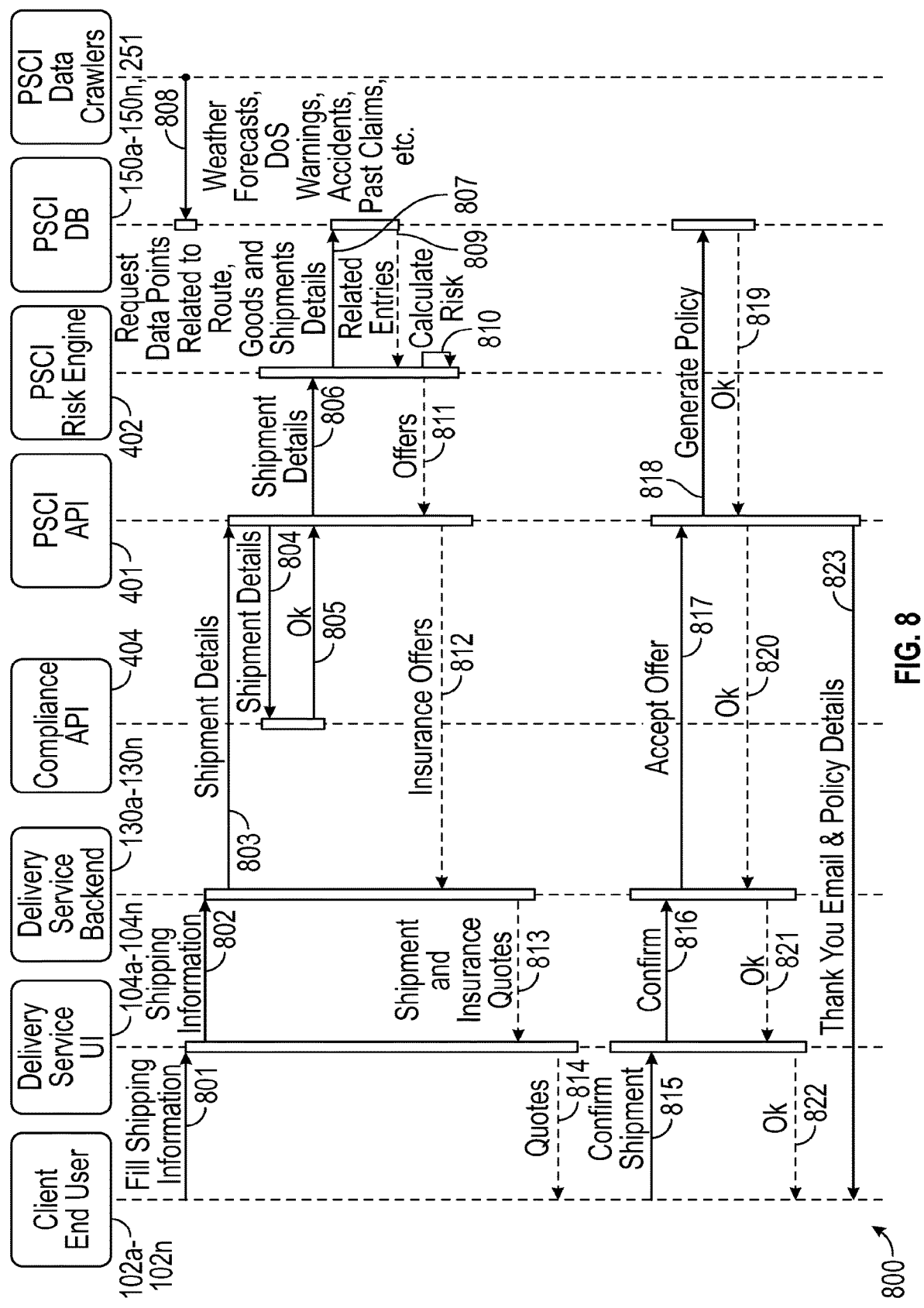
FIG. 8 represents a PSCI system interactivity data and logic flow diagram depicting an exemplary embodiment of the functionality performed by the PSCI platform executing the PSCI software platform in an exemplary embodiment of the PSCI System according to one or more embodiments of the present disclosure.

A customer/consignor can request and receive per-shipment cargo insurance for an individual cargo shipment by utilizing a user device 102 to interact with a logistics shipping provider computer system that is utilizing the exemplary PSCI platform executing the PSCI software. In one or more embodiments, for example, FIG. 8 represents a system interactivity data and logic flow diagram depicting one or more exemplary embodiments of the functionality performed by the exemplary PSCI platform executing the PSCI software platform to provide one or more insurance quotes in real time once shipment details are received by the by PSCI risk modeling engine 402. In one or more other embodiments, for example, FIG. 8 represents a system interactivity data and logic flow diagram depicting one or more exemplary embodiments of the functionality performed by the exemplary PSCI platform executing the PSCI software platform to provide one or more insurance quotes in near real time once shipment details are received by PSCI risk modeling engine 402. For example, FIG. 8 depicts the interactivity between the user/customer/consignor's client computers/user devices 102a-102n, the logistics shipping provider computer systems 130a-130n and the exemplary PSCI platform 100 executing the PSCI software platform, regarding this functionality. Also depicted are the data accesses to the PSCI databases 150a-150n, 251.

As depicted in FIG. 8, in step 801, in one or more embodiments and, optionally, in combination with any embodiment disclosed herein, a logistics shipping provider customer/consignor utilizes a user computer device 102 to enter shipping information (as disclosed herein) and/or other information into a logistics shipping provider user interface downloaded on the user computer device 102 via an Internet link provided, for example, via a logistics shipping provider webpage. In one or more embodiments, in step 801, the customer/consignor may also communicate to the logistics shipping provider (e.g., selecting an option, inputting text into a text data field and/or pushing a radio-dial selection provided via a GUI, email, text message, phone, etc.) that the customer would like to request per-shipment cargo insurance for the identified individual cargo shipment for which the customer is entering into the shipping contract with the logistics shipping provider. In one or more embodiments, the customer is automatically provided a quote for insurance coverage for the identified individual cargo shipment. In step 802, in one or more embodiments and, optionally, in combination with any embodiment disclosed herein, the logistics shipping provider customer/consignor, using the customer's user device 102, transmits the shipping information, and/or other information (e.g., payment information (e.g., credit card, banking account information, PayPal®, Cash App, etc.), email address, telephone number, special instructions, etc.) required by the logistics shipping provider to enter into a shipping contract with the customer, to the logistics shipping provider computer system (e.g., one or more servers 130, which may include, e.g., a backend server). In one or more embodiments, the customer may provide the logistics shipping provider with shipping information and/or other information utilizing a phone, email, text message or any other suitable form of communication.

In one or more embodiments, the logistics shipping provider utilizes its policy gateway system to validate the shipping contract and the shipping information included in the shipping contract. For example, in one or more embodiments, the logistics shipping provider may utilize at least a portion of the shipping information to perform a compliance check to determine if one or more details/characteristics included in the shipping information provided by the user falls within a category that prevents the logistics shipping provider from fulfilling the terms of the shipping contract (e.g., the type of cargo included in the individual cargo shipment includes hazardous materials, the type of cargo included in the individual cargo shipment is perishable and the refrigeration requirements cannot be fulfilled by the shipping logistics provider, the requested time for delivery cannot be met, the cargo included in the individual cargo shipment is prohibited by one or more Federal, State, local and/or regional compliance regulations, etc.). For example, in one or more embodiments, if the logistics shipping provider determines that it cannot fulfill the shipping contract for one or more reasons, then the user is sent a decline message and user must input shipping information that complies with the logistics shipping provider policies and/or procedures. In one or more embodiments, at least a portion the shipping information provided by the customer, the reasons for declining the shipment and/or other information provided by the logistics shipping provider computer system is transmitted to the PSCI risk modeling engine 401 and/or one or more of the PSCI database(s) 150, 251 such that the information is accessible by the PSCI risk modeling engine 401 and/or the PSCI learning machine 405 to be utilized in PSCI risk modeling. In one or more embodiments, if the shipping information complies with the logistics shipping provider policies and/or procedures, the customer is sent an approval message and the logistics shipping provider follows its internal procedures to process the shipping information.

In step 803, the PSCI API 401 receives the shipment details for the individual cargo shipment. For example, in one or more embodiments and, optionally, in combination with any embodiment disclosed herein, the logistics shipping provider inputs shipment details, which includes at least a portion of the shipping information and/or other information required to request per-shipment insurance coverage from the PSCI platform executing the PSCI software platform, for an identified individual cargo shipment, into a GUI provided by the integrated PSCI API 401. In one or more embodiments, the shipment details are automatically provided to the PSCI API 401 in response to a customer requesting insurance coverage for the identified individual cargo shipment by the logistics shipping provider computer system (e.g., one or more servers 130). In one or more embodiments, the shipment details are automatically provided to the PSCI API 401 in response to the shipping information complying with the logistics shipping provider internal policies and/or procedures. In one or more embodiments, the shipment details are automatically provided to the PSCI API 401 in response to a customer providing shipping information to the logistics shipping provider to enter into a shipping contract. In one or more embodiments, the shipment details are input into a GUI via a web page provided by a web browser.

For an example of how the PSCI platform automatically generates an insurance quote in real time in response to receiving shipment details, as depicted in FIG. 8, consider the transport of an individual cargo shipment by a logistics shipping provider that includes the perishable cargo apples. For example, in one or more embodiments and, optionally, in combination with any embodiment disclosed herein, the shipment details may include, as discussed with reference to FIG. 6D herein, one or more of the following: 1) Start date [Month][Day][Year]; 2) End date [Month][Day][Year]; 3) Start location [Address where the apples are to be picked up]; 4) End location [Address where the apples are to be delivered]; 5) Commodity type [Edible Fruit and Nuts; Peel of Citrus Fruit or Melons]; 6) Commodity description [Apples]; 7) Insured value [$10,000.00]; 8) Shipment ID [ABC123]; 9) Organization/Company Name [ABC Corp.]; 10) First Name [John]; 11) Last name [Smith]; 12) Email [email.com]; 13) Street Address [ABC Corp. Street]; 14) City [ABC Corp. City]; 15) State [ABC Corp. State]; and 16) Postcode [12345]. For example, in one or more embodiments, only exemplary fields 1) through 8) are required to automatically receive an insurance quote from the PSCI platform 100 for the identified cargo shipment in real time as the logistics shipping provider may, in one or more embodiments, provide the PSCI platform 100 with the policy holder details disclosed with respect to one or more fields 9-16 in one or more steps 817 and/or 818, as disclosed herein.

In step 804, in one or more embodiments and, optionally, in combination with any embodiment disclosed herein, once the shipment details provided to the PSCI API 401 are submitted to the PSCI platform 100, the shipment details are automatically transmitted to the PSCI rules engine 404 to determine if one or more cargo shipment details are not in compliance with one or more Federal, State, local and/or regional (e.g., international, country, county, city, etc.) regulatory and/or compliance rules such that the PSCI platform executing the PSCI software platform 400 may not provide an insurance quote for an insurance policy, offered by an insurer, to cover the identified cargo shipment. In one or more embodiments, the PSCI rules engine 404 automatically transmits at least a portion of the shipment details in an insurance compliance information file to a third party insurance policy compliance and/or sanction platform (e.g., ComplyAdvantage (www.complyadvantage)) to perform an insurance compliance assessment to determine if the specific cargo shipment details comply with one or more Federal, State, local and/or regional (e.g., international, country, county, city, etc.) regulatory and/or compliance rules such that the PSCI platform executing the PSCI software platform 400 may provide an insurance quote for an insurance policy, offered by an insurer, to cover the identified cargo shipment that complies with the aforementioned rules and regulations. In step 805, if the audit, performed by one of the PSCI rules engine 404 and/or the third party compliance platform, indicates that one or more shipment characteristics (e.g., information concerning the cargo, transport route, mode of transport, the courier and/or other relevant information, etc.) concerning the identified individual cargo shipment are not in compliance with the necessary Federal, State, local and/or regional rules and/or regulations, in one or more embodiments, the PSCI rules engine 404 has the results of the audit process transmitted to the PSCI API 401 in a message that includes, for example, an error message, indications and/or text that, for example, indicates one or more areas of noncompliance. In step 805, in one or more embodiments and, optionally, in combination with any embodiment disclosed herein, for example, if the audit, performed by one of the PSCI rules engine 404 and/or the third party compliance platform, indicates that the shipment characteristics are in compliance with the necessary Federal, State, local and/or regional rules and/or regulations, then a message indicating compliance transmitted to the MCI API 401.

In this example, in one or more embodiments, the PSCI rules engine 404 determines if the individual cargo shipment containing apples complies with the relevant Federal, State, local and/or regional rules and/or regulations. For example, in one or more embodiments, the PSCI rules engine 404 automatically has at least a portion of the shipment details (e.g., the shipment details provided in fields 1) through 1) through 8), and one or more policy holder identification details 9) or 10)), and other relevant information required to perform a compliance audit (if required), transmitted in an insurance compliance information file to a third party insurance policy compliance and/or sanction platform (e.g., ComplyAdvantage (www.complyadvantage)) to perform an insurance compliance assessment to determine if the specific cargo shipment details are not in compliance with one or more Federal, State, local and/or regional (e.g., international, country, county, city, etc.) regulatory and/or compliance rules. In one or more other embodiments, at least a portion of the shipment details, and other relevant information required to perform the compliance assessment that is stored in one or more PSCI databases 150a-150n, 251 (if required), is received by the PSCI rules engine 404. For example, in one or more embodiments, the PSCI rules engine 404, utilizing one or more processes to compare the acquired data to the relevant rules and regulations, automatically determines if one or more cargo shipment details are not in compliance with one or more Federal, State, local and/or regional (e.g., international, country, county, city, etc.) regulatory and/or compliance rules. For example, in one or more embodiments, the Federal, State, local and/or regional insurance compliance assessment rules that are assessed may depend upon one or more of the country/state in which the transport route resides or touches upon, the resident state of the one or more qualifying insurance providers, the origination/destination addresses of the starting and ending locations of the cargo shipment, the resident state of the owner/consignor and/or the logistics shipping provider, and/or one or more other characteristics associated with the cargo, owner/consignor, insurance provider, transport route, transport mode (road, air, water, rail, etc.) and/or logistics shipping provider. In one or more embodiments, if the audit, performed by one of the PSCI rules engine 404 and/or the third party compliance platform, indicates that the shipment characteristics of the cargo shipment (i.e., apples) are in compliance with the necessary Federal, State, local and/or regional rules and/or regulations, a message indicating compliance is automatically transmitted to the PSCI API 401. In one or more embodiments, if the audit, performed by one of the PSCI rules engine 404 and/or the third party compliance platform, indicates that the shipment characteristics of the cargo shipment (i.e., apples) are not in compliance with the necessary Federal, State, local and/or regional rules and/or regulations, a message (e.g., an indication, alert, message, user error, etc.) indicating noncompliance is automatically transmitted to the PSCI API 401 to be provided to one or more of the logistics shipping provider computer system and/or the customer/consignor user device, and one or more insurance quotes for the cargo shipment is not provided.

In step 806, in one or more embodiments and, optionally, in combination with any embodiment disclosed herein, the shipment details are received by the PSCI risk modeling engine 402. In this example, the shipment details provided in exemplary fields 1) through 9) and 12) are received by the PSCI risk modeling engine 402. In other examples, ail or a subset of the shipment details provided, via the PSCI API 401, may be received by the PSCI risk modeling engine 402. In this example, in one or more other embodiments, the PSCI risk modeling engine may compare the 'commodity type' and 'commodity description' information provided in the received shipping details to the PSCI insurance bracket identifier 'commodity type' to determine if the type of cargo included in the cargo shipment is one for which insurance may be provided, and what type of cargo (e.g., see FIGS. 5A-5G) is included in the identified individual cargo shipment. In this example, in one or more other embodiments, the PSCI risk modeling engine may also utilize the 'Shipment ID' information provided in the received shipping details to generate an identification for the cargo shipment (i.e., identified cargo shipment). In this example, the 'Commodity type' is "Edible Fruit and Nuts; Peel of Citrus Fruit or Melons], as provided in FIGS. 5A-5G, and the 'Commodity description' is apples. In this example, in one or more other embodiments, the PSCI risk modeling engine 402 utilizes one or more of the data included in the shipment detail fields, including one or more of the 'commodity type', 'commodity description', 'Insured value', 'Start date', 'End date', and compares the same to one or more PSCI insurance bracket pre-underwriting values provided by one or more identified insurance providers. In this example, in one or more other embodiments, if the 'Start date' and 'End date' do not provide for time duration that is in within the value provided for the PSCI insurance bracket identifier 'max duration', the PSCI risk modeling engine may either remove the one or more affected insurance providers from consideration, or provide the consignor/customer/logistics shipping provider with one or more alternative dates for shipping. In this example, in one or more other embodiments, the PSCI risk modeling engine 402 compares the relevant information provided in the shipment details with one or more of the PSCI insurance bracket values for the 'commodity type', 'max value', 'min value', 'max duration', 'international', and any other relevant PSCI insurance bracket values to determine the list of qualifying insurance providers for which insurance quotes may be provided. In this example, in one or more embodiments, the PSCI risk modeling engine has identified a number Q qualifying insurance providers.

In step 807, in one or more embodiments and, optionally, in combination with any embodiment disclosed herein, in response to the PSCI risk modeling engine 402 receiving shipment details, at least a portion of one or more of real time shipment data (discussed with reference to step 416 and FIG. 4C), historical shipment data (discussed with reference to step 418 and FIG. 4C), and/or other data (e.g., contextual data, sensor data, telematics data, etc.) that is relevant to the new identified individual cargo shipment is requested by the PSCI risk modeling engine for the identified cargo shipment.

For example, in one or more embodiments, the PSCI risk modeling engine 402 automatically requests data points and/or data from which data points relevant to the identified individual cargo shipment that will assist the PSCI risk modeling engine 402 in determining one or more risk probability values and/or commodity price modifiers, utilized to model the risk and provide an insurance quote for providing insurance coverage for the identified individual cargo shipment may be determined. For example, in one or more embodiments, the requested data points and/or the requested data may be received from one or more PSCI databases 150a-150n, 251 and/or one or more third party databases 170a-170n utilizing data crawlers as disclosed herein.

For example, in one or more embodiments, data points and/or requested data relevant to the individual cargo shipment for which data points may be determined, including one or more of the type of cargo, the weather, the one or more carriers, contextual aspects, historical shipment data and/or real time shipment data, may be utilized by the PSCI risk modeling engine 402 to generate a risk model to provide an insurance quote for providing insurance coverage for the identified individual cargo shipment. For example, in one or more embodiments, data points and/or requested information concerning the cargo shipment (e.g., estimated value of the cargo, type of cargo commodity type of cargo), information concerning any damage to the cargo, the perishable nature of the cargo, depreciation/appreciation with respect to the estimated value of the cargo and/or cargo attributes (weight, height, width, container/packaging/restraint/transport requirements, etc.) are utilized by the PSCI risk modeling engine 402 to model the risk associated with the individual cargo shipment to generate a risk model to provide an insurance quote. For example, in one or more embodiments, data points and/or requested information concerning the transportation route (e.g., the route utilized to transport the cargo included in the individual cargo shipment and the identification of each transport leg included in the route, the time required to ship cargo from origination point to destination point for each transport leg, method/mode of transportation (e.g., roadway, waterway, airway railway, etc.) for each transport leg, type of cargo container utilized for each transport leg, restraints utilized for each transport leg, and/or any other relevant information disclosed herein or otherwise concerning the route and each transport leg included in the route) may be utilized by the PSCI risk modeling engine 402 to model the risk associated with the individual cargo shipment to generate a risk model to provide an insurance quote. For example, in one or more embodiments, data points and/or requested information concerning the contextual aspects of the cargo shipment (e.g., global conflict data (e.g., intelligence, information, trends, etc.), traffic data (e.g., intelligence, information, trends, etc.), weather data (e.g., intelligence, information, trends, etc.), and/or any other relevant inform ad on disclosed herein or otherwise concerning the cargo shipment) may be utilized by the risk modeling engine 402 to model the risk associated with the individual cargo shipment to generate a risk model to provide an insurance quote. For example, in one or more embodiments, data points and/or requested information concerning real time shipment data that is relevant to the individual cargo shipment (e.g., sensor data, global conflict data (e.g., intelligence, information, trends, etc.), traffic data (e.g., intelligence, information, trends, etc.), weather data (e.g., intelligence, information, trends, etc.), and/or any other relevant information disclosed herein or otherwise concerning the cargo shipment) may be utilized by the ASCI risk modeling engine 402 to model the risk associated with the individual cargo shipment to generate a risk model to provide an insurance quote. For example, in one or more embodiments, data points and/or requested information concerning historical shipment data that is relevant to the individual cargo shipment may be utilized by the PSCI risk modeling engine 402 to model the risk associated with the individual cargo shipment to generate a risk model to provide an insurance quote.

In this example, in one or more embodiments, data for the identified cargo shipment may include real time shipment data that includes sensor data generated by one or more sensors for measuring the temperature and humidity of the apples in real time. In this example, historical data that includes traffic congestion patterns for the dates of the identified cargo shipment, for a 5 year period directly preceding the provided 'Start date' and 'End date', is requested. For example, in one or more embodiments, any other relevant real time shipment data, historical shipment data and/or other data may be requested by the PSCI risk modeling engine 401.

In step 808, in one or more embodiments and, optionally, in combination with any embodiment disclosed herein, in response to the PSCI risk modeling engine 402 requesting data points and/or requested data relevant to the identified cargo shipment for which data points may be determined, one or more PSCI data crawlers, as disclosed herein, may be utilized to compile relevant data points and/or other relevant information including, but not limited to, contextual information, real time shipment data and/or historical shipment data and/or other information including but not limited to weather forecasts, Department of State warnings, accidents, past claims, and any other information relevant to the identified individual shipment cargo. In this example, the data crawlers may be utilized to gather the traffic congestion pattern data for the past years for roads that are included in the route.

In step 809, in one or more embodiments and, optionally, in combination with any embodiment disclosed herein, the PSCI risk modeling engine 402 receives the requested data and data points, and determines other required data points from the requested information. In this example, the PSCI risk modeling engine 402 receives the requested sensor data with respect to the temperature and humidity of the apples that are included in the identified cargo shipment, and the traffic congestion pattern data for the past 5 years for roads that are included in the transport route.

In step 810, in one or more embodiments and, optionally, in combination with any embodiment disclosed herein, the PSCI risk modeling engine 402 utilizes one or more of the received data points to generate a dynamic pricing model and calculate the risk associated with shipping the cargo included in the identified individual cargo shipment by the logistics shipping provider, determine one or more of the risk probability values and/or commodity price modifiers associated with the risk model, and generate an insurance quote that will be provided to the customer/consignor to provide insurance coverage for the identified cargo shipment.

In step 810, for example, in one or more embodiments, the PSCI risk modeling engine 402 determines the risk probability values and the commodity price modifiers for each of the identified qualifying insurance companies to generate an insurance policy premium for each of the identified qualifying; insurance providers. In one or more embodiments, for example, the risk probability values and the commodity price modifiers for each of the identified qualifying insurance company is provided as a pre-underwriting PSCI insurance bracket value that is determined by the commodity type of cargo included in the cargo shipment. In step 810, in one or more embodiments and, optionally, in combination with any embodiment disclosed herein, once the risk probability values and/or the commodity price modifiers provided by the PSCI platform, have been determined by the PSCI risk modeling engine 402 for an identified cargo shipment, the one or more of the risk probability values and/or the commodity price modifiers may be utilized to determine an insurance policy premium that will be paid by the customer/consignor to receive insurance coverage, from the relevant identified qualifying insurance provider, for the identified individual cargo shipment. For example, in one or more embodiments, the PSCI risk modeling engine 402 utilizes the estimated value of the cargo included in the individual cargo shipment, and compares the type of cargo to be shipped with a list of commodity types the identified qualifying insurance providers are willing to insure, and the desired profit modifiers (e.g. commodity price modifiers) for the different commodity types to determine the initial insurance policy premium required by each identified qualifying insurance provider to provide coverage for the cargo shipment.

In this example, in one or more embodiments, if the default pricing model for qualifying insurance Provider A for the identified individual cargo shipment provides that apples included in an individual cargo shipment with an estimated value of $10,000 or less will be calculated utilizing a risk probability value of 0.0025, then the PSCI risk modeling engine 402 would calculate the insurance policy premium for the identified cargo shipment with an estimated value of $10,000 to be [0.0025]*[$10,000]=$25, if insurance Company A is selected as the insurer. In this example, in one or more embodiments, if the PSCI risk modeling engine 402 determines that the pre-underwriting policies provided by qualifying insurance Provider A provide that the Commodity type [Edible Fruit and Nuts; Peel of Citrus Fruit or Melons] of the cargo (e.g., apples) included in the identified cargo shipment was such that a price commodity price modifier of 1.5 should be applied to the premium, then the premium, calculated by the PSCI risk modeling engine 402 with respect to insurance Provider A, that the customer/consignor would have to pay to acquire insurance coverage for the apples (i.e., if qualifying insurance Provider Company A is selected as the insurer by the consignor using the exemplary PSCI platform 100 executing the exemplary PSCI software platform 400) would be as follows: 1.50*[0.0025]*[$10,000]=$37.5.

In one or more embodiments, in step 810, the PSCI risk modeling engine 402 also calculates the technology solution value and the distribution fee value. In this example, in one or more embodiments, if the PSCI platform includes a policy that, for an individual cargo shipment with an estimated value of $10,000 or less will be calculated utilizing a risk probability value of then the PSCI risk modeling engine 402 would calculate the base technology solution value for a cargo included in an individual cargo shipment with an estimated value of $10,000 to be [0.0025]*[$10,000]=$25. In this example, in one or more embodiments, if the PSCI platform has a policy that a price commodity price modifier of 1.5 will be applied to the technology solution value due to the identified commodity type of cargo included in the identified cargo shipment, then the technology solution value calculated by the NCI risk modeling engine 402, with respect to the cargo shipment that includes that identified commodity type of cargo, will be as follows: 1.50 [0.0025]*[$10,000]=$37.5.

In one or more embodiments, in step 810, the PSCI risk modeling engine 402 &so calculates the distribution fee value for selected insurance premiums. In this example, the PSCI platform may include a policy that, for an individual cargo shipment with an estimated value of $10,000 or less, the distribution fee value will be calculated as a predetermined percentage (i.e., 10%) of the sum of the insurance policy premium and the technology solution. In this example, if the insurance policy premium was determined to be $37.50, and the technology solution was determined to be $37.50, then, for the example of the cargo shipment having an estimated value of $10,000 with a risk probability value of 0.0025 and a price commodity price modifier of 1.5 applied to the same, the distribution fee value would be calculated by the PSCI risk modeling engine 402 as follows: 0.10*($37.50+$37.50)=$7.50.

In one or more embodiments, insurance policy premiums and technology fees are automatically generated with respect to each insurance providers (i.e., qualified insurance provider) that satisfies the pre-underwriting requirements applied by the PSCI risk modeling, engine 402 for an identified individual cargo shipment. In this example, in one or more embodiments, for each qualifying insurance provider, the PSCI risk modeling engine 402 generates an insurance quote. For example, in the example of the cargo included in the individual cargo shipment having an estimated value of $10,000 with a risk probability value of 0.0025 and a price commodity price modifier of 1.5 applied to the same, for each qualifying insurance provider for which a risk probability value of 0.0025 would be applied, the insurance quote would be calculated by the PSCI risk modeling engine 402 to be the sum of the insurance policy premium, the technology solution, the distribution fee and all applicable taxes (i.e., $37.50+$37.50+$7.50=$82.50+all applicable insurance quote taxes). In one or more embodiments, the PSCI risk modeling engine 402 would also calculate all applicable taxes for the insurance quote (i.e., all applicable insurance premium taxes (IPT) and/or all applicable value added taxes, referred to herein as "insurance quote taxes"). In this example, the insurance quote for each qualifying insurance provider calculated by the PSCI risk modeling engine 402 would be the sum of the insurance policy premium, the technology solution, the distribution fee and insurance quote taxes (i.e., $37.50+$37.50+$7.50+insurance quote taxes=$82.50+insurance quote taxes).

In step 810, in one or more embodiments, in response to the PSCI risk modeling engine 402 receiving the requested data in step 809, the requested data is automatically provided to the PSCI machine learning engine 405 to generate a model cargo shipment. For example, in one or more embodiments, the model cargo shipment will include one or more similar characteristics (e.g., one or more of the same commodity types of cargo, same mode of transport, same container utilized to transport the cargo, etc.) to the identified cargo shipment and include one or more data points included in the received data. In this example, in one or more embodiments, the PSCI machine learning engine 405 will receive data points included in the requested sensor data, with respect to the temperature and humidity of the apples that are included in the identified cargo shipment, and the traffic congestion pattern data for the past 5 years for roads that are included in the transport route. In other examples, the PSCI machine learning engine 405 may receive traffic congestion pattern for more than the past 5 years for roads that are included in the transport route. In this example, in one or more embodiments, the PSCI machine learning engine 405 generated model cargo shipment may include one or more of the values provided in the shipment detail data fields 1)-16), data points that indicate the current temperature and humidity of the cargo space in which the apples are being stored, and data points that indicate the historical level(s) of congestion on the roadways for one or more of the transport legs included in the transport route.

In this example, the generated cargo shipping model is fed to the input layers of the neural network 407 such that a model risk probability value, for a cargo shipment that may be impacted by 1) the temperature and humidity levels measured utilizing the real time shipment data, and/or 2) levels of congestion on one or more of the roadways included in the transport route, is output by the neural network 407, utilizing one or more techniques disclosed herein. In this example, the PSCI risk modeling engine 402 may dynamically modify the dynamic pricing model, that generated the initial insurance premium for one or more qualifying insurance providers (e.g., qualifying insurance Provider A), by modifying the risk probability value utilized in the initially generated dynamic pricing model based upon the output model risk probability value output by the neural network 407. In this example, in one or more embodiments, the risk probability value initially determined by the PSCI risk modeling engine 402 for the dynamic pricing model associated with the identified cargo shipment may be modified by incorporating one or more of the model probability risk values, output by the neural network 407, into the dynamic pricing model to modify the calculated premium value. In this example, if the model probability risk value (e.g., 0.0022), when compared to the generated risk probability value (0.0025), is lower than the generated risk probability value, then the generated risk probability value included in the dynamic pricing model may be dynamically modified based upon the model risk probability value, utilizing techniques disclosed herein.

In this example, in one or more embodiments, the PSCI risk modeling engine 402 substitutes the generated risk probability value for the model risk probability value. In this example, the dynamically modified premium, calculated by the PSCI risk modeling engine 402 with respect to insurance Provider A, that the customer/consignor would have to pay to acquire insurance coverage for the apples (i.e., if qualifying insurance Provider Company A is selected as the insurer by the consignor using the exemplary PSCI platform 100 executing the exemplary PSCI software platform 400) would be as follows: 1.50*[0.0022]*[$10,000] $33.00. In this example, the dynamically modified insurance quote for qualifying insurance Provider A, calculated by the PSCI risk modeling engine 402, would be the sum of the modified insurance policy premium, the technology solution, the distribution fee and insurance quote taxes (i.e., $33.00+ $37.50+$7.50+insurance quote taxes=$78.00+insurance quote taxes). For example, the PSCI risk modeling engine 402 would generate insurance quotes, using the same techniques described herein, for one or more of the identified qualifying insurance providers (e.g., qualifying insurance Providers 1-Providers n, in which, in this example, insurance Provider A is included). In this example, insurance quotes 1-n are generated by the PSCI risk modeling engine 402 for the identified cargo shipment. In one or more other embodiments, each of the insurance quotes (e.g., insurance quotes 1-n) to provide insurance coverage for the identified cargo shipment are generated in real time utilizing one or more techniques described herein. In one or more other embodiments, each of the insurance quotes (e.g., insurance quotes 1-n) to provide insurance coverage for the identified cargo shipment is generated in near real time utilizing one or more techniques described herein.

In step 811, in one or more embodiments and, optionally, in combination with any embodiment disclosed herein, in response to the PSCI risk modeling engine 402 generating insurance quotes utilizing the dynamic pricing model, one or more insurance offers are automatically transmitted to the PSCI API 401 for access by the logistics shipping provider computer system. For example, in one or more embodiments, each of the insurance offers may include one or more a the identity of the insurance provider offering insurance for the individual cargo shipment, an insurance quote required to provide that insurance, and any other applicable information required for the user to make an informed decision (e.g., one or more of the data described with reference to FIGS. 6D, and 7A-7F, including but not limited to the following: journeyLegs, startTime, endTime, startLocation, endLocation, transportTypes, transportFeatures, commodityType, commodityDescription, insuredValue, shipmentId, policyholder, forename, surname, email, telephone, address, street, locality, region, postcode, country, travelType, premium, offerID, etc.). For example, in one or more embodiments, the lowest insurance policy premium generated for the identified individual cargo shipment is utilized to generate the insurance quote that will be provided to the API 401. In one or more embodiments, a predetermined number of insurance policy premiums generated for the identified individual cargo shipment is utilized to generate the insurance quotes that will be provided to the PSCI API 401. For example, in one or more embodiments, the number of insurance quotes transmitted to the PSCI API 401 depends upon a predetermined threshold (i.e., ten or less insurance quotes that are associated with the lowest premiums, are provided to the PSCI API 401). In this example, insurance offers (1-n) that includes the insurance quotes for each qualifying insurance provider (insurance quotes 1-n), including the insurance quote for insurance Provider A, are transmitted to the PSCI API 401. In one or more other embodiments, each of the insurance offers (e.g., insurance offers 1-n) to provide insurance coverage for the identified cargo shipment are generated in real time utilizing one or more techniques described herein. In one or more other embodiments, each of the insurance offers (e.g., insurance offers 1-n) to provide insurance coverage for the identified cargo shipment is generated in near real time utilizing one or more techniques described herein.

In step 812, in one or more embodiments and, optionally, in combination with any embodiment disclosed herein, in response to the PSCI API 401 receiving one or more insurance offers (e.g., insurance offers 1-n), the one or more insurance offers are automatically provided to the logistics shipping provider computer system component (e.g., one or more backend servers included in the server(s) 130) that is responsible for communicating the insurance offers to the customer/consignor. In step 813, in one or more embodiments and, optionally, in combination with any embodiment disclosed herein, in response to the logistics shipping provider computer system receiving the one or more insurance offers (e.g., insurance offers 1-n), the logistics shipping provider computer system automatically adds the shipment costs (which includes any applicable taxes, e.g., possible value added tax(es)), and transmits the shipment costs and the one or more insurance offers (e.g., insurance offers 1-n) to the logistics shipping provider user interface utilized on the user device 102 such that the shipment costs, the costs of each of the one or more insurance offers (e.g., insurance offers 1-n) and all applicable taxes are displayed on the customer's user device 102 and, thus, received by the customer in step 814. In one or more other embodiments, the PSCI user experience engine 403 may have the insurance offers 1-n transmitted directly to the customer/consignor (e.g., via email, text message or other electronic means).

In step 815, in one or more embodiments and, optionally, in combination with any embodiment disclosed herein, in response to the receiving the shipment costs for the identified cargo shipment, the insurance offers (e.g., insurance offers 1-n) and any additional costs (if any) associated with each of the one or more insurance offers, the user has the option to confirm/decline the shipment offer at the costs provided, confirm which insurance offer, from the one or more provided insurance offers (e.g., insurance offers 1-n), the user is selecting to provide insurance coverage for the identified cargo shipment, or decline insurance coverage all together for the identified cargo shipment. In one or more embodiments, if the user declines the shipment offer for the identified cargo shipment, then the insurance offer is automatically declined.

In step 816, in one or more embodiments and, optionally, in combination with any embodiment disclosed herein, in response to the user accepting/declining the shipment offer and accepting/declining one of the one or more insurance offer(s), the confirmation of the same is transmitted by the user device 102 to the logistics shipping provider computer system (e.g., one or servers 130, which may be one or more backend server systems) to be processed. For example, in one or more embodiments, in response to the user declining, the shipment offer, in step 816, a notification (e.g., email, text message, indication, alert, error message, or any other suitable notification) is transmitted to the user by the logistics shipping provider computer system that indicates the shipment offer was declined and no further action is required. For example, in one or more embodiments, if the shipment offer is accepted and each of the one or more insurance offers are declined, the confirmation is automatically transmitted to the logistics shipping provider computer system and a notification is transmitted to the user by the logistics shipping provider computer system that indicates the shipment offer was accepted. For example, in one or more embodiments, if the shipment offer is accepted from one of the one or more insurance offers provided (e.g., insurance offer x, associated with insurance Provider A for the insurance quote totaling $78.00+insurance quote taxes, included within provided insurance offers 1-n), the confirmation is automatically transmitted to the logistics shipping provider computer system.

In step 817, in one or more embodiments and, optionally, in combination with any embodiment disclosed herein, in response to the logistics shipping provider computer system receiving the confirmation that the user has accepted one of the one or more provided insurance offers, an indication (insurance offer indication) of the selected insurance offer (e.g., insurance offer x was selected for the identified cargo shipment) is automatically provided to the PSCI API 401. In step 818, in one or more embodiments and, optionally, in combination with any embodiment disclosed herein, in response to the PSCI API 401 receiving the insurance offer indication, the insurance offer indication is transmitted to the exemplary inventive PSCI platform 100. For example, in one or more embodiments, in response to receiving the insurance offer indication, the PSCI platform will automatically generate an insurance policy for the identified cargo shipment. For example, in one or more embodiments, PSCI user experience engine 403 automatically accesses one or more PSCI databases 150a-150n, 251 in step 819 and utilizes information associated with the qualifying insurance provider to generate an insurance policy for the identified cargo shipment. In this example, the generated insurance policy would be for the identified cargo shipment that includes the apples, wherein insurance Provider A would be the insurer for insurance offer x (as described above). For example, in one or more embodiments, the generated insurance policy may include one or more of the data described with reference to FIGS. 7A-7F and 6D, including but not limited to the following fields: journeyLegs, startTime, endTime, startLocation, endLocation, transportTypes, transportFeatures, commodityType, commodityDescription, insuredValue, shipmentId, policyholder, forename, surname, email, telephone, address, street, locality, region, postcode, country, purchaseTime, travelType, premium, offerID, policyNumber, and other data known by those having skill in the art with the benefit of the specification, that would be included in an insurance contract of this type.

In step 820, in one or more embodiments and, optionally, in combination with any embodiment disclosed herein, in response to generating the insurance policy, the PSCI platform executing the exemplary inventive PSCI software platform 400 automatically generates an email that includes one or more of the generated policy (e.g., as an attachment, included in the body of the email, etc.), links that support filing claims on the insurance policy, introductory language, and any other information relevant to the insured and the insurer (e.g., insurance Provider A), and emails the insurance policy to the customer.

For example, in step 820, in one or more other embodiments and, optionally, in combination with any embodiment disclosed herein, the generated insurance policy is automatically transmitted to the PSCI API 401. For example, in one or more embodiments, in response to receiving the generated insurance policy, the PSCI API 401 automatically transmits the generated insurance policy to the logistics shipping provider computer system. In step 821, in one or more embodiments and, optionally, in combination with any embodiment disclosed herein, in response to receiving the generated insurance policy, the logistics shipping provider computer system automatically transmits the generated insurance policy to the logistics shipping provider user interface residing on the user device to be received by the user in step 822. In step 823, in one or more embodiments and, optionally, in combination with any embodiment disclosed herein, in response to receiving the generated insurance policy, the PSCI user experience engine 403, via the PSCI API 401, automatically transmits an indication to the user (e.g., email, text message, alert, or any other suitable notification) that includes, for example, the details of the generated insurance policy and/or any other suitable information (e.g., acknowledgement of the insurance policy, thank you, etc.). In one or more embodiments, for example, the PSCI user experience engine 403 is configured to issue one or more emails, for example, to welcome the customer, provide information on how to file a claim, and/or where to access the complete policy. In one or more embodiments, for example, the PSCI user experience engine 403 is configured to provide a daily file that is accessible by authorized users that includes all policies issued by an authorized insurer. In one or more embodiments, for example, the logistics shipping provider collects the payment for the insurance policy, and the PSCI user experience engine 403 generates an invoice which is transmitted periodically (e.g., weekly, monthly, bi-monthly, etc.) to the relevant logistics shipping provider for payment.

For example, in one or more embodiments, the logistics shipping provider will collect the total amount (costs for the insurance policy and the shipment costs, plus any relevant fees and taxes) from the customer. In one or more embodiments, the PSCI user experience engine 403 will generate a scheduled report to the logistics shipping provider and the insurance company that includes information concerning the each of the insurance policies provided for the respective cargo shipments. For example, in one or more embodiments, once the apples are delivered, the relevant logistics shipping provider may send a shipment complete notification, via the PSCI API 401. In one or more embodiments, PSCI user experience engine 403 will generate invoices directed to the relevant logistics shipping providers on a set interval such that the logistics shipping providers may pay the technological fee(s), as disclosed herein. The insurance company invoices the freight forwarder on a set interval for the premium.

In one or more embodiments and, optionally, in combination with any embodiment disclosed herein, in response to a customer/consignor requesting per-shipment cargo insurance, the PSCI user experience engine 403 will automatically have, in accordance with the Insurance Distribution Directive (IDD) that regulates insurance products offered in the European Union (EU), an Insurance Product Information Document (IPID) transmitted to the user that summarizes the main features of the per-shipment cargo insurance contract that will be provided by one of the insurance providers authorized to utilized the exemplary inventive PSCI platform to provide cargo insurance for the identified individual cargo shipment. For example, in one or more embodiments, with reference to FIG. 8, the IPID is offered to the customer/consignor in step 811 by the PSCI user experience engine 403. For example, in one or more embodiments, with reference to FIG. 8, the IPID is offered to the customer/consignor by the PSCI user experience engine 403 any time before the customer/consignor signs the insurance contract. For example, in one or more embodiments, the IPID is designed to give customers basic information about the type of per-shipment cargo insurance contract that will be provided by one of the insurance providers, the obligations of the parties to the per-shipment cargo insurance contract, claims handling under the provided per-shipment cargo insurance contract including but not limited to the procedures and processes for handling the filing of a claim, and a summary of the provided per-shipment cargo insurance contract including but not limited to what the per-shipment cargo insurance contract covers. For example, the purpose of the IPID is to ensure that the customer/consignor will be able to familiarize themselves with the insurance product they are buying and will be able to compare the insurance product with others before purchasing the PSCI offered per-shipment cargo insurance contract. In one or more embodiments, for example, the IPID will be transmitted, via the PSCI API 401, by the logistics shipping provider computer system (e.g., one or more server devices 130) to the customer/consignor before the customer/consignor signs the per-shipment cargo insurance contract.

For example, in one or more embodiments and, optionally, in combination with any embodiment disclosed herein, the IPID, provided by the PSCI user experience engine 403 via the PSCI API 401, includes one or more of the following concerning the per-shipment cargo insurance contract offered by the PSCI insurance provider to the customer/consignor before the customer/consignor signs the insurance contract: information about the type of per-shipment cargo insurance contract offered by the PSCI insurance provider; a summary of the coverage offered by the per-shipment cargo insurance contract, including the main risks insured by the per-shipment cargo insurance contract; the insured sum of the per-shipment cargo insurance contract and, where applicable, the geographical scope and a summary of the excluded risks concerning the per-shipment cargo insurance contract; the means by which the customer/consignor provide payment of the premium(s) and the duration of payments under the per-shipment cargo insurance contract; the main exclusions under the per-shipment cargo insurance contract, including where claims cannot be made; obligations at the start of the per-shipment cargo insurance contract; obligations during the term of the per-shipment cargo insurance contract; obligations in the event that a claim is made pursuant to the per-shipment cargo insurance contract; the term of the per-shipment cargo insurance contract including the start and end dates of the per-shipment cargo insurance contract; the means of terminating the per-shipment cargo insurance contract; the identity of the insurance provider, the distributor (e.g., including intermediaries); information concerning potential conflicts of interest(s), the source and nature of any renumeration to be received by the one or more insurance providers/distributors; and/or the amount of any fees requested and received by the one or more insurance providers/distributors.

For example, in one or more embodiments and, optionally, in combination with any embodiment disclosed herein, the IPID, concerning the per-shipment cargo insurance contract offered by the PSCI insurance provider to the customer/consignor, by the PSCI user experience engine 403, via the PSCI API 401, is provided in color, is written in the official language(s), or in one of the official languages, used in the part of the Member State (i.e., one of the member states included in the European Union) where the insurance product is offered or, if agreed by the customer/consignor, the logistics shipping provider, the PSCI insurance policy provider, or any combination of the aforementioned, in another language, is accurate and not misleading, contains the title "insurance product information document" at the top of the first page of the IPID, and/or includes a statement that the complete pre-contractual and contractual information on the product is provided in other documents (e.g., the insurance contract or other accompanying documents provided by the PSCI insurance provider and transmitted, for example, in step 821 to the customer/consignor).

Figure 9:
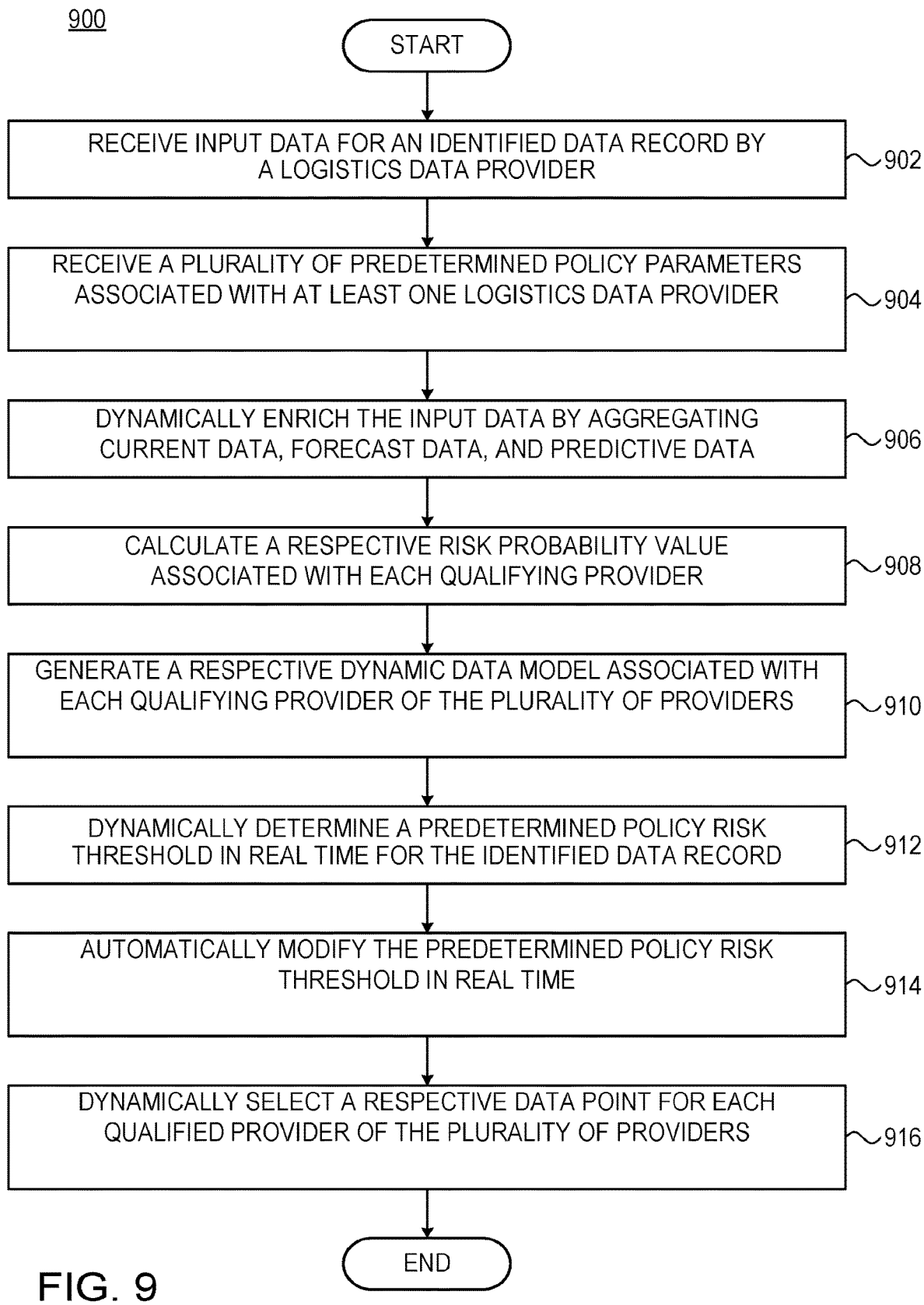
FIG. 9 is a flowchart illustrating operational steps for automatically modifying a predetermined policy risk threshold in real time based on a respective model risk probability value, in accordance with one or more embodiments of the present disclosure.

FIG. 9 is a flowchart 900 illustrating operational steps for automatically modifying a predetermined policy risk threshold in real time based on a respective model risk probability value, in accordance with one or more embodiments of the present disclosure.

In step 902, the processor 205 may be programmed to receive input data for an identified data record by a logistics data provider. In some embodiments, the input data may refer to shipment details. In some embodiments, the input interface associated with the processor 205 may refer to a user interface or an API. Examples of the user interface are mobile devices, web devices, etc. In some embodiments, the input data may refer to shipment details for an identified cargo shipment that includes goods to be shipped by a logistics shipping provider.

In step 904, the processor 205 may be programmed to receive a plurality of predetermined policy parameters associated with at least one provider of the plurality of providers. In some embodiments, the plurality of predetermined policy parameters may include one or more of commodity type, max value, min value, max duration, transport mode, international, asset type, tracking, min volume, min premium, max daily exposure, or risk percentage. In some embodiments, the at least one provider may refer to an insurance policy provider. In some embodiments, the predetermined of predetermined policy parameters associated with at least one provider may be associated with identifying at least one qualifying provider of the plurality of providers based on a comparison of the input data and the plurality of predetermined policy parameters associated with the identified data records. In some embodiments, and in response to receiving the plurality of predetermined of predetermined policy parameters associated with at least one logistics data provider of the plurality of logistics data providers, the processor 205 may be programmed to validate the plurality of predetermined policy parameters associated with the at least one provider of the plurality of providers based on a plurality of services performed using the computer system. In some embodiments, the plurality of services may refer to identifying a location of at least one sender, identifying a location of at least on recipient, determining a validity of solvency associated with the at least one sender, and determining a validity of solvency associated with the at least one recipient. In some embodiments, the computer system may refer to a PSCI platform that includes the at least one input interface and at least one processor.

In step 906, the processor 205 may be programmed to dynamically enrich the input data by aggregating current data, forecast data, and predictive data associated with the identified data record. In some embodiments, the processor 205 may dynamically enrich the input data by using internal historical data via machine learning and statistical analysis to enhance the original shipping data. In some embodiments, external API's may be utilized to further enhance the original shipping data. For example, journey legs, which include used operators, routes, roads, vessels, vehicles, aircrafts, warehouses, and ports; forecasted weather, geological events, current port congestion, strikes, protests, wars, and other activity on location may be used to enrich the input data. In some embodiments, a PSCI machine learning model may be programmed to input data points included in one or more of the simulated multiple different model cargo shipments into the processing layers to output the model risk probability values utilized to optimize the respective dynamic pricing models generated by the risk modeling engine. In some embodiments, the enriched input data may refer to determining a commodity type based upon the shipment details that is indicative of the type of goods included in the identified cargo shipment;

In step 908, the processor 205 may be programmed to calculate a respective risk probability value associated with each qualifying provider of the plurality of providers based the comparison of the enriched input data and the plurality of predetermined policy parameters. In some embodiments, the calculated respective risk probability value may refer to an output of a risk engine. In some embodiments, the risk engine may use a plurality of machine learning, statistical models, and external APIs to determine multitude of risk factors based on the enriched input data. Examples of these risk factors include theft, damage, lost, exposure to multitude of weather conditions, and late arrival. In some embodiments, the risk engine may refer to the PSCI risk modeling engine 402, the PSCI user experience engine 403, the PSCI rules engine 404, the PSCI machine learning engine 405, and/or the PSCI probability scoring engine 406, and perform the functions of each of the plurality of engines. In some embodiments, the risk engine may determine total risk for a particular shipment based on an aggregation of individual risks. In some embodiments, a trained PSCI machine learning model may be utilized to calculate the respective risk probability value by using data points, that include estimated probability risk values and actual probability risk values included in one or more of the simulated model cargo shipments generated by the machine learning module, input into the processing layers of the neural network to determine optimum respective model risk probability values via a plurality of training cycles based on a comparison between the actual probability risk values and estimated probability risk values, wherein weights are utilized in the processing layers to minimize the errors between the estimated and the actual probability risk value results.

In step 910, the processor 205 may be programmed to generate a respective dynamic data model associated with each qualifying provider of the plurality of providers based on the enriched input data and the respective determined risk probability value. In some embodiments, the PSCI machine learning model may include input layers; processing layers; output layers; a supervised learning layer, where the supervised learning layer comprises a classification layer and a regression layer, and an unsupervised learning layer, where the unsupervised learning layer comprises a clustering layer. In some embodiments, the processor 205 may be programmed to generate a respective dynamic pricing model based on the shipment details and the respective determined risk probability value for each of the one or more qualifying insurance providers for the identified cargo shipment using the respective dynamic pricing model and the respective determined risk probability value, for each of the one or more qualifying insurance providers. In some embodiments, the processor 205 may be programmed to utilize a risk probability scoring engine to determine a reference risk probability value based on the enriched input data included in shipment details for an identified cargo shipment. In some embodiments, the reference risk probability value may refer to a respective model risk probability value based on one or more of the real time shipment data or the historical shipment data for each of the one or more qualifying insurance providers.

In step 912, the processor 205 may be programmed to dynamically determine a predetermined policy risk threshold in real time for the identified data record utilizing the respective dynamic data model and the respective determined risk probability value associated with each qualifying provider of the plurality of providers. In some embodiments, the determination of the predetermined policy risk threshold may refer to receiving, from one or more databases accessible by the PSCI platform, one or more predetermined respective pre-underwriter policy criteria provided by one or more insurance providers; comparing the shipment details to the predetermined respective pre-underwriter policy criteria to identity one or more qualifying insurance providers from the one or more insurance providers; and determining, for each one of the one or more qualifying insurance providers, a respective risk probability value based upon the shipment details and the respective pre-underwriter policy criteria. In some embodiments, the predetermined policy risk threshold may refer to the range of limits associated with a particular insurance policy associated with each insurance provider of the plurality of insurance providers. In some embodiments, the predetermined policy risk threshold may refer an insurance policy premium associated with each qualified insurance provider of the plurality of insurance providers. In some embodiments, the processor 205 may be programmed to dynamically modify, the predetermined policy risk threshold based upon the respective model risk probability value if certain predetermined insurance premium modifying criteria are met to determine a respective modified predetermined policy risk threshold.

In step 914, the processor 205 may be programmed to automatically modify the predetermined policy risk threshold in real time associated with the at least one qualified provider of the plurality of providers based on a respective model risk probability value. In some embodiments, the automatic modifications to the predetermined policy risk threshold may refer to receiving sensor data generated by one or more sensors in real time based on one or more of weather data, transport route data that includes data about a route that will be utilized to transport the goods, and goods data that includes data about the goods included in the identified cargo shipment. In some embodiments, the processor 205 may be programmed to utilizing a risk probability scoring engine to determine a reference risk probability value based on the enriched input data included in shipment details for an identified cargo shipment, which may automatically modify the predetermined policy risk threshold in real time. In some embodiments, the processor 205 may utilize the automatically modified predetermined policy risk threshold to determine the dynamic pricing model based on the enriched shipment details, risk probability value, and the plurality of policy parameters. In some embodiments, the dynamic pricing model may refer to an aggregation of an insurance premium, a booking fee, and a technology fee, where each of these may be dynamically adjusted based on the plurality of policy parameters and/or risk probability value.

In step 916, the processor 205 may be programmed to dynamically select a respective data point for each qualified provider of the plurality of providers based on the respective model risk probability value and a modified policy risk threshold in real time for the identified data record. In some embodiments, the respective data point may refer to an insurance policy quote associated with each insurance provider of the plurality of providers. In some embodiments, the at least one respective data point dynamically selected in response to the automatic modifications to the predetermined policy risk threshold may refer to an insurance policy that provides insurance coverage for an identified cargo shipment. In some embodiments, the processor 205 may be programmed to determine a respective insurance quote based upon one of the respective insurance policy premiums or the respective modified predetermined policy risk threshold in real time for the identified cargo shipment for each of the one or more qualifying insurance providers. In some embodiments, the respective insurance policy premium may be selected based on meeting a threshold of risk probability; commodity type; current exposure; which includes shipment value, insured shipments in a warehouse, port, city, or country; insured shipments in vehicle, vessel, or aircraft; insured shipments with operator and/or total; and/or designation and origin of shipment. In some embodiments, the processor 205 may be programmed to determine a respective insurance quote based on the identified cargo shipment failing to comply with one or more insurance compliance regulations. In some embodiments, the processor 205 may be programmed to utilize pre-underwriter policy criteria to provide insurance coverage to a consignor based upon the one or more real time generated respective insurance quotes without providing the shipment details of the identified cargo shipment to an underwriter.

While a number of embodiments of the present disclosure have been described, it is understood that these embodiments are illustrative only, and not restrictive, and that many modifications may become apparent to those of ordinary skill in the art, including that the inventive methodologies, the inventive systems, and the inventive devices described herein can be utilized in any combination with each other. Further still, the various steps may be carried out in any desired order (and any desired steps may be added and/or any desired steps may be eliminated).

What is claimed is:

1. A computer-implemented method comprising:
receiving, by a processor, a plurality of policy parameters associated with a provider of a plurality of providers from a plurality of pre-generated databases;
dynamically enriching, by the processor, input data associated with the plurality of policy parameters and a plurality of identified data records,
wherein enriched input data is utilized to train a machine learning model associated with the identified data record;
training, by the processor, a machine learning model with at least one data feedback loop by introducing training data as a plurality of variables to generate a first plurality of scenarios in real-time,
dynamically simulating, by the processor, the first plurality of scenarios in real time to optimize a first respective dynamic probability risk value generated by a respective dynamic data model using the trained machine learning model;
automatically updating, by the processor, the at least one feedback loop associated with the trained machine learning model;
dynamically generating, by the processor, a second plurality of scenarios in real-time based on the at least one feedback loop associated with the trained machine learning model;
dynamically determining, by the processor, a predetermined policy risk threshold for the identified data record based on the second plurality of scenarios; and
automatically modifying, by the processor, the predetermined policy risk threshold associated with a qualified provider of the plurality of providers based on a respective model risk probability value to generate a modified policy risk threshold associated with the identified data record.

2. The method of claim 1, further comprising dynamically selecting a respective data point for each qualified provider of the plurality of providers based on a second respective model risk probability value and a modified second policy risk threshold in real time for the identified data records.

3. The method of claim 2, further comprising automatically engaging into at least two smart contracts between at least one entity and the at least one provider based on the dynamically selected respective data point for each qualified provider of the plurality of providers.

4. The method of claim 1, further comprising receiving the input data for a plurality of identified data records by a plurality of logistics data providers.

5. The method of claim 1, wherein dynamically enriching the input data comprises aggregating current data, forecast data, and predictive data associated with the identified data record.

6. The method of claim 1, wherein training the machine learning model comprises calculating the first respective risk probability value associated with each qualifying provider of the plurality of providers based a comparison of the enriched input data and the plurality of predetermined policy parameters.

7. The method of claim 1, wherein dynamically simulating the first set of scenarios comprises generating the respective dynamic data model associated with each of the qualifying provider of the plurality of providers based on the enriched input data and the respective dynamic risk probability value.

8. The method of claim 1, wherein the training data is a representation of potential risks associated with the enriched input data represented in forms of data points.

9. The method of claim 1, wherein automatically updating the at least one feedback loop comprises storing at least one result of a dynamic simulation of at least one scenario of the first plurality of scenarios in real-time.

10. The method of claim 1, wherein automatically modifying the determined policy risk threshold comprises utilizing the respective dynamic data model and the first respective determined risk probability value associated with each qualifying provider of the plurality of providers in real-time.

11. A computing device comprising:
a non-transient computer memory, storing software instructions;
at least one processor;
wherein, when the at least one processor executes the software instructions, the computing device is programmed to:
receive a plurality of policy parameters associated with a provider of a plurality of providers from a plurality of pre-generated databases;
dynamically enrich input data associated with the plurality of policy parameters and a plurality of identified data records,
wherein enriched input data is utilized to train a machine learning model associated with the identified data record;

train a machine learning model with at least one data feedback loop by introducing training data as a plurality of variables to generate a first plurality of scenarios in real-time,
dynamically simulate the first plurality of scenarios in real time to optimize a first respective dynamic probability risk value generated by a respective dynamic data model using the trained machine learning model;
automatically update the at least one feedback loop associated with the trained machine learning model;
dynamically generate a second plurality of scenarios in real-time based on the at least one feedback loop associated with the trained machine learning model;
dynamically determine a predetermined policy risk threshold for the identified data record based on the second plurality of scenarios; and
automatically modify the predetermined policy risk threshold associated with a qualified provider of the plurality of providers based on a respective model risk probability value to generate a modified policy risk threshold associated with the identified data record.

12. The computing device of claim 11, wherein the computing device is further programmed to dynamically select a respective data point for each qualified provider of the plurality of providers based on a second respective model risk probability value and a modified second policy risk threshold in real time for the identified data records.

13. The computing device of claim 11, wherein the computing device is further programmed to automatically engage into at least two smart contracts between at least one entity and the at least one provider based on the dynamically selected respective data point for each qualified provider of the plurality of providers.

14. The computing device of claim 11, wherein the computing device is further programmed to receive the input data for a plurality of identified data records by a plurality of logistics data providers.

15. The computing device of claim 11, wherein a dynamic enrichment of the input data comprises aggregating current data, forecast data, and predictive data associated with the identified data record.

16. The computing device of claim 11, wherein the machine learning model comprises calculating the first respective risk probability value associated with each qualifying provider of the plurality of providers based a comparison of the enriched input data and the plurality of predetermined policy parameters.

17. The computing device of claim 11, wherein a dynamic simulation of the first set of scenarios comprises generating the respective dynamic data model associated with each of the qualifying provider of the plurality of providers based on the enriched input data and the respective dynamic risk probability value.

18. The computing device of claim 11, wherein the training data is a representation of potential risks associated with the enriched input data represented in forms of data points.

19. A system comprises:
a non-transient computer memory, storing software instructions;
at least one processor of a computing device associated with a user;
wherein, when the processor executes the software instructions, the first computing device is programmed to:
receive a plurality of policy parameters associated with a provider of a plurality of providers from a plurality of pre-generated databases;
dynamically enrich input data associated with the plurality of policy parameters and a plurality of identified data records,
wherein enriched input data is utilized to train a machine learning model associated with the identified data record;
train a machine learning model with at least one data feedback loop by introducing training data as a plurality of variables to generate a first plurality of scenarios in real-time,
dynamically simulate the first plurality of scenarios in real time to optimize a first respective dynamic probability risk value generated by a respective dynamic data model using the trained machine learning model;
automatically update the at least one feedback loop associated with the trained machine learning model;
dynamically generate a second plurality of scenarios in real-time based on the at least one feedback loop associated with the trained machine learning model;
dynamically determine a predetermined policy risk threshold for the identified data record based on the second plurality of scenarios; and
automatically modify the predetermined policy risk threshold associated with a qualified provider of the plurality of providers based on a respective model risk probability value to generate a modified policy risk threshold associated with the identified data record.

20. The system of claim 19, the training data is a representation of potential risks associated with the enriched input data represented in forms of data points.

* * * * *